US010925000B2

(12) United States Patent
Yun et al.

(10) Patent No.: US 10,925,000 B2
(45) Date of Patent: Feb. 16, 2021

(54) METHOD FOR TRANSMITTING OR RECEIVING WAKE-UP RADIO PACKET IN WIRELESS LAN SYSTEM AND DEVICE THEREFOR

(71) Applicant: LG ELECTRONICS INC., Seoul (KR)

(72) Inventors: Sunwoong Yun, Seoul (KR); Eunsung Park, Seoul (KR); Dongguk Lim, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/464,662

(22) PCT Filed: Nov. 28, 2017

(86) PCT No.: PCT/KR2017/013722
§ 371 (c)(1),
(2) Date: May 28, 2019

(87) PCT Pub. No.: WO2018/097699
PCT Pub. Date: May 31, 2018

(65) Prior Publication Data
US 2020/0100182 A1    Mar. 26, 2020

Related U.S. Application Data

(60) Provisional application No. 62/426,606, filed on Nov. 28, 2016, provisional application No. 62/439,503,
(Continued)

(51) Int. Cl.
*H04W 52/02* (2009.01)
*H04L 27/02* (2006.01)
(Continued)

(52) U.S. Cl.
CPC ......... *H04W 52/0235* (2013.01); *H04L 27/02* (2013.01); *H04L 27/26* (2013.01); *H04W 84/12* (2013.01)

(58) Field of Classification Search
CPC .................................................. H04W 52/0235
(Continued)

(56) References Cited

U.S. PATENT DOCUMENTS

2016/0337973 A1    11/2016  Park et al.
2019/0036754 A1*    1/2019  Lee ..................... H04L 27/2627

OTHER PUBLICATIONS

PCT International Application No. PCT/KR2017/013722, International Search Report dated Mar. 15, 2018, 4 pages.
(Continued)

*Primary Examiner* — Peter G Solinsky
(74) *Attorney, Agent, or Firm* — Lee, Hong, Degerman, Kang & Waimey PC

(57) ABSTRACT

A method for transmitting a wake-up radio (WUR) packet by an access point (AP) in a wireless LAN (WLAN) system according to an embodiment of the present invention comprises the steps of: generating a WUR packet including a legacy preamble and a plurality of on-symbols; and transmitting the WUR packet to a station (STA), wherein a subcarrier sequence for generating the plurality of on-symbols may be determined on the basis of a legacy training field sequence that configures the legacy preamble.

9 Claims, 24 Drawing Sheets

Related U.S. Application Data filed on Dec. 28, 2016, provisional application No. 62/455,540, filed on Feb. 6, 2017.

(51) Int. Cl.
*H04L 27/26* (2006.01)
*H04W 84/12* (2009.01)

(58) Field of Classification Search
USPC .......................................................... 370/329
See application file for complete search history.

(56) References Cited

OTHER PUBLICATIONS

Seok, Y. et al., "Coexistence Mechanism for Wakeup Radio Signal", doc.: IEEE 802.11-16/1114r0, Aug. 2016, 11 pages.
Park, M. et al., "LP-WUR (Low-Power Wake-Up Receiver", doc.: IEEE 802.11-16/0341r0, Mar. 2016, 9 pages.
Park, E. et al., "Performance Investigation on Wake-Up Receiver", doc.: IEEE 802.11-16/0865r0, Jul. 2016, 16 pages.
Hsu, F. et al., "LP WUR Wake-up Packet Identify Considerations", doc.: IEEE 802.11-16/0402r0, Mar. 2016, 9 pages.

* cited by examiner

FIG. 5
(a) 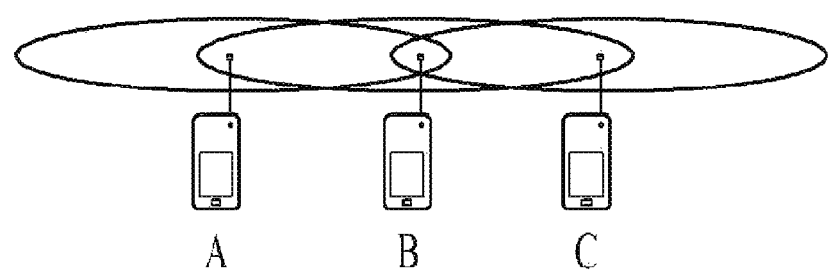
(b) 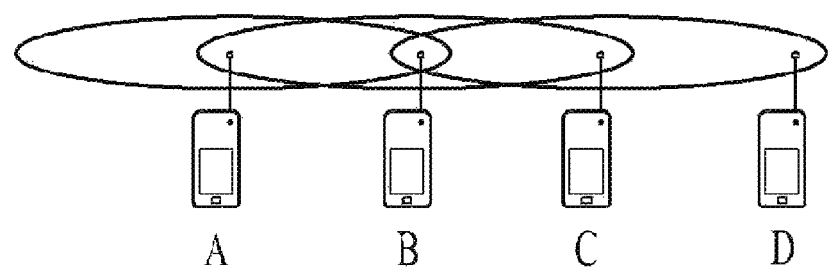

FIG. 6
(a)
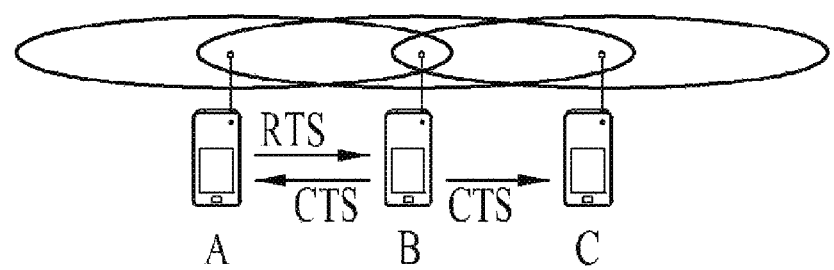
(b)
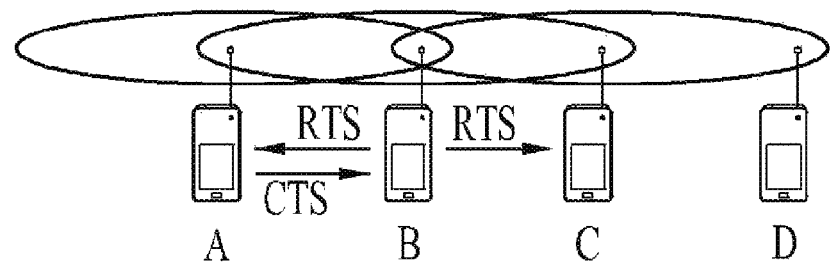

FIG. 17
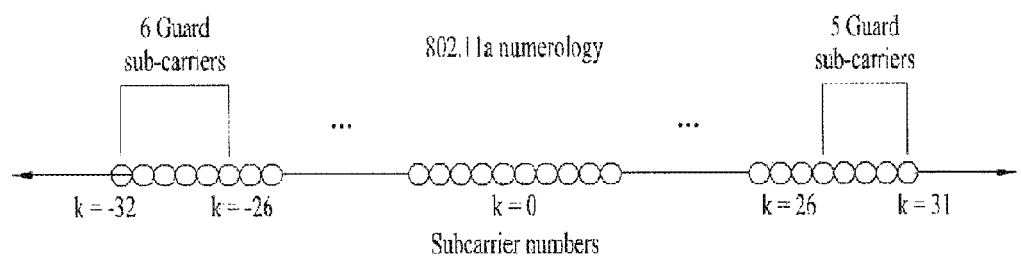
(a)
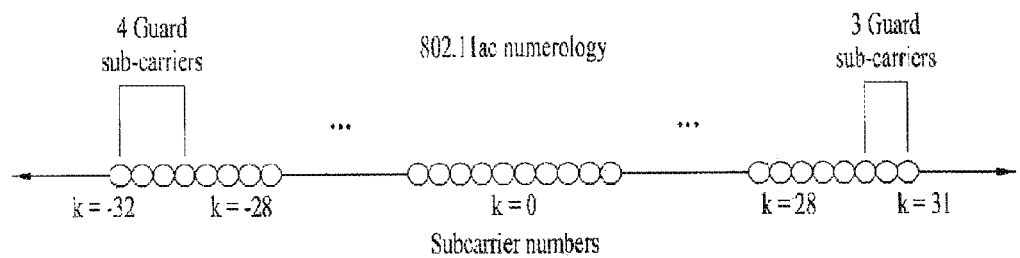
(b)

FIG. 18
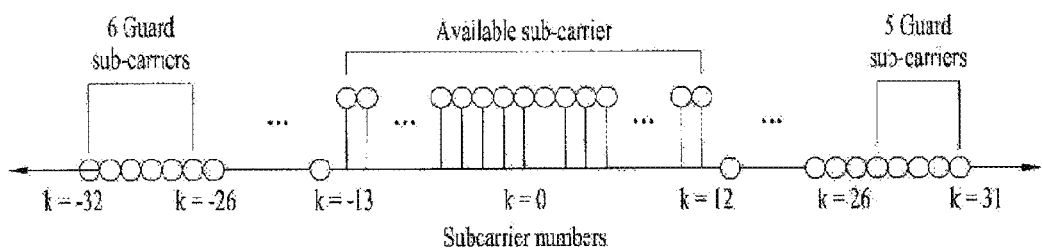
(a)
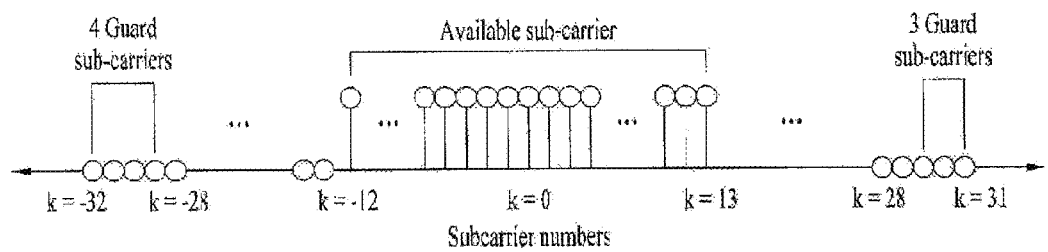
(b)

FIG. 19
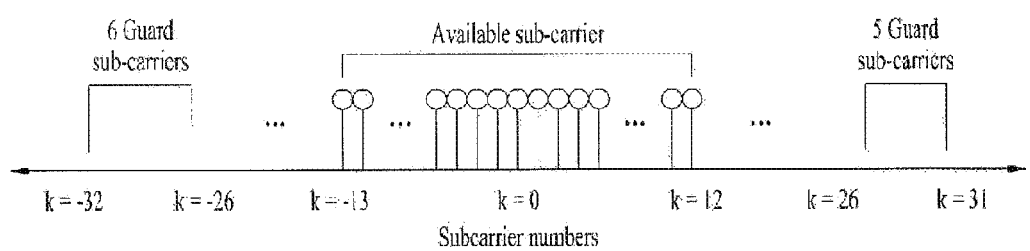
(a)
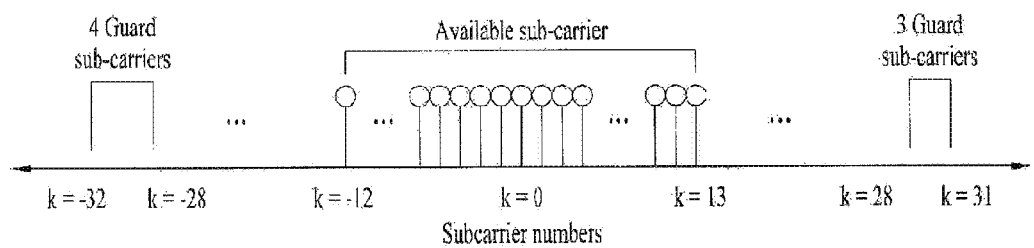
(b)

FIG. 20
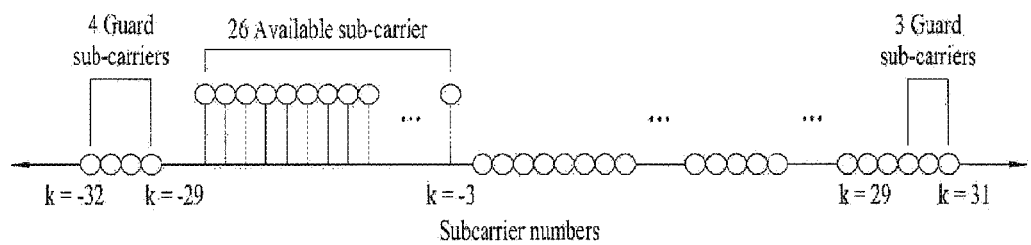
(a)
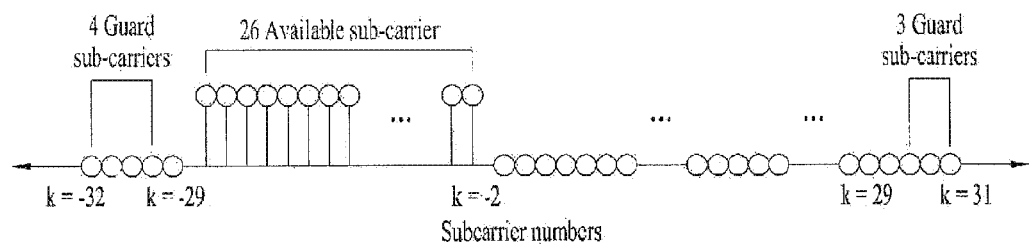
(b)
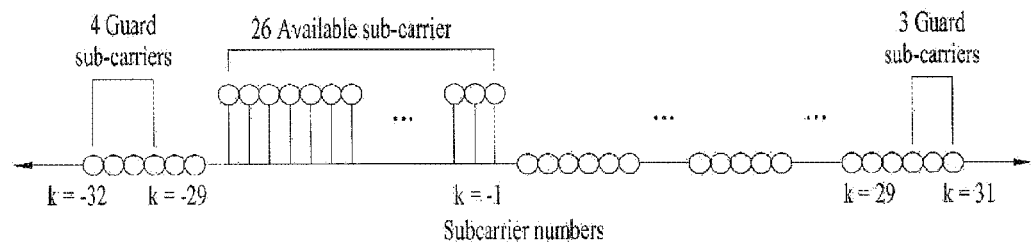
(c)
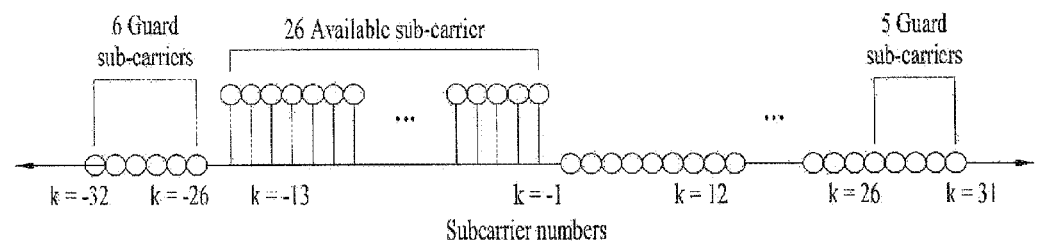
(d)

FIG. 21
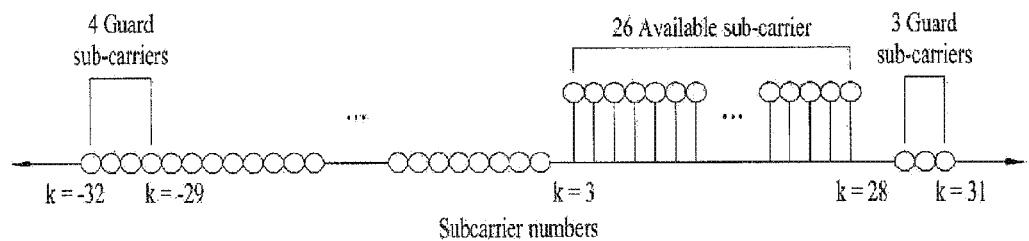
(a)
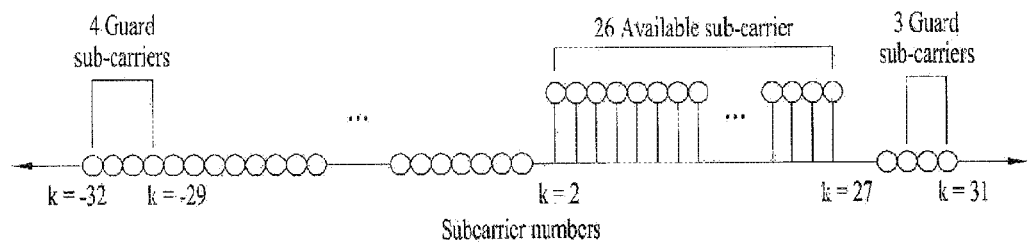
(b)
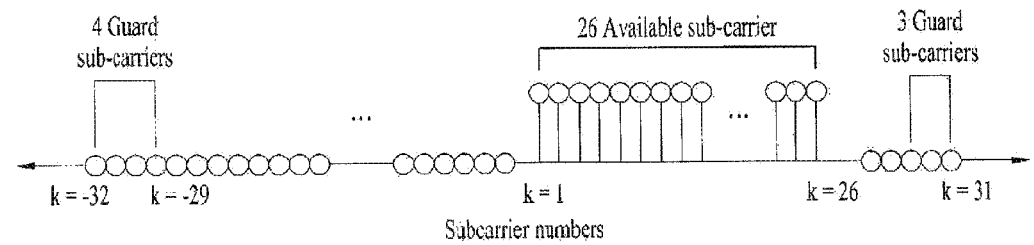
(c)
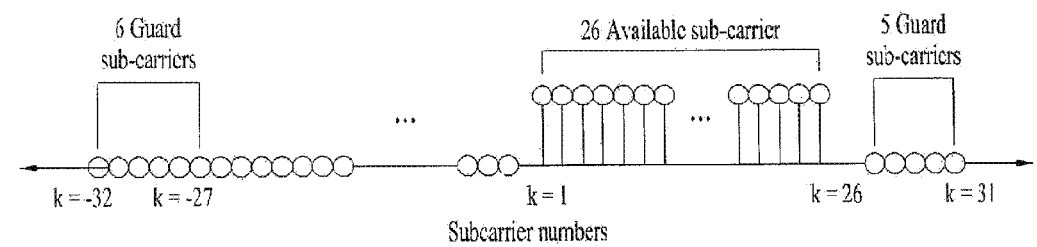
(d)

FIG. 22
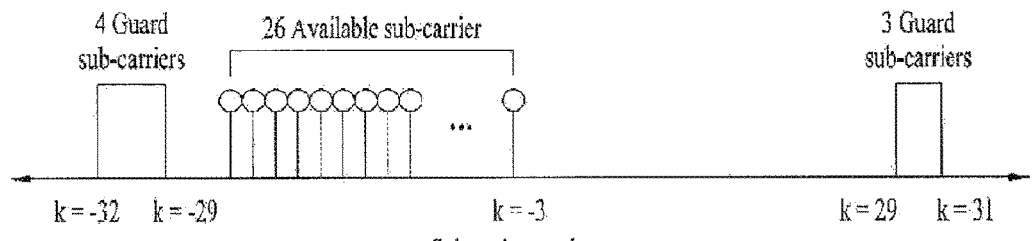
(a)
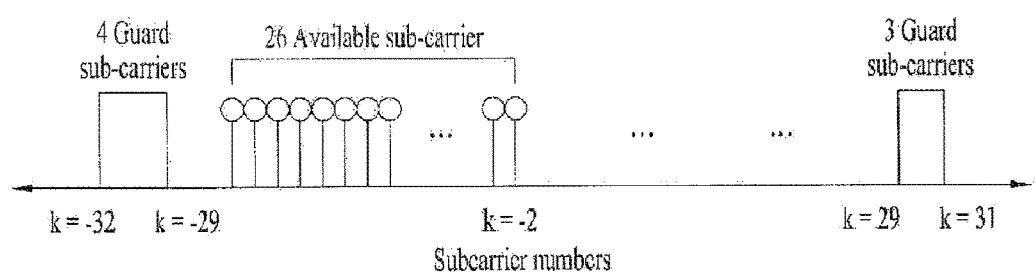
(b)
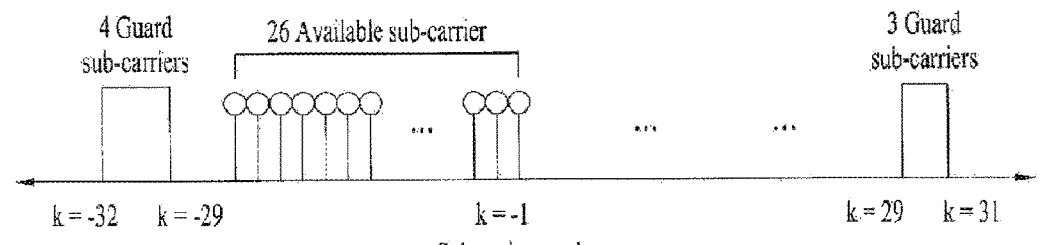
(c)
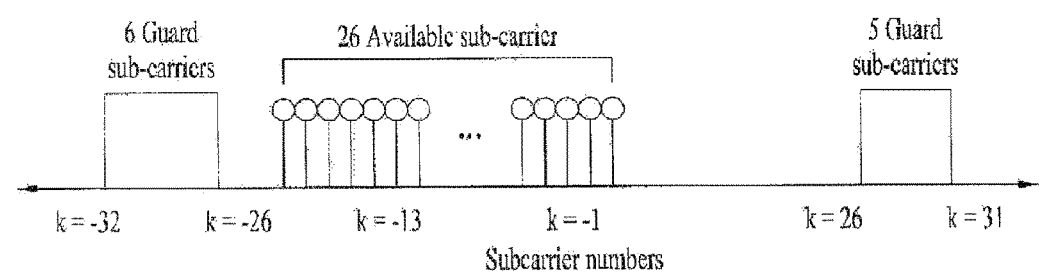
(d)

FIG. 23
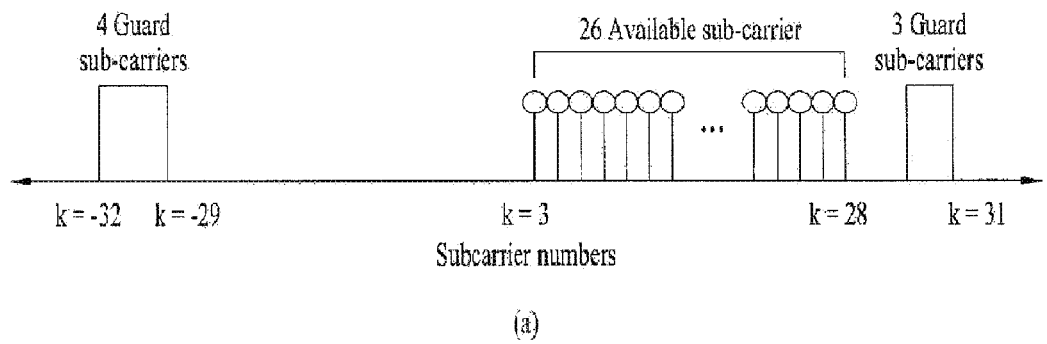
(a)
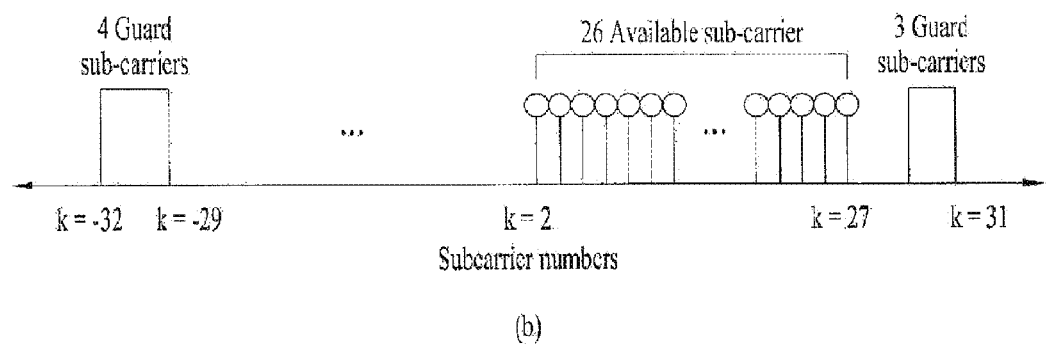
(b)
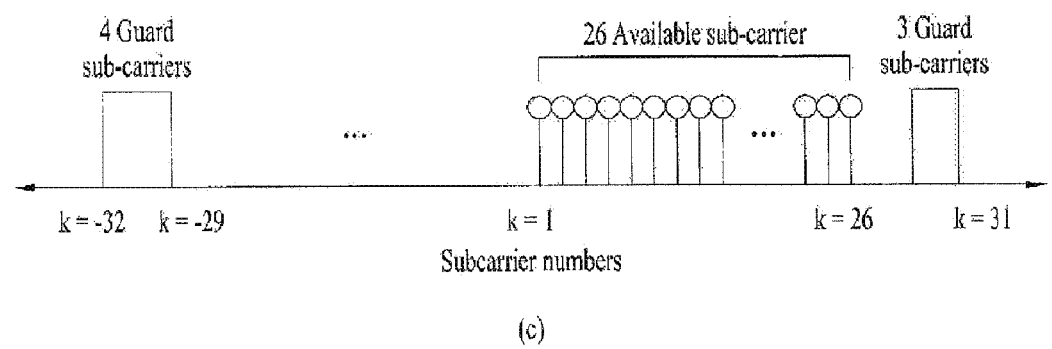
(c)
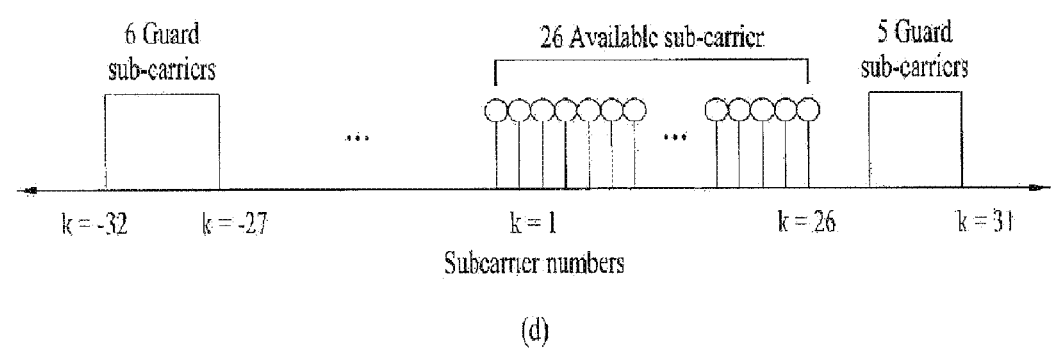
(d)

METHOD FOR TRANSMITTING OR RECEIVING WAKE-UP RADIO PACKET IN WIRELESS LAN SYSTEM AND DEVICE THEREFOR

CROSS-REFERENCE TO RELATED APPLICATIONS

This application is the National Stage filing under 35 U.S.C. 371 of International Application No. PCT/KR2017/013722, filed on Nov. 28, 2017, which claims the benefit of U.S. Provisional Application No. 62/426,606, filed on Nov. 28, 2016, 62/439,503, filed on Dec. 28, 2016, and 62/455,540, filed on Feb. 6, 2017, the contents of which are hereby incorporated by reference herein in their entirety.

BACKGROUND OF THE INVENTION

Field of the Invention

The present invention relates to a wireless local area network system and, more particularly, to a method for transmitting or receiving a wake-up radio (WUR) packet to wake up a primary connectivity radio (PCR) through a WUR and a device therefor.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

SUMMARY OF THE INVENTION

An aspect of the present invention is to provide a wake-up radio (WUR) packet transmission method for improving channel quality in a wireless local area network (WLAN) system supporting a WUR.

Another aspect of the present invention is to provide a method of configuring a WUR sequence mapped to a subcarrier in order to transmit a WUR packet to a primary connectivity radio (PCR).

Still another aspect of the present invention is to provide a method of efficiently transmitting a WUR packet to a plurality of users.

The present invention is not limited to the aforementioned aspect, and other aspects may be derived from embodiments of the present invention.

In accordance with one aspect of the present invention, there may be provided a method for transmitting a wake-up radio (WUR) packet by an access point (AP) in a wireless local area network (WLAN) system, the method including: generating a WUR packet including a legacy preamble and a plurality of on-symbols; and transmitting the WUR packet to a station (STA), wherein a subcarrier sequence for generating the plurality of on-symbols may be determined based on a legacy training field sequence that is included in the legacy preamble.

The subcarrier sequence may be determined according to a frequency band allocated for the plurality of on-symbols.

The frequency band allocated for the plurality of on-symbols may be set as an entire transmission band for the WLAN system, and a partial consecutive subcarrier sequence of the subcarrier sequence may be set to generate the plurality of on-symbols.

A frequency band allocated for the partial subcarrier sequence may be set to one of 20 MHz, 10 MHz, 8 MHz, 5 MHz, 4 MHz, and 2.5 MHz.

The frequency band allocated for the plurality of on-symbols may be set as a partial frequency band of a transmission band for the WLAN system, and the entire subcarrier sequence may be set to generate the plurality of on-symbols.

The partial frequency band may be set to one of 10 MHz, 8 MHz, 5 MHz, 4 MHz, and 2.5 MHz.

The plurality of on-symbols may be allocated by on-off keying (OOK) modulation or Manchester coding using OOK modulation.

The legacy training field sequence may be a very high throughput-short training field (VHT-STF) or a very high throughput-long training field (VHT-LTF).

The method for transmitting the wake-up radio WUR packet may further include mapping the subcarrier sequence to some of a plurality of all subcarriers forming a transmission band for the WLAN system, wherein the subcarrier sequence may be mapped to a plurality of consecutive subcarriers among the plurality of all subcarriers, and a partial consecutive subcarrier sequence of the subcarrier sequence may be set to generate the plurality of on-symbols.

The center of the partial subcarrier sequence may be mapped to the center of the plurality of all subcarriers.

The partial subcarrier sequence may be mapped only to a subcarrier having a negative index.

The partial subcarrier sequence may be mapped only to a subcarrier having a positive index.

The WUR payload may include a plurality of on-symbols for a plurality of STAs, the plurality of on-symbols for the plurality of STAs may be multiplexed on one symbol period, and different phase rotations may be applied to the respective multiplexed on-symbols.

In accordance with another aspect of the present invention, there may be provided a device for transmitting a WUR packet in a WLAN system, the device including: a transceiver; and a processor, wherein the processor may generate a WUR packet including a legacy preamble and a plurality of on-symbols and may transmit the WUR packet to a STA, and a subcarrier sequence for generating the plurality of on-symbols may be determined based on a legacy training field sequence that is included in the legacy preamble.

According to one embodiment of the present invention, it is possible to reduce a high peak-to-average power ratio (PAPR, [dB]) that occurs when transmitting a WUR packet.

According to another embodiment of the present invention, when a WUR packet is transmitted to a plurality of users, a high PAPR that occurs due to transmission to a plurality of users may be reduced.

In addition to the aforementioned effects, other effects may be derived from embodiments of the present invention.

BRIEF DESCRIPTION OF THE DRAWINGS

FIG. 5 is a diagram for explaining a hidden node and an exposed node.

FIG. 6 is a drawing for explaining RTS and CTS.

FIG. 17 illustrates a guard subcarrier in a subcarrier spectrum.

FIG. 18 illustrates a method for mapping a WUR packet sequence onto a frequency domain according to one embodiment of the present invention.

FIG. 19 illustrates a method for mapping a WUR packet sequence onto a frequency domain according to another embodiment of the present invention.

FIG. 20 illustrates a method for mapping a WUR packet sequence onto a frequency domain according to still another embodiment of the present invention.

FIG. 21 illustrates a method for mapping a WUR packet sequence onto a frequency domain according to yet another embodiment of the present invention.

FIG. 22 illustrates a method for mapping a WUR packet sequence onto a frequency domain according to still another embodiment of the present invention.

FIG. 23 illustrates a method for mapping a WUR packet sequence onto a frequency domain according to yet another embodiment of the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

As described above, the following description relates to a method for efficiently utilizing a channel with a wide band in a wireless LAN (WLAN) system, and a device for the method. To this end, the WLAN system to which the present invention is applied will be described in detail.

Figure 1:
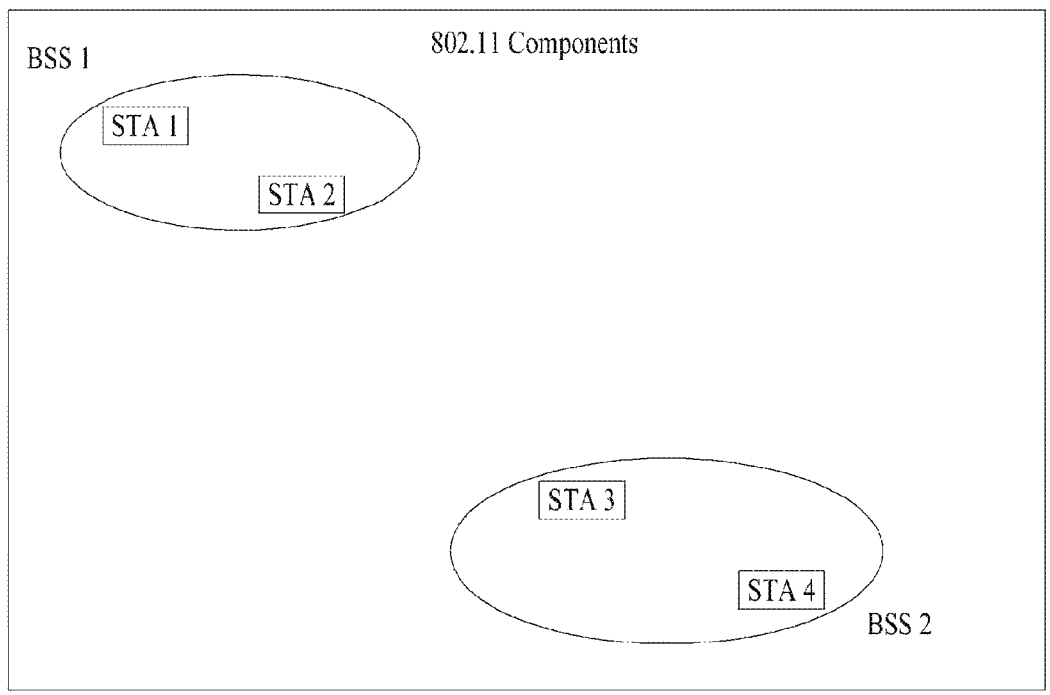
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
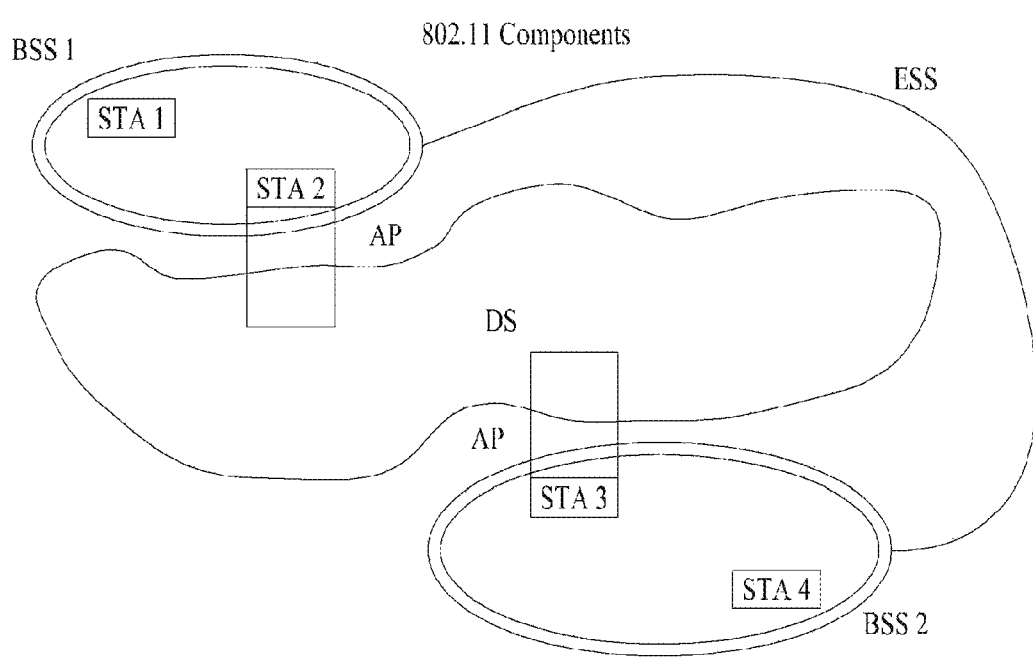
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Layer Structure

An operation of an STA operating in a WLAN system may be described in terms of a layer structure. The layer structure may be implemented by a processor in terms of a device configuration. The STA may have a multi-layer structure. For example, a layer structure in the 802.11 standard document is a MAC sublayer and a physical (PHY) layer on a data link layer (DLL). The PHY layer may include a physical layer convergence procedure (PLCP) entity, a physical medium dependent (PMD) entity, or the like. The MAC sublayer and the PHY layer include management entities referred to as a MAC sublayer management entity (MLME) and a physical layer management entity (PLME), respectively. Those entities provide a layer management service interface in which a layer management function operates.

In order to provide an accurate MAC operation, a station management entity (SME) exists in each STA. The SME is a layer-independent entity which may be present in a separate management plane or which may be seen to be off to the side. Although accurate functions of the SME are not described in detail in the present document, in general, it may be seen that the functions are for collecting a layer-dependent state from various layer management entities (LMEs), for setting layer-specific parameters to have similar values, or the like. In general, the SME may perform those functions on behalf of a general system management entity, and may implement a standard management protocol.

The aforementioned entities interact in various manners. For example, the interaction between the entities may be achieved by exchanging GET/SET primitives. The primitive implies a set of parameters or elements related to a specific purpose. An XX-GET.request primitive is used to request for a value of a given MIB attribute (attribute information based on management information). An XX-GET.confirm primitive is used to return a proper MIB attribute information value if a status is "success", and otherwise to return an error indication in a status field. An XX-SET.request primitive is used such that an indicated MIB attribute is set to a given value. When the MIB attribute implies a specific operation, it is a request for performing the operation. In addition, an XX-SET.confirm primitive is used to confirm that an indicated MIB attribute is set to a requested value if a status is "success", and otherwise to return an error condition in a status field. When the MIB attribute implies a specific operation, it is confirmed that the operation has been performed.

In addition, the MLME and the SME may exchange various MLME_GET/SET primitives through an MLME_SAP (Service Access Point). In addition, the various PLME_GET/SET primitives may be exchanged between the PLME and the SME through the PLME_SAP, and may be exchanged between the MLME and the PLME through the MLME-PLME_SAP.

Link Setup Process

Figure 3:
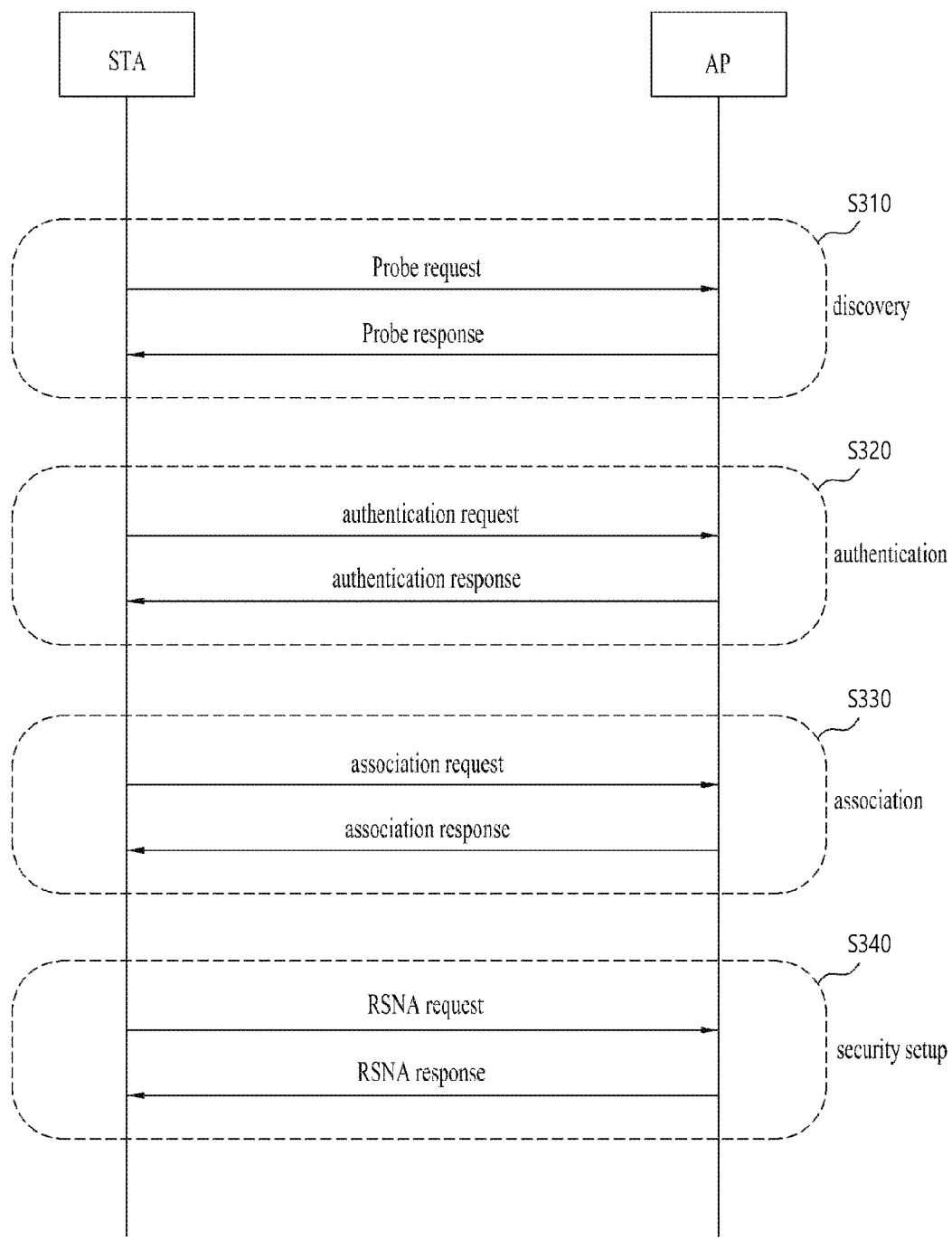
FIG. 3 is a drawing for explaining a typical link setup process.

FIG. 3 is a drawing for explaining a typical link setup process.

In order for an STA to set up a link for a network, the STA shall first discover the network, perform authentication, establish an association, and be subjected to an authentication procedure or the like for security. The link setup process may be referred to as a session initiation process or a session setup process. In addition, the process of discovery, authentication, association, and security configuration of the link setup process may be collectively referred to as an association process.

Referring to FIG. 3, an exemplary link setup process will be described.

In step S510, an STA may perform a network discovery operation. The network discovery operation may include a scanning operation of the STA. That is, a joinable network shall be found in order for the STA to have access to the network. The STA shall identify a compatible network before joining a wireless network, and a process of identifying a network existing in a specific region is called scanning.

The scanning includes active scanning and passive scanning.

The network discovery operation including the active scanning process is shown as an example in FIG. 3. In the active scanning, an STA performing the scanning transmits a probe request frame to discover a nearby AP while moving between channels, and waits for a response thereto. In response to the probe request frame, a responder transmits a probe response frame to the STA which has transmitted the probe request frame. Herein, the responder may be an STA which has lastly transmitted a beacon frame in a BSS of a channel being scanned. In the BSS, an AP is the responder since the AP transmits the beacon frame. In an IBSS, the responder is not constant since STAs in the IBSS transmit the beacon frame in turn. For example, an STA which has transmitted a probe request frame in a channel #1 and has received a probe response frame in the channel #1 may store BSS-related information included in the received probe response frame and move to a next channel (e.g., a channel #2) to perform scanning (i.e., probe request/response transmission and reception on the channel #2) in the same manner.

Although not shown in FIG. 3, the scanning operation may be performed in a passive scanning manner. In the passive scanning, an STA performing the scanning waits for a beam frame while moving between channels. The beacon frame is one of management frames in IEEE 802.11, and is transmitted periodically to report the existence of a wireless network and to allow the STA performing scanning to find the wireless network so as to join the wireless network. In the BSS, an AP serves to periodically transmit the beacon frame. In the IBSS, STAs in the IBSS transmit the beacon frame in turn. The STA performing scanning stores the BSS-related information included in the beacon frame while receiving the beacon frame, and records beacon frame information in each channel while moving to another channel. An STA which has received the beacon frame may store the BSS-related information included in the received beacon frame, and may move to a next channel to perform scanning in the next channel in the same manner.

Comparing the active scanning and the passive scanning, advantageously, the active scanning has less delay and power consumption than the passive scanning.

After the STA discovers the network, an authentication process may be performed in step S520. The authentication process may be referred to as a first authentication process in order to clearly distinguish from a security setup operation of step S540 described below.

The authentication process includes a process in which the STA transmits an authentication request frame to the AP, and the AP transmits an authentication response frame to the STA in response thereto. The authentication frame used in the authentication request/response corresponds to a management frame.

The authentication frame may include information on an authentication algorithm number, an authentication transaction sequence number, a status code, a challenge text, a robust security network (RSN), a finite cyclic group, or the like. This information corresponds to some examples of information which may be included in the authentication request/response frame, and may be replaced with different information, or additional information may be further included.

The STA may transmit the authentication request frame to the AP. The AP may determine whether to accept authentication for a corresponding STA based on information included in the received authentication request frame. The AP may provide an authentication processing result to the STA through the authentication response frame.

After the STA is successfully authenticated, an association process may be performed in step S530. The association process includes a process in which the STA transmits an association request frame to the AP, and the AP transmits an association response frame to the STA in response thereto.

For example, the association request frame may include information related to various capabilities, a beacon listen interval, a service set identifier (SSID), supported rates, supported channels, RSN, a mobility domain, supported operating classes, a traffic indication map (TIM) broadcast request, an interworking service capability, or the like.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BBS scan parameter, a TIM broadcast request, a QoS map, or the like.

This information corresponds to some examples of information which may be included in the association request/response frame, and may be replaced with different information, or additional information may be further included.

After the STA is successfully associated with the network, a security setup process may be performed in step S540. The security setup process of step S540 may be referred to as an authentication process through a robust security network association (RSNA) request/response. The authentication process of step S520 may be referred to as a first authentication process. The security setup process of step S540 may be simply referred to as an authentication process.

The security setup process of step S540 may include a private key setup process through 4-way handshaking by using, for example, an extensible authentication protocol over LAN (EAPOL) frame. In addition, the security setup process may be performed according to a security scheme not defined in the IEEE 802.11 standard.

Medium Access Mechanism

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. According to this type of access mechanism, an AP and/or an STA may perform clear channel assessment (CCA) which senses a medium or a wireless channel during a specific time duration (e.g., DCF inter-frame space (DIFS)) before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration (e.g., a random backoff period) for medium access. By applying the random backoff period, it is expected that several STAs attempt to transmit a frame after waiting for different time durations, thereby minimizing a collision.

In addition, the IEEE 802.11 MAC protocol provides a hybrid coordination function (HCF). The HCF is based on the DCF and a point coordination function (PCF). The PCF is a polling-based synchronous access scheme in which polling is periodically performed so that all receiving APs and/or STAs can receive data frames. In addition, the HCF may have enhanced distributed channel access (EDCA) and HCF controlled channel access (HCCA). The EDCA is a contention based access scheme for providing a data frame to a plurality of users, and the HCCA is a contention-free based channel access scheme using a polling mechanism. In addition, the HCF may include a medium access mechanism for improving a quality of service (QoS) of the WLAN, and may transmit QoS data in both a contention period (CP) and a contention-free period (CFP).

Figure 4:
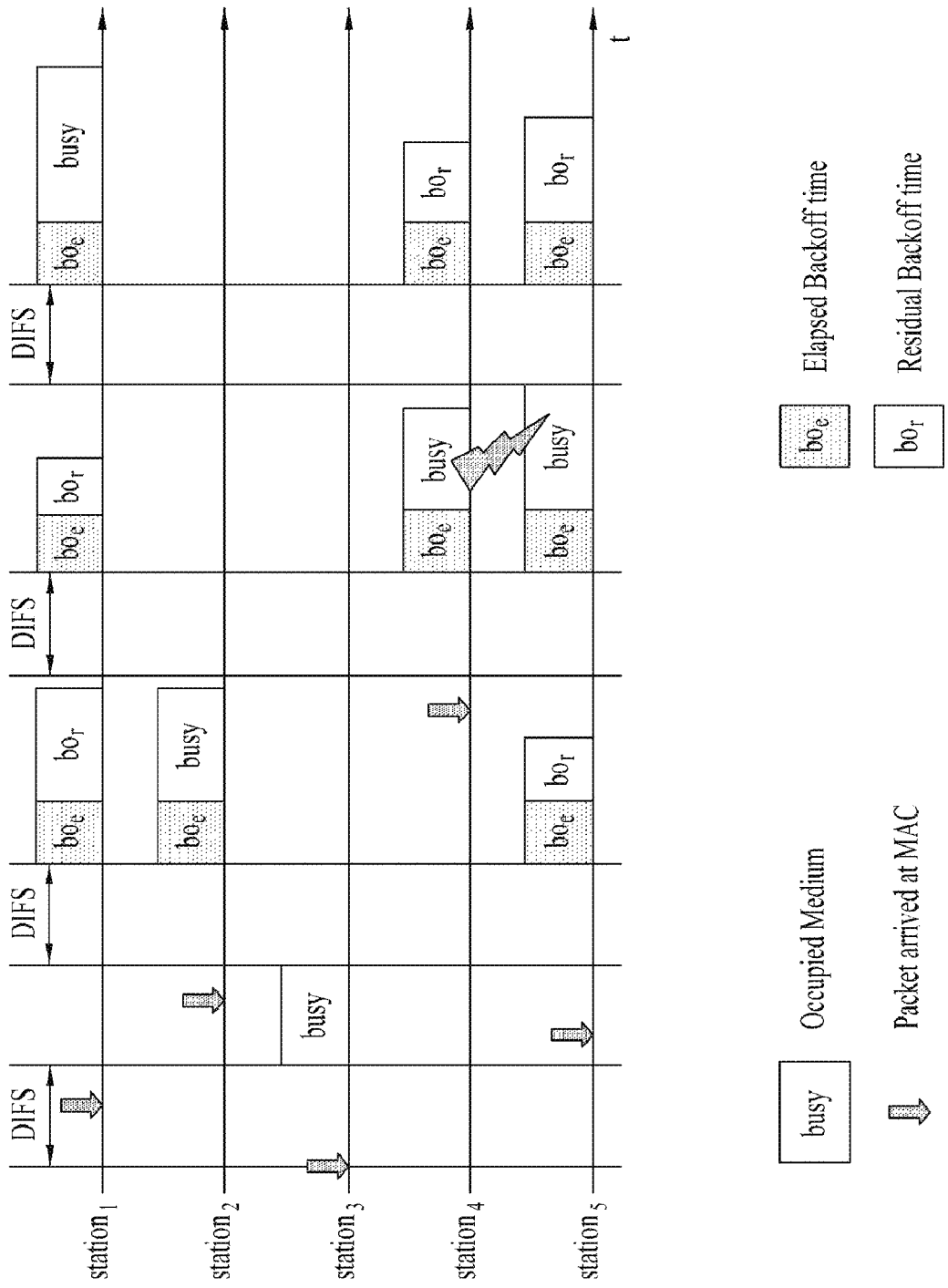
FIG. 4 is a drawing for explaining a backoff process.

FIG. 4 is a drawing for explaining a backoff process.

An operation based on a random backoff period will be described with reference to FIG. 4. When a specific medium is changed from an occupied (or busy) status to an idle status, several STAs may attempt data (or frame) transmission. In this case, as a method for minimizing a collision, each of the STAs may select a random backoff count and may attempt transmission after waiting for a corresponding time slot. The random backoff count may have a packer number value, and may be determined as one of values in the range of 0 to CW. Herein, the CW is a contention window parameter value. The CW parameter has an initial value given as CWmin, but may take a value two times higher than that if transmission fails (e.g., if ACK is not received for a transmitted frame). If the CW parameter value is CWmax, data transmission may be attempted while maintaining CWmax until data transmission is successful, and if data transmission is successful, the value is reset to CWmin. The values CW, CWmin, and CWmax are preferably set to $2^n-1$ (n=0, 1, 2, . . . ).

When the random backoff process starts, the STA continuously monitors a medium during counting down a backoff slot according to the determined backoff count value. When the medium is monitored in the busy status, the STA stops the countdown and waits. When the medium is monitored in the idle status, the STA resumes the countdown.

In the example of FIG. 4, upon arrival of a packet to be transmitted to MAC of an STA 3, the STA3 may transmit a frame immediately after identifying that the medium is idle for a time of DIFS. Meanwhile, the remaining STAs may monitor that the medium is in the busy status and may wait. In the meantime, data to be transmitted may be generated in each of STAs 1, 2, and 5. Each STA may wait for the DIFS when the medium is monitored in the idle status, and thereafter may count down a backoff slot according to a random backoff time selected by each STA. The example of FIG. 4 shows a case where the STA2 selects a shortest backoff time, and the STA1 selects a longest backoff count value. That is, it is shown that a residual backoff time of the STA5 is shorter than a residual backoff time of the STA1 at a time when the STA2 finishes backoff counting for the selected random backoff time and starts frame transmission. The STA1 and the STA5 stop the countdown and waits during the STA2 occupies a medium. When the medium occupancy of the STA2 is finished and thus the medium is in the idle status again, the STA1 and the STA5 resume the countdown for the residual backoff time which has stopped after waiting for the DIFS. That is, frame transmission may start after counting down the residual backoff slot corresponding to the residual backoff time. Since the STA5 has a shorter residual backoff time than the STA1, the STA5 starts frame transmission. Meanwhile, data to be transmitted may be generated also in the STA4 during the STA2 occupies the medium. In this case, the STA4 may wait for the DIFS when the medium is in the idle status, and thereafter may perform the countdown based on the random backoff count value selected by the STA4 and may start frame transmission. The example of FIG. 6 shows a case where the residual backoff time of the STA5 incidentally coincides with the random backoff time of the STA4. In this case, a collision may occur between the STA4 and the STA5. When the collision occurs, both the STA4 and the STA5 cannot receive ACK, which leads to a failure in data transmission. In this case, the STA4 and the STA5 may double a CW value and then select the random backoff count value, and may perform the countdown. Meanwhile, the STA1 may wait during a medium is in the busy state due to transmission of the STA4 and the STA5, and when the medium is in the idle status, may wait for DIFS and thereafter may transmit a frame at the expiry of the residual backoff time.

Sensing operation of STA

As described above, a CSMA/CA mechanism includes virtual carrier sensing as well as physical carrier sensing in which an AP and/or an STA directly senses a medium. The virtual carrier sensing is intended to compensate for a problem which may occur on medium access such as a hidden node problem or the like. For the virtual carrier sensing, MAC of a WLAN system may use a network allocation vector (NAV). The NAV is a value used by an AP and/or STA, which is currently using a medium or has a right to use it, to indicate a remaining time until the medium is in an available state to another AP and/or STA. Therefore, the value which is set to the NAV corresponds to an interval scheduled to use the medium by an AP and/or STA for transmitting a corresponding frame, and an STA receiving the NAV value is prohibited from accessing the medium during the interval. The NAV may be set, for example, according to a value of a "duration" field of an MAC header of the frame.

In addition, a robust collision detection mechanism has been introduced to reduce the possibility of collision. This will be described with reference to FIG. 5 and FIG. 7. Although a carrier sensing range may not be actually identical to a transmission range, it is assumed that they are identical to each other for convenience of explanation.

FIG. 5 is a diagram for explaining a hidden node and an exposed node.

FIG. 5(a) is an example of a hidden node when an STA A communicates with an STA B, and an STA C has information to be transmitted. Specifically, although it is a situation where the STA A transmits information to the STA B, it may be determined that a medium is in an idle status when the STA C performs carrier sensing before transmitting data to the STA B. This is because transmission (e.g., medium occupancy) of the STA A may not be sensed at a location of the STA C. In this case, the STA B simultaneously receives information of the STA A and the STA C, which results in a collision. In this case, the STA A may be referred to as a hidden node of the STA C.

FIG. 5(b) is an example of an exposed node when an STA C has information to be transmitted from an STA D in a situation where and an STA B transmits data to an STA A. In this case, when the STA C performs carrier sensing, it may be determined as a state where a medium is occupied due to transmission of the STA B. Accordingly, even if the STA C has information to be transmitted to the STA D, since an occupied status of the medium is sensed, waiting is required until the medium becomes an idle status. However, since the STA A is actually out of a transmission range of the STA C, transmission from the STA C and transmission from the STA B may not collide with each other from a perspective of the STA A. Therefore, the STA C unnecessarily waits until the STA B stops transmission. In this case, the STA C may be referred to as an exposed node of the STA B.

FIG. 6 is a drawing for explaining RTS and CTS.

In order to efficiently utilize a collision avoidance mechanism in an exemplary situation of FIG. 5, a short signaling packet such as request to send (RTS) and clear to send (CTS) or the like may be utilized. The RTS/CTS between two STAs may allow overhearing of nearby STA(s), thereby allowing the nearby STA(s) to consider whether to transmit information between the two STAs. For example, when an STA intending to transmit data transmits an RTS frame to an STA for receiving data, the STA for receiving data may transmit the CTS frame to the nearby STAs to report that the STA will receive data.

FIG. 6(a) is an example of a method for solving a hidden node problem when both an STA A and an STA C intend to transmit data to an STA B. When the STA A sends RTS to the STA B, the STA B transmits CTS to both the STA A and STA C located around the STA B. As a result, the STA C waits until the STA A and the STA B stop data transmission, thereby avoiding a collision.

FIG. 6(b) is an example of a method of solving an exposed hidden problem. Since an STA C overhears RTS/CTS transmission between an STA A and an STA B, the STA C may determine that a collision will not occur even if the STA C transmits data to another STA (e.g., an STA D). That is, the STA B transmits RTS to all nearby STAs, and only the STA A having data to be actually transmitted transmits CTS. The STA C receives only the RTS and does not receive the CTS of the STA A, and thus can know that the STA A is located out of a carrier sensing range of the STA C.

Power Management

In the aforementioned WLAN system, an STA has to perform channel sensing before performing transmission/reception, which causes persistent power consumption of the STA. Power consumption in a reception state is not significantly different from power consumption in a transmission state, and maintaining the reception state persistently is a great burden to an STA with limited power (i.e., operating by a battery). Therefore, if the STA maintains a reception waiting state to persistently sense a channel, power may be inefficiently consumed without a special benefit in terms of a WLAN throughput. In order to solve such a problem, the WLAN system supports a power management (PM) mode of the STA.

The PM mode of the STA is divided into an active mode and a power save (PS) mode. The STA operates in the active mode by default. The STA operating in the active mode maintains an awake state. The awake state is a state where a normal operation such as frame transmission/reception, channel scanning, or the like is possible. Meanwhile, an STA operating in the PS mode operates while switching a sleep state (or doze state) and the awake state. The STA operating in the sleep state operates with minimum power, and does not perform channel scanning not to mention frame transmission/reception.

Power consumption decreases when the STA operates in the sleep state as long as possible, and thus an operating duration of the STA increases. However, since frame transmission/reception is impossible in the sleep state, it is not possible to operate unconditionally for long. In the presence of a frame to be transmitted to the AP by the STA operating in the sleep state, a frame may be transmitted by switching to the awake state. Meanwhile, in the presence of a frame to be transmitted to the STA by the AP, the STA in the sleep state cannot receive this and cannot know the presence of the frame to be received, either. Therefore, the STA may require an operation of switching to the awake state according to a specific period in order to know whether there is a frame to be transmitted to the STA (or in order to receive the frame in the presence of the frame).

The AP may transmit a beacon frame to the STAs in a BSS with a specific period. A traffic indication map (TIM) information element may be included in the beacon frame. The TIM information element may include information indicating that the AP has buffered traffic for STAs associated with the AP and will transmit the frame. An example of the TIM element includes a TIM used to report a unicast frame and a delivery traffic indication map (DTIM) used to report a multicast or broadcast frame.

Figure 7:
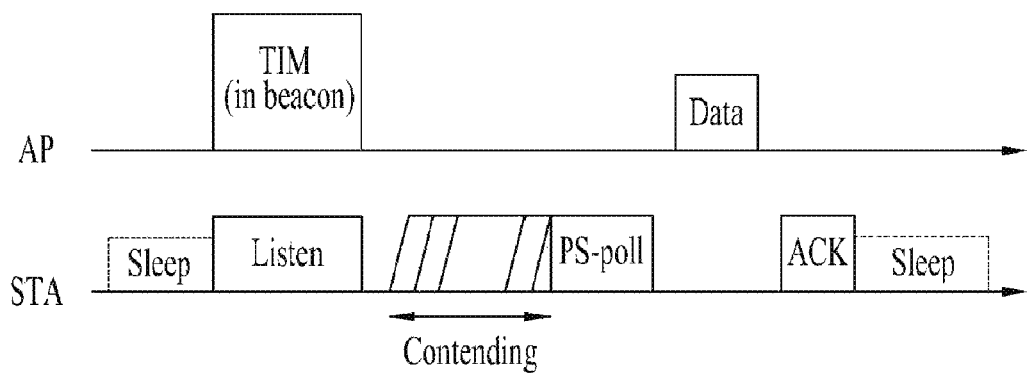
FIG. 7 to FIG. 9 are drawings for explaining in detail an operation of an STA which has received a TIM.
Figure 8:
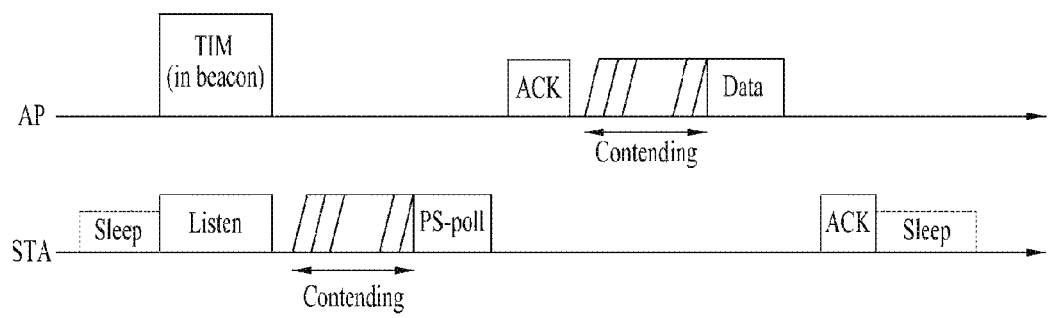
Figure 9:
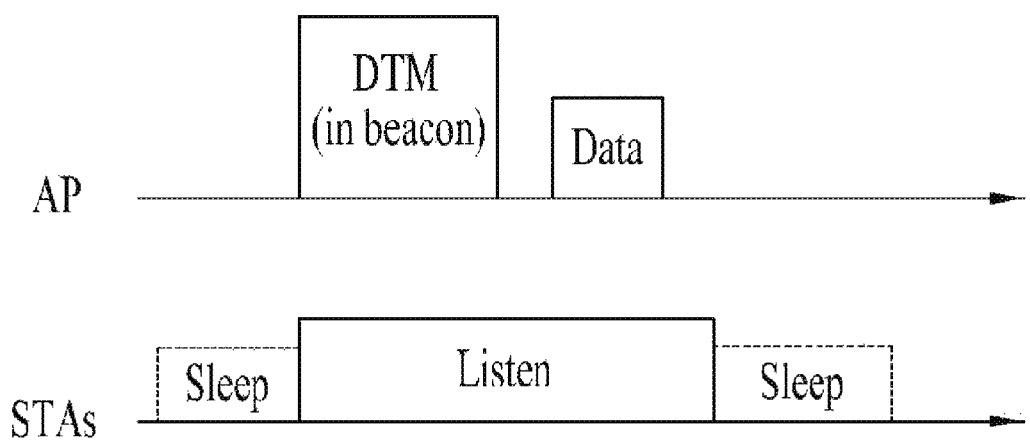

FIG. 7 to FIG. 9 are drawings for explaining in detail an operation of an STA which has received a TIM.

Referring to FIG. 7, in order to receive a beacon frame including a TIM from an AP, an STA may switch from a sleep state to an awake state, and may interpret a received TIM element to know that there is buffered traffic to be transmitted to the STA. After contending with other STAs to access a medium for PS-poll frame transmission, the STA may transmit a PS-poll frame to request the AP to transmit a data frame. The AP which has received the PS-poll frame transmitted by the STA may transmit the frame to the STA. The STA may receive a data frame and transmit an ACK frame for this to the AP. Thereafter, the STA may switch back to the sleep state.

As shown in FIG. 7, the AP may operate in an immediate response manner in which a data frame is transmitted after a specific time (e.g., short inter-frame space (SIFS)) from reception of a PS-poll frame from the STA. Meanwhile, if the AP fails to prepare a data frame to be transmitted to the STA during the SIFS time after reception of the PS-poll frame, the AP may operate in a deferred response manner, which will be described with reference to FIG. 8.

In the example of FIG. 8, an operation in which the STA switches from the sleep state to the awake state to receive a TIM from the AP and transmit a PS-poll frame to the AP through contention is the same as the example of FIG. 7. If the AP fails to prepare the data frame during the SIFS even if the PS-poll frame is received, an ACK frame may be transmitted to the STA instead of transmitting a data frame. When the data frame is prepared after transmitting the ACK frame, the AP may transmit a data frame to the STA after performing contending. The STA may transmit the ACK frame to the AP to indicate that the data frame is successfully received, and then may switch to the sleep state.

FIG. 9 shows an example in which an AP transmits a DTIM. STAs may switch from a sleep state to an awake state to receive a beacon frame including a DTIM element from the AP. Through the received DTIM, the STAs may know that a multicast/broadcast frame will be transmitted. The AP may transmit data (i.e., multicast/broadcast frame) directly without an operation of transmitting/receiving a PS-poll frame after transmitting the beacon frame including the DTIM. The STAs may receive data while maintaining the awake state persistently after reception of the beacon frame including the DTIM, and may switch back to the sleep state after data reception is complete.

General Frame Structure

Figure 10:
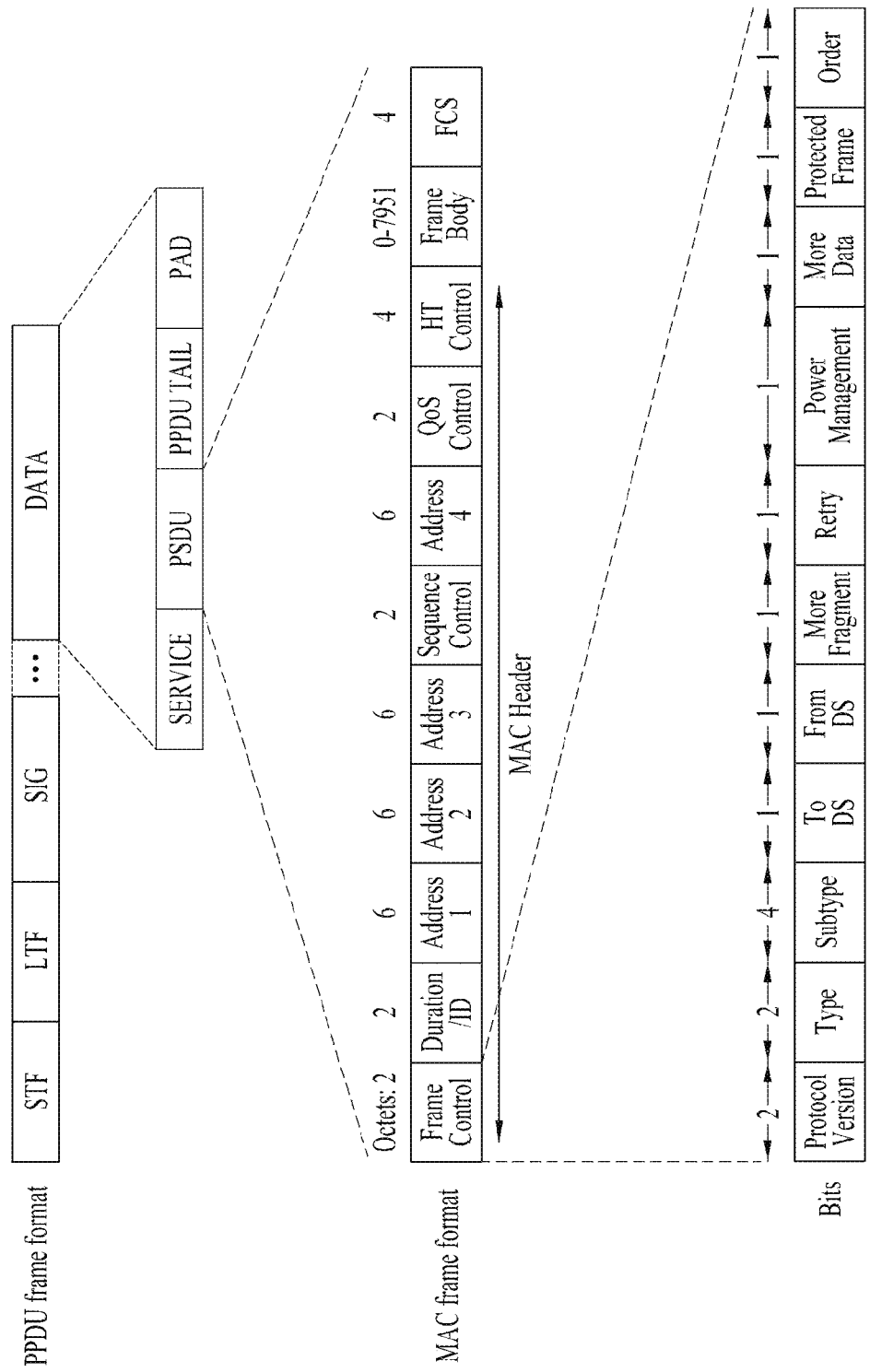
FIG. 10 is a drawing for explaining an example of a frame structure used in an IEEE 802.11 system.

FIG. 10 is a drawing for explaining an example of a frame structure used in an IEEE 802.11 system.

A physical layer protocol data unit (PPDU) frame format may include a short training field (STF), a long training field (LTF), a signal (SIG) field, and a data field. The most basic (e.g., non-high throughput (HT)) PPDU frame format may include only a legacy-STF (L-STF), a legacy-LTF (L-LTF), an SIG field, and a data field.

The STF is a signal for signal detection, automatic gain control (AGC), diversity selection, precise time synchronization, or the like, and the LTF is a signal for channel estimation, frequency error estimation, or the like. The STF and the LTF may be collectively referred to as a PLCP preamble, and the PLCP preamble may be a signal for channel estimation and synchronization of an OFDM physical layer.

The SIG field may include a rate field and a length field or the like. The rate field may include information on a data modulation and coding rate. The length field may include information on a data length. In addition, the SIG field may include a parity bit, an SIG tail bit, or the like.

The data field may include a service field, a physical layer service data unit (PSDU), and a PPDU tail bit, and optionally may include a padding bit. Some bits of the service field may be used for synchronization of a descrambler at a receiving end. The PSDU may include data generated/used in a higher layer, in association with a MAC protocol data unit (MPDU) defined in a MAC layer. The PPDU tail bit may be used to return an encoder to a zero state. The padding bit may be used to adjust a length of the data field to a specific unit.

The MPDU is defined according to various MAC frame formats, and a basic MAC frame consists of a MAC header, a frame body, and a frame check sequence (FCS). The MAC frame may be constructed of an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0-B15). Content included in the duration/ID field may vary depending on a frame type and a sub type, whether it is transmitted during a contention free period (CFP), QoS capability of a transmitting STA, or the like. In a control frame of which a sub type is PS-poll, the duration/ID field may include an AID of a transmitting STA (e.g., through 14 LSB bits), and 2 MSB bits may be set to 1. (ii) In frames transmitted during a CFP by a point coordinator (PC) or a non-QoS STA, the duration/ID field may be set to a fixed value (e.g., 32768). (iii) In addition thereto, in other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, it indicates that the duration/ID field is used to indicate a TXOP duration, and B0-B14 may be used to indicate an actual TXOP duration. The actual TXOP duration indicated by the B0-B14 may be any one of 0-32767, and a unit thereof may be a microsecond (us). However, if the duration/ID field indicates a fixed TXOP duration value (e.g., 32768), it may be set to B15=1 and B0-B14=0. In addition thereto, if it is set to B14=1 and B15=1, the duration/ID field is used to indicate an AID, and B0-B13 indicate one AID in the range of 1-2007. Details of Sequence Control, QoS Control, and HT Control subfields of a MAC header may refer to the IEEE 802.11 standard document.

A frame control field of the MAC header may include Protocol Version, Type, Subtype, To DS, From DS, More Fragment, Retry, Power Management, More Data, Protected Frame, and Order subfields. Details of each subfield of the frame control field may refer to the IEEE 802.11 standard document.

Wake-Up Radio (WUR)

First, a wake-up radio receiver (WURx) compatible with a WLAN (e.g., 802.11) will be described in general with reference to FIG. 11.

Figure 11:
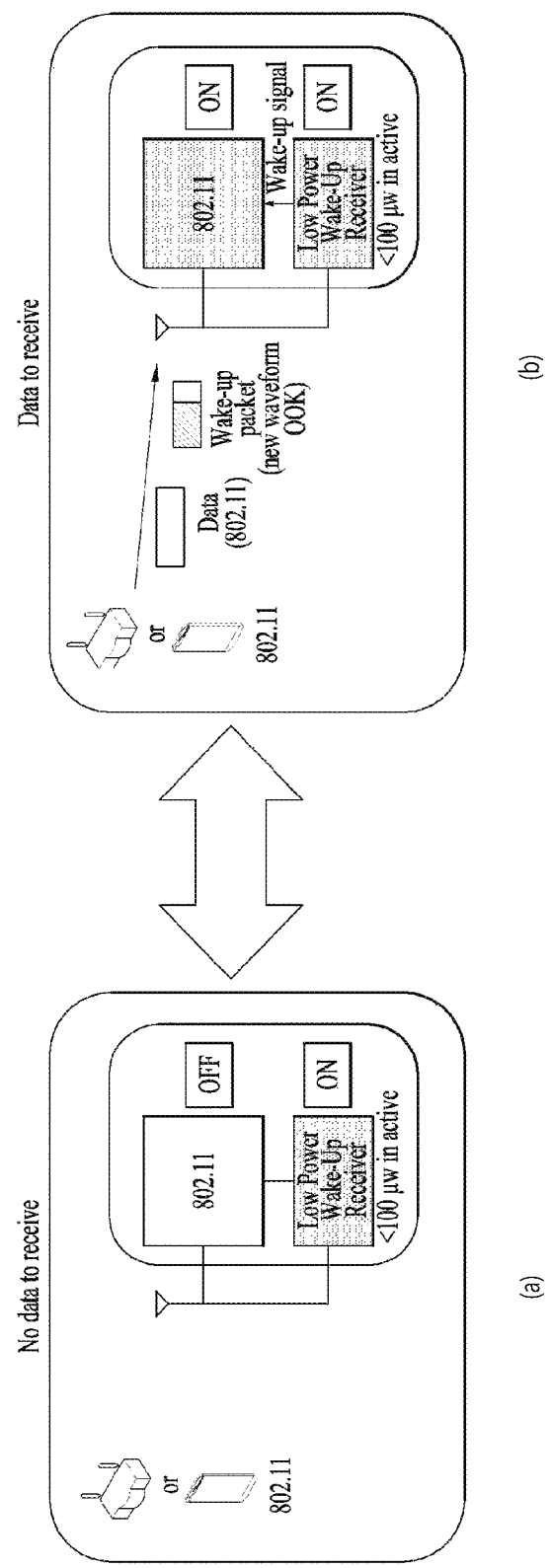
FIG. 11 illustrates a WUR receiver available for a WLAN system (e.g., 802.11).

Referring to FIG. 11, a STA may support a primary connectivity radio (PCR, e.g., IEEE 802.11a/b/g/n/ac/ax WLAN) for main wireless communication and a wake-up radio (WUR, e.g., IEEE 802.11ba).

The PCR may be used for data transmission and reception and may be turned off when there is no data to transmit or receive. When there is a packet to receive with the PCR turned off, a WURx of the STA may wake up the PCR. Accordingly, user data is transmitted and received through the PCR.

The WURx may not be used for user data but may function only to wake up a PCR transceiver. The WURx may be a simple receiver having no transmitter and is activated while the PCR is turned off. The desired power consumption of the WURx which is activated does preferably not exceed 100 microwatt (uW). For the WURx to operate with low power, a simple modulation scheme, for example, on-off keying (OOK), may be used, and a narrow bandwidth (e.g., 4 MHz or 5 MHz) may be used. The desired reception range (e.g., distance) of the WURx may currently correspond to that in 802.11.

Figure 12:
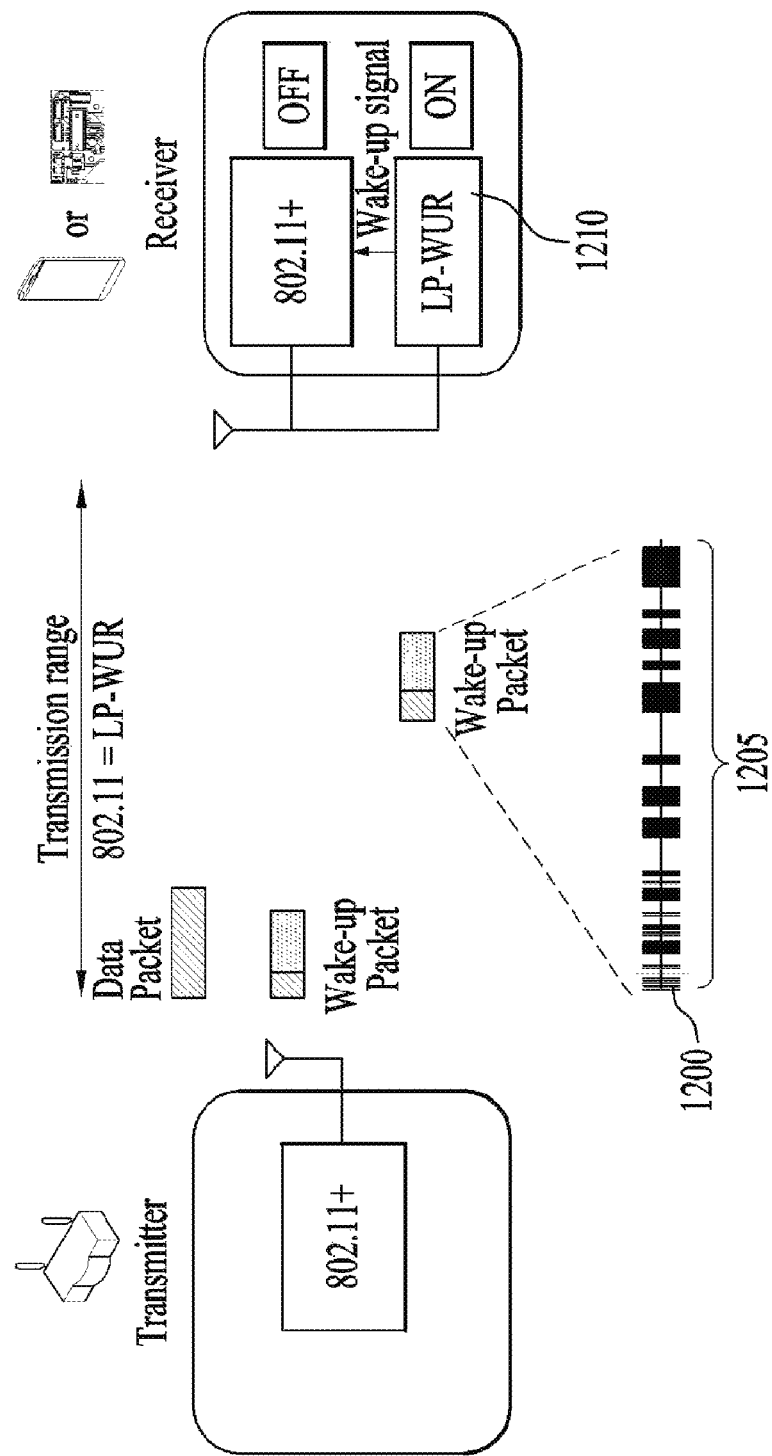
FIG. 12 illustrates the operation of a WUR receiver.

FIG. 12 illustrates the design and operation of a WUR packet.

Referring to FIG. 12, a WUR packet may include a PCR part 1200 and a WUR part 1205.

The PCR part 1200 is for coexistence with a legacy WLAN system and may also be referred to as a WLAN preamble. To protect the WUR packet from another PCR STA, at least one of an L-STF, an L-LTF, and an L-SIG for a legacy WLAN may be included in the PCR part 1200. Thus, a third-party legacy STA may identify through the PCR part 1200 of the WUR packet that the WUR packet is not intended for the third-party legacy STA and a PCR medium is occupied by another STA. Here, a WURx does not decode the PCR part of the WUR packet, because the WURx supporting narrowband and OOK demodulation does not support receiving a PCR signal.

At least part of the WUR part 1205 may be modulated by OOK. For example, the WUR part may include at least one of a WUR preamble, an MAC header (e.g., a receiver address), a frame body, and a frame check sequence (FCS). OOK modulation may also be performed by modifying an OFDM transmitter.

As described above, the WURx 1210 consumes a very small power of 100 uW or less and may be configured as a small and simple OOK demodulator.

Since the WUR packet needs designing to be compatible in a WLAN system, the WUR packet may include a legacy WLAN preamble (e.g., an OFDM scheme) and a new LP-WUR packet waveform (e.g., OOK modulation).

Figure 13:
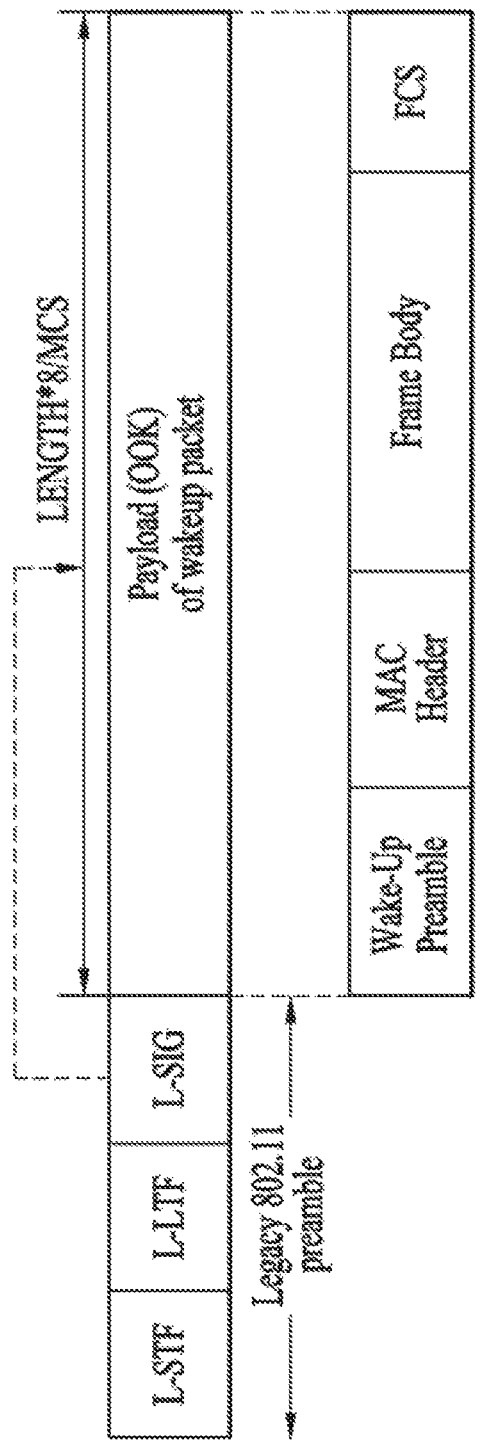
FIG. 13 illustrates an example of a WUR packet.

FIG. 13 illustrates an example of a WUR packet. The WUR packet illustrated in FIG. 13 includes a PCR part (e.g., a legacy WLAN preamble) for coexistence with a legacy STA.

Referring to FIG. 13, the legacy WLAN preamble may include an L-STF, an L-LTF, and an L-SIG. A WLAN STA (e.g., a third party) may detect the start of the WUR packet through the L-STF. Further, the WLAN STA (e.g., a third party) may identify the end of the WUR packet through the L-SIG. For example, the L-SIG field may indicate the length of a payload (e.g., OOK-modulated) of the WUR packet.

The WUR part may include at least one of a WUR preamble, an MAC header, a frame body, and an FCS. The WUR preamble may include, for example, a PN sequence. The MAC header may receive a receiver address. The frame body may include other information necessary for wake-up. The FCS may include a cyclic redundancy check (CRC).

Figure 14:
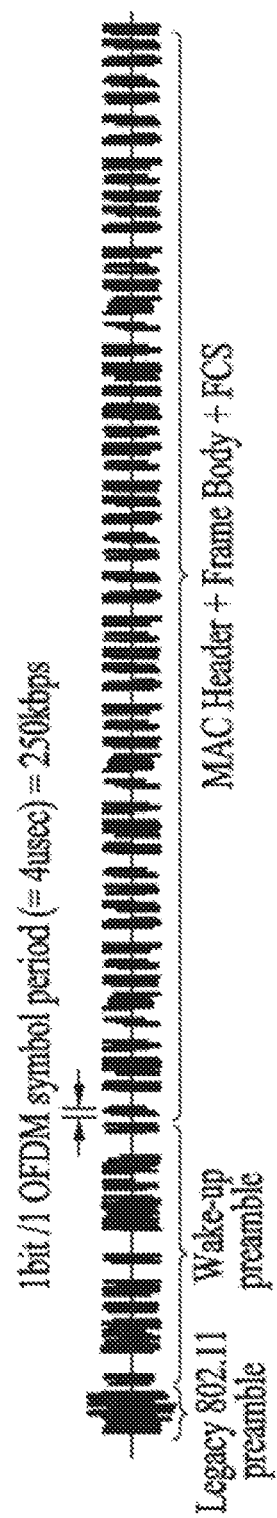
FIG. 14 illustrates the waveform of a WUR packet.

FIG. 14 illustrates the waveform of the WUR packet illustrated in FIG. 13. Referring to FIG. 14, the OOK-modulated WUR part may transmit one bit for the length of one OFDM symbol (e.g., 4 usec). Therefore, the data rate of the WUR part may be 250 Kbps.

Figure 15:
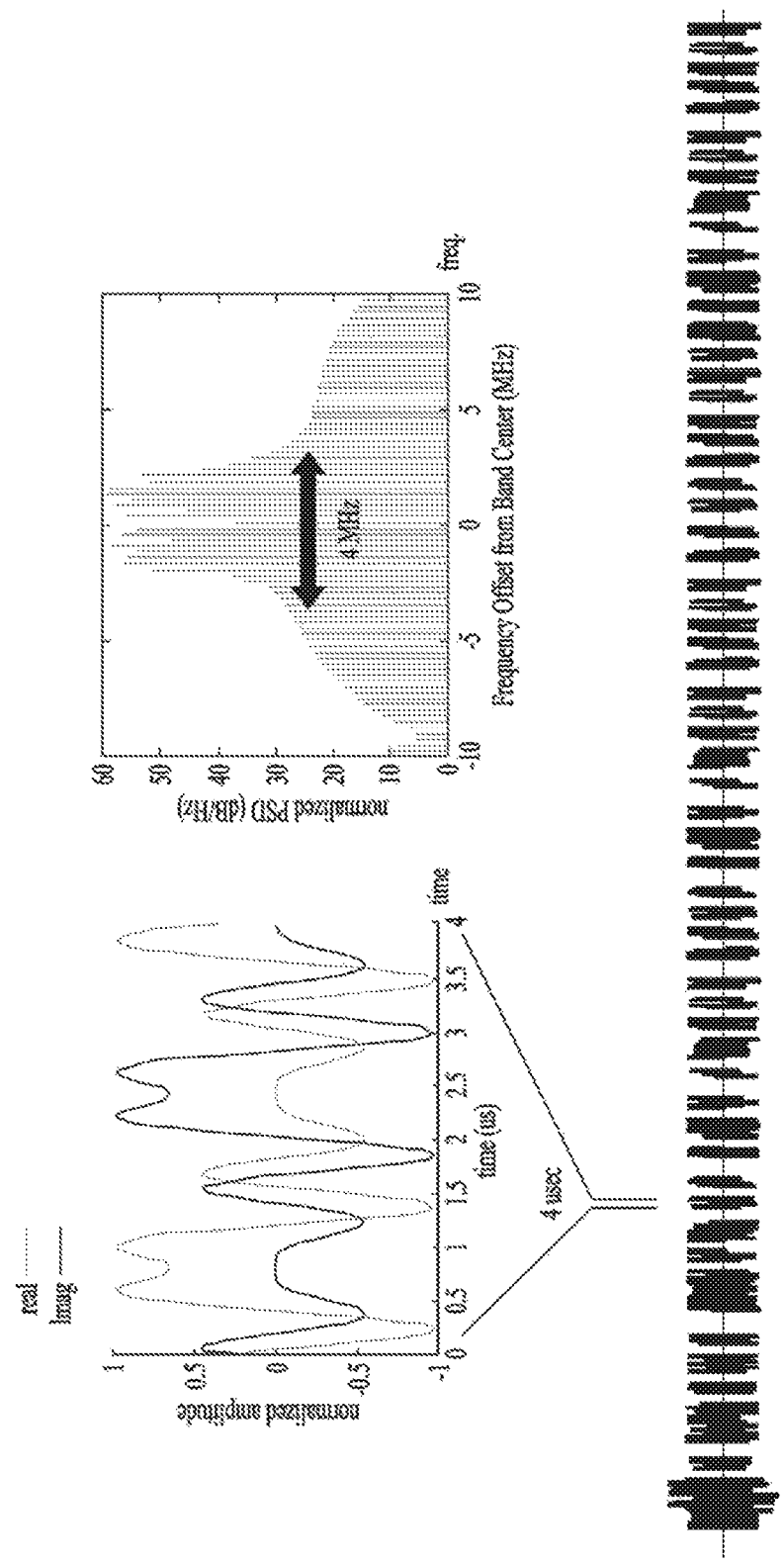
FIG. 15 illustrates a WUR packet generated using an OFDM transmitter of a WLAN.

FIG. 15 illustrates a WUR packet generated using an OFDM transmitter of a WLAN. A phase-shift keying (PSK)-OFDM transmission scheme is used in the WLAN, in which case generating a WUR packet by adding an OOK modulator for OOK modulation may cause an increase in costs for configuring a transmitter. Thus, a method of generating an OOK-modulated WUR packet reusing an OFDM transmitter is illustrated.

According to an OOK modulation scheme, a bit value of 1 is modulated into a symbol having a power of a threshold value or higher (i.e., an on-symbol), and a bit value of 0 is modulated into a symbol having a power of less than the threshold value (i.e., an off-symbol). On the contrary, it is also possible to define a bit value of 1 as power-off.

In the OOK modulation scheme, a bit value of I/O is indicated through power-on/off at the position of a symbol. This simple OOK modulation/demodulation scheme can reduce power consumed for signal detection/demodulation of a receiver and can reduce costs for implementing signal detection/demodulation. Further, OOK modulation of turning on/off a signal may also be performed reusing an existing OFDM transmitter.

A left graph in FIG. 15 illustrates a real part and an imaginary part of the normalized amplitude of a bit value of 1, which is OOK-modulated reusing the existing OFDM transmitter of the WLAN, during a one-symbol interval (e.g., 4 usec). The result of OOK modulation of a bit value of 0 corresponds to power-off and thus is not shown.

A right graph of FIG. 15 illustrates the normalized power spectral density (PSD) of a bit value of 1, which is OOK-modulated reusing the existing OFDM transmitter of the WLAN, in a frequency domain. For example, central 4 MHz in a band may be used for a WUR. Although FIG. 15 shows that the WUR operates at a 4 MHz bandwidth, which is for convenience of description, a different frequency band may be used. Here, it is preferable that the WUR operates at a bandwidth smaller than the operating bandwidth of a PCR (e.g., an existing WLAN) in consideration of power saving.

In FIG. 15, it is assumed that subcarrier spacing is 312.5 kHz, and the bandwidth of an OOK pulse corresponds to 13 subcarriers. As mentioned above, 13 subcarriers correspond to about 4 MHz (i.e., 4.06 MHz=13*312.5 kHz).

Defining an input sequence of inverse fast Fourier transform (IFFT) as s={13 subcarrier tone sequence}, the existing OFDM transmitter performs IFFT on the sequence s by Xt=IFFT(s) and attaches a cyclic prefix (CP) with a 0.8 sec length to the sequence, thereby obtaining a symbol having a length of about 4 us.

A WUR packet may also be referred to as a WUR packet, a WUR frame, or a WUR PPDU. A WUR packet may be a packet for broadcast/multicast (e.g., a WUR beacon) or a packet for unicast (e.g., a packet to terminate a WUR mode of a particular WUR STA and to wake up the WUR STA).

Figure 16:
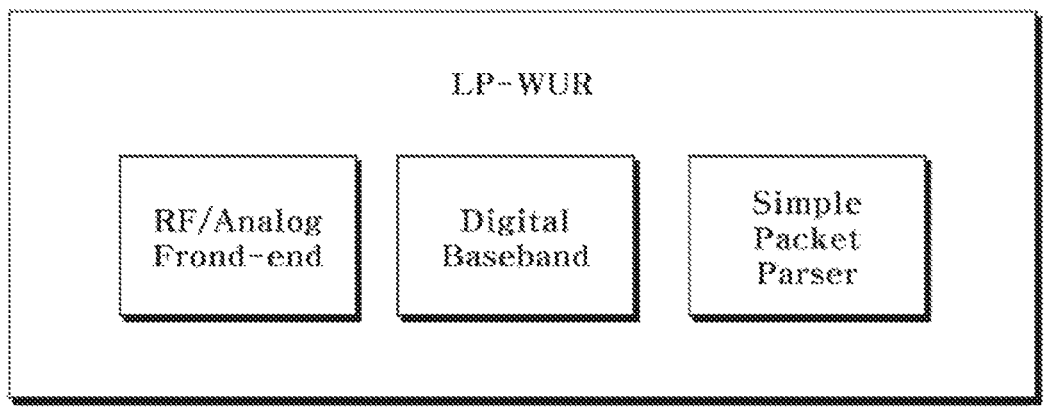
FIG. 16 illustrates the structure of a WUR receiver.

FIG. 16 illustrates the structure of a WUR receiver (WURx). Referring to FIG. 16, the WURs may include an RF/analog front end, a digital baseband processor, a simple packet parser. FIG. 16 shows an illustrative configuration, and a WURx according to the present invention is not limited to FIG. 16.

Hereinafter, a WLAN STA having a WURx is referred to simply as a WUR STA.

Manchester Coding Using OOK Modulation and Symbol Reduction

Manchester coding using OOK modulation, and symbol reduction available for some embodiments of the present invention will be described.

Manchester coding is a type of digital encoding, in which voltage transitions occur at the midpoint of each bit time when one bit is transmitted. A Manchester code is obtained by a method of transitioning binary values of 0 and 1 respectively to a positive voltage value and a negative voltage value. Specifically, 0 may be expressed by high-low, 1 may be expressed by low-high, and vice versa.

Hereinafter, the use of Manchester coding for OOK modulation available for some embodiments of the present invention is described. In the following description, 0 and 1 are expressed respectively by particular symbols but are not limited thereto, and the relationship therebetween may be reversed. Further, numerical values are provided for illustrative purposes and are not intended to limit the scope of the invention.

An information bit of 0 may correspond to "1 0" in Manchester coding. Specifically, in a time domain, a sub-signal bit of 1 may be disposed for first 1.6 usec, and a sub-signal bit of 0 may be disposed for last 1.6 usec. Further, as described above, a CP having a length of 0.8 usec may be disposed subsequently.

A sequence having a length of K for generating the sub-signal bit of 1, s1:[1,K], may be obtained by setting even-numbered coefficients of the sequence to 0 and setting odd-numbered coefficients to 1. The sequence may be mapped to a portion of an OFDM sequence including 64 subcarriers by the OFDM transmitter. For example, the sequence s1 may be mapped to a sequence corresponding to sequence indexes 33−floor(K/2):33+floor(K/2)−1.

The OFDM transmitter may define the entire input sequence mapped to the sequence s1 as s={64 subcarrier tone sequence} and may perform IFFT on the sequence s by Xt=IFFT(s), thereby obtaining a time-domain signal. The sequence s1 has nonzero coefficients at intervals of two coefficients, and thus the result of the IFFT is a 1.6 usec periodic signal. The obtained 1.6 usec periodic signal may be used as a signal for a sub-signal bit of 1 of a Manchester code.

A sequence having a length of K for generating the sub-signal bit of 0, s2:[1,K], may be obtained by setting the entire sequence to 0. The sequence s2 may be mapped to an OFDM sequence including 64 subcarriers by the OFDM transmitter. For example, the sequence s2 may be mapped to a sequence corresponding to sequence indexes 33−floor(K/2):33+floor(K/2)−1.

The OFDM transmitter may define the entire input sequence mapped to the sequence s2 as s={64 subcarrier tone sequence} and may perform IFFT on the sequence s by Xt=IFFT(s), thereby obtaining a time-domain signal. The sequence s2 has only coefficients of 0, and thus the result of the IFFT is a signal of 0. Among the obtained signals, a 1.6 usec signal may be used as a signal for a sub-signal bit of 0 of a Manchester code.

An information bit of 1 may correspond to "0 1" in Manchester coding, and a time-domain signal corresponding to the information bit of 1 may be obtained by the same method as used above for generating the information bit of 0. K may be set to, for example, 32.

The illustrated relationship between the information bits of 1 and 0 and "1 0" and "0 1" may be reversed.

In some embodiments of the present invention, one WUR packet may be configured as a time-domain signal of 1.6 usec, 0.8 usec, or 0.4 usec plus a CP by a symbol reduction scheme.

In one embodiment, the OFDM transmitter may generate a 0.8 sec WUR packet for an information bit of 1. A sequence having a length of K for generating the information bit of 1, s1: [1: K], may be obtained by putting 0 to a coefficient other than an idx-th coefficient satisfying mod (Idx, 4)=1 in the sequence. As a result, the sequence s1 has nonzero coefficients at intervals of four coefficients.

The sequence s1 may be mapped to an OFDM sequence including 64 subcarriers by the OFDM transmitter. For example, the sequence s1 may be mapped to a sequence corresponding to sequence indexes 33−floor(K/2):33+floor(K/2)−1. The OFDM transmitter may define the entire input sequence mapped to the sequence s1 as s={64 subcarrier tone sequence} and may perform IFFT on the sequence s by Xt=IFFT(s), thereby obtaining a time-domain signal.

Since the sequence s1 has nonzero coefficients at intervals of four coefficients, the result of the IFFT is a 0.8 usec periodic signal. Here, the obtained 0.8 usec periodic signal may be used as a signal for the information bit of 1 for 0.8 usec symbol reduction.

The OFDM transmitter may generate a 0.8 sec WUR packet for an information bit of 0. A sequence having a length of K for generating the information bit of 0, s2:[1:K], may be obtained by setting all sequence coefficients to 0. The sequence s2 may be mapped to an OFDM sequence including 64 subcarriers by the OFDM transmitter. For example, the sequence s2 may be mapped to a sequence corresponding to sequence indexes 33−floor(K/2):33+floor(K/2)−1.

The OFDM transmitter may define the entire input sequence mapped to the sequence s2 as s={64 subcarrier tone sequence} and may perform IFFT on the sequence s by Xt=IFFT(s), thereby obtaining a time-domain signal. Since the sequence s2 has only coefficients of 0, the result of the IFFT is a signal of 0. Among the obtained signals, a 0.8 usec signal may be used as a signal for the information bit of 0 for 0.8 usec symbol reduction.

In another embodiment, the OFDM transmitter may generate a 0.4 sec WUR symbol for an information bit of 1. A signal for the information bit for 0.4 usec symbol reduction may be obtained by putting 0 to a coefficient other than an idx-th coefficient satisfying mod(Idx, 8)=1 in the sequence s1 as illustrated above in 0.8 usec symbol reduction. Accordingly, the OFDM transmitter may obtain a 0.4 sec signal, which may be used as a signal for the information bit for 0.4 usec symbol reduction.

Hereinafter, a method of determining a sequence for an AP to transmit a WUR symbol using the foregoing sequence designs will be described in detail.

When all sequence coefficients are set to 1 in a process for producing an on-WUR packet symbol according to OOK modulation, a transmission channel has a high PAPR [dB]. A high PAPR is fatal to the design of a wireless communication system.

To solve this problem, the present invention proposes a WUR packet sequence to enable the entire transmission channel to have a low PAPR.

A PAPR measurement result illustrated below is obtained by applying 256 point IFFT for convenience, but the present invention is not limited to this measured value. Further, each proposed sequence and calculation result are provided for illustrative purposes and are not intended to limit the scope of the present invention.

A total of 64 subcarriers may be configured to transmit an OFDM symbol. Therefore, an AP may use positional indexes from −32 to 31 in order to indicate the position of each subcarrier.

FIG. 17 illustrates a guard subcarrier (guard tone) in a subcarrier spectrum.

An AP may dispose guard subcarriers for protecting an OFDM signal at the left edge and the right edge of a total of 64 subcarriers. In FIG. 17, (a) illustrates the arrangement of guard subcarriers that can be applied to an IEEE 802.11a system, and (b) illustrates the arrangement of guard subcarriers that can be applied to an IEEE 802.11ac system.

The IEEE 802.11a system uses six left subcarriers and five right subcarriers as guard subcarriers, and the IEEE 802.11ac system uses four left subcarriers and three right subcarriers as guard subcarriers.

An AP supporting the IEEE 802.11a system may map a WUR packet sequence to subcarrier indexes [−26:26] according to this arrangement of guard subcarriers. Likewise an OFDM transmitter of the IEEE 802.11ac system may map a WUR packet sequence to subcarrier indexes [−28:28] according to this arrangement of guard subcarriers.

Hereinafter, for convenience, embodiments of the present invention are described as being applied to the guard frequency configuration of the IEEE 802.11a or IEEE 802.11ac system, but the embodiments of the present invention are not limited to these arrangements of guard subcarriers.

According to IEEE 80211.ac, a VHT-LTF sequence is present as a sequence having a length of 57 represented by Equation 2 VHT-STF.

$$VHTSTF(-28:28)=sqrt(\tfrac{1}{2})*(0,0,0,0,1+j,0,0,0,-1-j,0,\\0,0,1+j,0,0,0,-1-j,0,0,0,-1-j,0,0,0,1+j,0,0,0,0,0,\\0,0,-1-j,0,0,0,-1-j,0,0,0,1+j,0,0,0,1+j,0,0,0,1+j,\\0,0,0,1+j,0,0,0,0] \quad \text{[Equation 2]}$$

The following embodiments specifically illustrate a method in which an AP determines a subcarrier sequence for transmitting a WUR symbol reusing a VHT-STF or VHT-LTF specified in IEEE 802.11ac.

Embodiment 1-1

When the OFDM transmitter generates a sequence using a narrowband which is a portion of a wideband signal, a coefficient of a sequence corresponding to the index of a subcarrier other than a subcarrier mapped to a WUR packet sequence may be set to 0.

For example, when the AP transmits a WUR symbol using a 10 MHz narrowband signal, 32 subcarriers corresponding to 10 MHz may be mapped to the entire 20 MHz wideband signal. For example, in the 802.11ac system, subcarriers for a WUR packet may be mapped to 32 consecutive subcarriers among subcarriers indexed with [−28:28]. In one example, subcarriers for transmitting a WUR packet may be transmitted, being mapped to subcarrier indexes of [−16:15]. Here, coefficients of the sequence other than coefficients corresponding to indexes of [−16:15] are set to 0. That is, in this example, coefficients of the sequence corresponding to [−28:17] and [16:28] may be set to 0.

Hereinafter, a method of determining a sequence per frequency for WUR packet transmission reusing a VHT-LTF sequence will be described.

A WUR packet sequence may be determined by utilizing a VHT-LTF sequence in which central 0, used for a DC tone, is used as it is or may be determined to be a sequence having a lower PAPR after obtaining the PAPR with a DC tone fixed to 1 or −1.

Table 1 illustrates PAPR results measured when the AP transmits a 20 MHz WUR packet using OOK modulation.

TABLE 1

Seq[−28:28] = ± [1,1,1,1,−1,−1,1,1,−1,1,−1,1,1,1,1,1,1,1,−1,−1,1,1,−1,1,−1,−1,1,1,1,1,0,1,−1,−1,1,1,−1,1,1,−1,−1,−1,−1,−1,1,1,1,−1,−1,1,1,−1,1,1,1,1,1,1,−1,−1]

PAPR[dB] : 3.5766

Seq[−28:28] = ± [1,1,1,1,−1,−1,1,1,−1,1,−1,1,1,1,1,1,1,1,−1,−1,1,1,−1,1,−1,−1,1,1,1,1,1,1,1,−1,−1,1,1,−1,1,1,−1,−1,−1,−1,−1,1,1,1,−1,−1,1,1,−1,1,1,1,1,1,1,−1,−1]

PAPRfdB] : 3.3794

Embodiment 1

A sequence for transmitting a WUR symbol may be generated by reusing.

According to IEEE 802.11ac, a 20 MH VHT-LTF sequence is present as a sequence having a length of 57 represented by Equation 1.

$$VHTLTF(-28:28)=[1,1,1,1,-1,-1,1,1,-1,1,-1,1,1,1,1,\\1,1,-1,-1,1,1,-1,1,-1,1,1,1,1,0,1,-1,-1,1,1,-1,\\1,-1,1,-1,1,-1,-1,1,1,1,-1,-1,1,1,-1,1,1,1,1,1,\\1,-1,-1] \quad \text{[Equation 1]}$$

When Manchester coding using OOK modulation is used for transmitting a 20 MHz WUR packet, the WUR packet sequence may be determined to be a sequence having a low PAPR obtained by applying a full search of randomly removing coefficients at both sides to a sequence having a length of 64 resulting from insertion of 0s into a 10 MHz OOK WUR packet sequence having a length of 32 at intervals.

Table 2 illustrates PAPR results measured when the AP transmits a 20 MHz WUR packet using Manchester coding using OOK modulation.

TABLE 2

Seq[−28:28] = ± [ 1,0, 1,0, −1,0, −1,0, 1, 0, 1,0, −1,0, 1,0, −1,0, 1,0, 1,0, 1,0, 1,0,
1,0, 1,0, −1,0, −1,0, 1, 0, 1, 0, −1,0, 1,0, −1,0, 1,0, −1,0, −1,0, −1,0, −1,0, −1,0, 1 ]
PAPR[dB] : 3.8199
Seq[−28:28] = ± [1,0, 1,0, −1,0, 1,0, −1,0, 1,0, 1,0, 1,0, 1,0, 1,0, 1,0, −1,0, −1,0,
1,0, 1,0, −1,0, 1,0, −1,0, 1,0, −1,0, −1,0, −1,0, −1,0, −1,0, 1,0, 1,0, −1,0, −1,0, 1 ]
PAPR[dB] : 3.8199

Hereinafter, determination of a sequence for transmitting a 10 MHz WUR packet will be described.

When OOK modulation is used for WUR symbol transmission, a sequence having the lowest PAPR among continuous sequences having a length of 32 in a WUR sequence having a length of 57 may be determined as a sequence for transmitting a 10 MHz WUR packet.

Further, a WUR packet sequence may be determined by disposing the WUR packet sequence having a length of 32 such that index k=0 and using central 0, used as a DC tone as it is or may be determined to be a sequence having a lower PAPR after obtaining the PAPR with a DC tone fixed to 1 or −1.

Table 3 illustrates PAPR results measured when the AP transmits a 10 MHz WUR packet using OOK modulation.

TABLE 3

Seq[−28:28] = ± [ 0, 0, 0, 0, 0, 0, 0, 0, 0, 0, 0, 0, 0, 1, 1,1,−1, −1,1, 1,−1, 1, −1,1,1, 1, 1, 1,1, 0,
−1,1, 1, −1, 1,−1, 1, −1,−1,−1,−1, −1, 1,1,−1, 0, 0, 0, 0, 0, 0, 0, 0, 0, 0, 0, 0, 0]
PAPR [dB]: 3.5656
Seq[−28:28] = ± [ 0, 0, 0, 0, 0, 0, 0, 0, 0, 0, 0, 0, 0, 1, 1,1,−1, −1,1, 1,−1, 1, −1, 1, 1, 1, 1, 1, 1,
−1, −1,1, 1, −1, 1,−1, 1, −1,−1,−1,−1, −1, 1,1,−1, 0, 0, 0, 0, 0, 0, 0, 0, 0, 0, 0, 0, 0]
PAPR [dB]: 3.6458
Seq[−28:28] = ± [0, 0, 0, 0, 0, 0, 0, 0, 0, 0, 0, 0, 0, −1,−1,1, 1, −1,1,−1, 1, 1, 1,1, 1, 1,−1,−1,1, 0,
−1,1,−1, 1,−1,−1,−1, −1,−1, 1, 1, −1,−1,1,−1, 0, 0, 0, 0, 0, 0, 0, 0, 0, 0, 0, 0, 0] ;
PAPR [dB]: 4.7194
Seq[−28:28] = ± [0, 0, 0, 0, 0, 0, 0, 0, 0, 0, 0, 0, 0, −1,−1,1, 1, −1,1,−1, 1, 1, 1,1, 1, 1,−1,−1,1, 1,
−1,1,−1, 1,−1,−1,−1, −1,−1, 1, 1, −1,−1,1,−1, 0, 0, 0, 0, 0, 0, 0, 0, 0, 0, 0, 0, 0] ;
PAPR [dB] : 3.6458
Seq[−28:28]= ± [0, 0, 0, 0, 0, 0, 0, 0, 0, 0, 0, 0, −1,−1,1, 1, −1,1,−1, 1, 1, 1,1, 1, 1,−1,−1,1, 1,−
1,1,−1, 1,−1,−1,−1, −1,−1, 1, 1, −1,−1,1,−1, 0, 0, 0, 0, 0, 0, 0, 0, 0, 0, 0, 0, 0]
PAPR [dB]: 3.6458
Seq[−28:28] = ± seq= [0, 0, 0, 0, 0, 0, 0, 0, 0, 0, 0, 0, −1,−1,1, 1, −1,1,−1, 1, 1, 1,1, 1, 1,−1,−
1,1, 0, −1,1,−1, 1,−1,−1,−1, −1,−1, 1, 1, −1,−1,1,−1, 0, 0, 0, 0, 0, 0, 0, 0, 0, 0, 0, 0, 0];
PAPR [dB]: 4.7194
Seq[−28:28] = ± [ 0, 0, 0, 0, 0, 0, 0, 0, 0, 0, 0, 0, 0, 1, 1,1,−1, −1,1, 1,−1, 1, −1,1,1, 1, 1, 1,0, −
1, −1,1, 1, −1, 1,−1, 1, −1,−1,−1,−1, −1, 1,1,−1, 0, 0, 0, 0, 0, 0, 0, 0, 0, 0, 0, 0, 0]
PAPR [dB]: 4.7194
Seq[−28:28] = ± [0, 0, 0, 0, 0, 0, 0, 0, 0, 0, 0, 0, 0, −1,−1,1, 1, −1,1,−1, 1, 1, 1,1, 1, 1,−1,−1,0,
1, −1,1,−1, 1,−1,−1,−1, −1,−1, 1, 1, −1,−1,1,−1, 0, 0, 0, 0, 0, 0, 0, 0, 0, 0, 0, 0, 0] ;
PAPR [dB]: 3.5656
Seq[−28:28] = ± [ 0, 0, 0, 0, 0, 0, 0, 0, 0, 0, 0, 0,0, 1, 1,1,−1, −1,1, 1,−1, 1, −1,1,1, 1, 1, 1,1, −
1,−1,1, 1, −1, 1,−1, 1, −1,−1,−1,−1, −1, 1,1,−1, 0, When Manchester coding using OOK modulation is used for transmitting a 10 MHz WUR packet, the WUR packet sequence may be set to a sequence resulting from insertion of 0s into a 5 MHz OOK sequence having a length of 16 at intervals.

Table 4 illustrates PAPR results measured when the AP transmits a 10 MHz WUR packet using OOK modulation.

TABLE 4

Seq[−28:28] = ± [0, 0, 0, 0, 0, 0, 0, 0, 0, 0, 0, 0, 0, −1, 0, −1,0, 1,0, 1,0, −1,0, 1,0, −1,0,
1,0, 1,0, 1,0, 1,0, 1,0, 1,0, −1,0, −1,0, 1, 0, 0, 0, 0, 0, 0, 0, 0, 0, 0, 0, 0, 0, 0 ]
PAPR[dB] : 2.8418
Seq[−28:28] = ± [0, 0, 0, 0, 0, 0, 0, 0, 0, 0, 0, 0, 0, 0, −1, 0, −1,0, 1,0, 1,0, −1,0, 1,0, −1,0,
1,0, 1,0, 1,0, 1,0, 1,0, 1,0, −1,0, −1,0, 1, 0, 0, 0, 0, 0, 0, 0, 0, 0, 0, 0, 0, 0, 0 ]
PAPR[dB] : 2.8418
Seq[−28:28] = ± [0, 0, 0, 0, 0, 0, 0, 0, 0, 0, 0, 0, 0, −1,0, −1,0, 1,0, 1,0, −1,0, 1,0, −
1,0, 1,0, −1,0, −1,0, −1,0, −1,0, −1,0, 1,0, 1,0, −1,0, 0, 0, 0, 0, 0, 0, 0, 0, 0, 0, 0, 0, 0 ]
PAPR [dB] : 2.8418
Seq[−28:28] = ± [0, 0, 0, 0, 0, 0, 0, 0, 0, 0, 0, 0, 0, −1,0, −1,0, 1,0, 1,0, −1,0, 1,0, −
1,0, 1,0, −1,0, −1,0, −1,0, −1,0, −1,0, 1,0, 1,0, −1, 0, 0, 0, 0, 0, 0, 0, 0, 0, 0, 0, 0, 0, 0 ]
PAPR [dB] : 2.8418

Hereinafter, determination of a sequence for transmitting a 5 MHz WUR packet will be described.

A sequence having the lowest PAPR among continuous sequences having a length of 16 may be determined as a WUR packet sequence for 5 MHz transmission by the same method as used for determining the 10 MHz WUR packet sequence.

Further, an OOK sequence may be determined by disposing the sequence having a length of 16 such that index k=0 and using central 0, used as a DC tone as it is or may be determined to be a sequence having a lower PAPR after obtaining the PAPR with a DC tone fixed to 1 or −1. The sequence may be mapped to either [−8:7] or [−7:8].

Table 5 illustrates PAPR results measured when the AP transmits a 5 MHz WUR packet using OOK modulation.

Hereinafter, determination of a sequence for transmitting a 4 MHz WUR packet will be described.

A sequence having the lowest PAPR among continuous sequences having a length of 13 may be determined as an OOK sequence for 4 MHz transmission by the same method as used for determining an OOK WUR packet sequence for 10 MHz WUR symbol transmission.

Further, an OOK sequence may be determined by disposing the sequence having a length of 13 such that index k=0 and using central 0, used as a DC tone as it is or may be determined to be a sequence having a lower PAPR after obtaining the PAPR with a DC tone fixed to 1 or −1. The sequence may be mapped to [−6:6].

Table 7 illustrates PAPR results measured when the AP transmits a 4 MHz WUR packet using OOK modulation.

TABLE 5

Seq[−28:28] = ± [0, 0, 0, 0, 0, 0, 0, 0, 0, 0, 0, 0, 0, 0, 0, 0, 0, 0, 0, 0, 0, −1, −1, 1, 1, −1, 1, −1,1, 1, 1, 1, 1, −1,−1, 1, 0, 0, 0, 0, 0, 0, 0, 0, 0, 0, 0, 0, 0, 0, 0, 0, 0, 0, 0, 0, 0]
PAPR [dB]: 2.8883
Seq[−28:28] = ± [0, 0, 0, 0, 0, 0, 0, 0, 0, 0, 0, 0, 0, 0, 0, 0, 0, 0, 0, 0, 0, −1, −1, 1, 1, −1, 1, −1,1, −1, −1,−1,−1, 1, 1,−1, 0, 0, 0, 0, 0, 0, 0, 0, 0, 0, 0, 0, 0, 0, 0, 0, 0, 0, 0, 0, 0]
PAPR [dB]: 2.8883
Seq[−28:28] = ± [0, 0, 0, 0, 0, 0, 0, 0, 0, 0, 0, 0, 0, 0, 0, 0, 0, 0, 0, 0, 0, −1, −1, 1, 1, −1, 1, −1,1, 0, 1, 1, 1, 1, −1,−1, 1, 0, 0, 0, 0, 0, 0, 0, 0, 0, 0, 0, 0, 0, 0, 0, 0, 0, 0, 0, 0, 0];
PAPR [dB]: 3.3068
Seq[−28:28] = ± [0, 0, 0, 0, 0, 0, 0, 0, 0, 0, 0, 0, 0, 0, 0, 0, 0, 0, 0, 0, 0, −1, −1, 1, 1, −1, 1, −1,1, 0, −1,−1,−1,−1, 1, 1,−1, 0, 0, 0, 0, 0, 0, 0, 0, 0, 0, 0, 0, 0, 0, 0, 0, 0, 0, 0, 0, 0];
PAPR [dB]: 4.5763
Seq[−28:28] = ± [0, 0, 0, 0, 0, 0, 0, 0, 0, 0, 0, 0, 0, 0, 0, 0, 0, 0, 0, 0, 0, −1, −1, 1, 1, −1, 1, −1,1, 1, 1, 1, 1, 1, −1,−1, 1, 0, 0, 0, 0, 0, 0, 0, 0, 0, 0, 0, 0, 0, 0, 0, 0, 0, 0, 0, 0, 0]
PAPR [dB]: 2.8883
Seq[−28:28] = ± [0, 0, 0, 0, 0, 0, 0, 0, 0, 0, 0, 0, 0, 0, 0, 0, 0, 0, 0, 0, 0, −1, −1, 1, 1, −1, 1, −1,1, −1, −1,−1,−1,−1, 1, 1,−1, 0, 0, 0, 0, 0, 0, 0, 0, 0, 0, 0, 0, 0, 0, 0, 0, 0, 0, 0, 0, 0]
PAPR [dB]: 2.8883

When Manchester coding using OOK modulation is used for transmitting a 5 MHz WUR packet, the WUR packet sequence may be determined to be a sequence having a length of 16 resulting from insertion of 0s into a 2.5 MHz OOK WUR packet sequence having a length of 8 at intervals.

Table 6 illustrates PAPR results measured when the AP transmits a 5 MHz WUR packet using Manchester coding using OOK modulation.

TABLE 6

Seq[−28:28] = ± [0, 0, 0, 0, 0, 0, 0, 0, 0, 0, 0, 0, 0, 0, 0, 0, 0, 0, 0, 0, 0, −1, 0,−1, 0, 1, 0, 1, 0,−1, 0, 1, 0,−1, 0, 1, 0, 0, 0, 0, 0, 0, 0, 0, 0, 0, 0, 0, 0, 0, 0, 0, 0, 0, 0, 0, 0 ]
PAPR[dB] : 3.0103
Seq[−28:28] = ± [0, 0, 0, 0, 0, 0, 0, 0, 0, 0, 0, 0, 0, 0, 0, 0, 0, 0, 0, 0, 0, −1, 0,−1, 0, 1, 0, 1, 0,−1, 0, 1, 0,−1, 0,1, 0, 0, 0, 0, 0, 0, 0, 0, 0, 0, 0, 0, 0, 0, 0, 0, 0, 0, 0, 0, 0, 0]
PAPR[dB] : 3.0103
Seq[−28:28] = ± [0, 0, 0, 0, 0, 0, 0, 0, 0, 0, 0, 0, 0, 0, 0, 0, 0, 0, 0, 0, 0, 1, 0, 1, 0,−1, 0, 1, 0,−1, 0, 1, 0, 1, 0,1, 0, 0, 0, 0, 0, 0, 0, 0, 0, 0, 0, 0, 0, 0, 0, 0, 0, 0, 0, 0, 0, 0]
PAPR[dB] : 3.0103
Seq[−28:28] = ± [0, 0, 0, 0, 0, 0, 0, 0, 0, 0, 0, 0, 0, 0, 0, 0, 0, 0, 0, 0, 0, 1, 0, 1, 0,−1, 0, 1, 0,−1, 0, 1, 0, 1, 0,1, 0,1, 0, 0, 0, 0, 0, 0, 0, 0, 0, 0, 0, 0, 0, 0, 0, 0, 0, 0, 0, 0, 0]
PAPR[dB]: 3.0103
Seq[−28:28] = ± [0, 0, 0, 0, 0, 0, 0, 0, 0, 0, 0, 0, 0, 0, 0, 0, 0, 0, 0, 0, 0, −1,0, 1, 0,−1, 0,−1, 0,−1, 0,−1, 0,−1, 0,1, 0, 0, 0, 0, 0, 0, 0, 0, 0, 0, 0, 0, 0, 0, 0, 0, 0, 0, 0, 0, 0, 0]
PAPR[dB] : 3.0103
Seq[−28:28] = ± [0, 0, 0, 0, 0, 0, 0, 0, 0, 0, 0, 0, 0, 0, 0, 0, 0, 0, 0, 0, 0, −1,0, 1, 0,−1, 0,−1, 0,−1, 0,−1, 0,−1, 0,1, 0,1, 0, 0, 0, 0, 0, 0, 0, 0, 0, 0, 0, 0, 0, 0, 0, 0, 0, 0, 0, 0, 0]
PAPR[dB] : 3.0103

TABLE 7

Seq[−28:28] = ± [0, 0, 0, 0, 0, 0, 0, 0, 0, 0, 0, 0, 0, 0, 0, 0, 0, 0, 0, 0, 0, 0, 0, −1,1, −1,1,1, 1,
1,1,1, −1,−1, 1,1, 0, 0, 0, 0, 0, 0, 0, 0, 0, 0, 0, 0, 0, 0, 0, 0, 0, 0, 0, 0, 0, 0, 0]
PAPR[dB] : 2.8400
Seq[−28:28] = ± [0, 0, 0, 0, 0, 0, 0, 0, 0, 0, 0, 0, 0, 0, 0, 0, 0, 0, 0, 0, 0, 0, 0, 0, 1,1, 1,1,1, −1, −
1,1,1,−1, 1,−1,1, 0, 0, 0, 0, 0, 0, 0, 0, 0, 0, 0, 0, 0, 0, 0, 0, 0, 0, 0, 0, 0, 0, 0 ]
PAPR [dB]: 2.8400
Seq[−28:28] = ± [0, 0, 0, 0, 0, 0, 0, 0, 0, 0, 0, 0, 0, 0, 0, 0, 0, 0, 0, 0, 0, 0, 0, −1,1, −1,1,1, 0,
1,1,1, −1,−1, 1,1, 0, 0, 0, 0, 0, 0, 0, 0, 0, 0, 0, 0, 0, 0, 0, 0, 0, 0, 0, 0, 0, 0, 0] ;
PAPR[dB] : 2.2910
Seq[−28:28] = ± [0, 0, 0, 0, 0, 0, 0, 0, 0, 0, 0, 0, 0, 0, 0, 0, 0, 0, 0, 0, 0, 0, 0, 0, 1,1, 1,1,1, −1,
0,1,1,−1, 1,−1,1, 0, 0, 0, 0, 0, 0, 0, 0, 0, 0, 0, 0, 0, 0, 0, 0, 0, 0, 0, 0, 0, 0, 0 ] ;
PAPR[dB] : 4.7712

When Manchester coding using OOK modulation is used for transmitting a 4 MHz WUR packet, the WUR packet sequence may be determined to be a sequence having a length of 12 or 14 resulting from obtaining a 6/7 sequence of a 2.5 MHz OOK WUR packet sequence having a length of 8 and inserting 0s thereinto at intervals.

Table 8 illustrates PAPR results measured when the AP transmits a 4 MHz WUR packet signal using Manchester coding using OOK modulation.

TABLE 8

Seq[−28:28] = ± [0, 0, 0, 0, 0, 0, 0, 0, 0, 0, 0, 0, 0, 0, 0, 0, 0, 0, 0, 0, 0, 0, 0,0, −1, 0, −1, 0, 1,
0, 1, 0, −1, 0, 1, 0, 0, 0, 0, 0, 0, 0, 0, 0, 0, 0, 0, 0, 0, 0, 0, 0, 0, 0, 0, 0, 0, 0];
PAPR[dB]: 3.5088
Seq[−28:28] = ± [0, 0, 0, 0, 0, 0, 0, 0, 0, 0, 0, 0, 0, 0, 0, 0, 0, 0, 0, 0, 0, 0, 0, 0, −1, 0, −1, 0, 1,
0, 1, 0, −1, 0, 1, 0, 0, 0, 0, 0, 0, 0, 0, 0, 0, 0, 0, 0, 0, 0, 0, 0, 0, 0, 0, 0, 0, 0]
PAPR[dB]: 3.5088
− # of sub-carriers: 7
Seq[−28:28] = ± [0, 0, 0, 0, 0, 0, 0, 0, 0, 0, 0, 0, 0, 0, 0, 0, 0, 0, 0, 0, 0, 0, −1, 0, −1, 0, 1, 0, 1,
0, −1, 0, 1, 0, −1, 0, 0, 0, 0, 0, 0, 0, 0, 0, 0, 0, 0, 0, 0, 0, 0, 0, 0, 0, 0, 0, 0, 0]
PAPR[dB]: 3.5088
Seq[−28:28] = ± [0, 0, 0, 0, 0, 0, 0, 0, 0, 0, 0, 0, 0, 0, 0, 0, 0, 0, 0, 0, 0, 0, 0, 0, −1, 0, −1, 0,
1, 0, 1, 0, −1, 0, 1, 0, −1, 0, 0, 0, 0, 0, 0, 0, 0, 0, 0, 0, 0, 0, 0, 0, 0, 0, 0, 0, 0]
PAPR[dB]: 2.7711
Seq[−28:28] = ± [0, 0, 0, 0, 0, 0, 0, 0, 0, 0, 0, 0, 0, 0, 0, 0, 0, 0, 0, 0, 0, 0, 0, 0, 1, 0, 1, 0, −1, 0, 1,
0, −1, 0, 1, 0, 1, 0, 0, 0, 0, 0, 0, 0, 0, 0, 0, 0, 0, 0, 0, 0, 0, 0, 0, 0, 0, 0, 0, 0]
PAPR[dB]: 3.3234
Seq[−28:28] = ± [0, 0, 0, 0, 0, 0, 0, 0, 0, 0, 0, 0, 0, 0, 0, 0, 0, 0, 0, 0, 0, 0, 0, 0, 1, 0, 1, 0, −1,
0, 1, 0, −1, 0, 1, 0, 1, 0, 0, 0, 0, 0, 0, 0, 0, 0, 0, 0, 0, 0, 0, 0, 0, 0, 0, 0, 0, 0];
PAPR[dB]: 3.3234

Hereinafter, determination of a sequence for transmitting a 2.5 MHz WUR packet will be described.

A sequence having the lowest PAPR among continuous sequences having a length of 8 may be determined as an OOK WUR packet sequence for 2.5 MHz transmission by the same method as used for determining an OOK sequence for 10 MHz WUR symbol transmission.

Further, an OOK sequence may be determined by disposing the sequence having a length of 8 such that index k=0 and using central 0, used as a DC tone as it is or may be determined to be a sequence having a lower PAPR after obtaining the PAPR with a DC tone fixed to 1 or −1. The sequence may be mapped to either [−4:3] or [−3:4].

Table 9 illustrates PAPR results measured when the AP transmits a 4 MHz WUR packet using OOK modulation.

TABLE 9

Seq[−28:28] = ± [0, 0, 0, 0, 0, 0, 0, 0, 0, 0, 0, 0, 0, 0, 0, 0, 0, 0, 0, 0, 0, 0, 0, 0, −1,−1, 1, 1,
−1, 1,−1,1, 0, 0, 0, 0, 0, 0, 0, 0, 0, 0, 0, 0, 0, 0, 0 ,0, 0, 0, 0, 0, 0, 0, 0, 0 ] ;
PAPR[dB] : 3.0103
Seq[−28:28] = ± [0, 0, 0, 0, 0, 0, 0, 0, 0, 0, 0, 0, 0, 0, 0, 0, 0, 0, 0, 0, 0, 0, 0, 0, −1,−1, 1, 1,
0, 1,−1,1, 0, 0, 0, 0, 0, 0, 0, 0, 0, 0, 0, 0, 0, 0, 0, 0, 0, 0, 0, 0, 0, 0, 0, 0, 0 ] ;
PAPR[dB] : 2.2902
Seq[−28:28] = ± [0, 0, 0, 0, 0, 0, 0, 0, 0, 0, 0, 0, 0, 0, 0, 0, 0, 0, 0, 0, 0, 0, 0, 0, 1, 1,−1, 1, −
1, 1, 1,1, 0, 0, 0, 0, 0, 0, 0, 0, 0, 0, 0, 0, 0, 0, 0, 0, 0, 0, 0, 0, 0, 0, 0, 0, 0]
PAPR[dB] : 3.0103
Seq[−28:28] = ± [0, 0, 0, 0, 0, 0, 0, 0, 0, 0, 0, 0, 0, 0, 0, 0, 0, 0, 0, 0, 0, 0, 0, 0, 1, 1,−1, 1,
0, 1, 1,1, 0, 0, 0, 0, 0, 0, 0, 0, 0, 0, 0, 0, 0, 0, 0, 0, 0, 0, 0, 0, 0, 0, 0, 0, 0] ;
PAPR[dB] : 5.5284

TABLE 9-continued

Seq[−28:28] = ± [0, 0, 0, 0, 0, 0, 0, 0, 0, 0, 0, 0, 0, 0, 0, 0, 0, 0, 0, 0, 0, 0, 0, 0, 0, 0, 0, −1, 1,−1,−
1, −1, −1,−1,1, 0, 0, 0, 0, 0, 0, 0, 0, 0, 0, 0, 0, 0, 0, 0, 0, 0, 0, 0, 0, 0, 0, 0,
0, 0, 0]
PAPR [dB]: 3.0103
Seq[−28:28] = ± seq = [0, 0, 0, 0, 0, 0, 0, 0, 0, 0, 0, 0, 0, 0, 0, 0, 0, 0, 0, 0, 0, 0, 0, 0, 0, 0, 0, 0, −1, 1,−
1,−1, 0, −1,−1,1, 0, 0, 0, 0, 0, 0, 0, 0, 0, 0, 0, 0, 0, 0, 0, 0, 0, 0, 0, 0, 0, 0,
0, 0, 0, 0]
PAPR [dB]: 4.8225
Seq[−28:28] = ± [0, 0, 0, 0, 0, 0, 0, 0, 0, 0, 0, 0, 0, 0, 0, 0, 0, 0, 0, 0, 0, 0, 0, 0, 0, 0, 0, −1,−1, 1,
1,−1, 1,−1,1, 0, 0, 0, 0, 0, 0, 0, 0, 0, 0, 0, 0, 0, 0, 0, 0, 0, 0, 0, 0, 0, 0, 0 ] ;
PAPR[dB]: 3.0103
Seq(k = −28, −27, ..., −1, 0, 1, ..., 27, 28) = ± [0, 0, 0, 0, 0, 0, 0, 0, 0, 0, 0, 0, 0, 0, 0,
0, 0, 0, 0, 0, 0, 0, 0, −1,−1, 1, 1, 0, 1,−1,1, 0, 0, 0, 0, 0, 0, 0, 0, 0, 0, 0, 0, 0, 0, 0,
0, 0, 0, 0, 0, 0, 0, 0 ];
PAPR[dB] : 2.2902
Seq[−28:28] = ± [0, 0, 0, 0, 0, 0, 0, 0, 0, 0, 0, 0, 0, 0, 0, 0, 0, 0, 0, 0, 0, 0, 0, 0, 0, 1, 1,−1, 1,−
1, 1, 1,1, 0, 0, 0, 0, 0, 0, 0, 0, 0, 0, 0, 0, 0, 0, 0, 0, 0, 0, 0, 0, 0, 0, 0, 0]
PAPR[dB] : 3.0103
Seq[−28:28] = ± [0, 0, 0, 0, 0, 0, 0, 0, 0, 0, 0, 0, 0, 0, 0, 0, 0, 0, 0, 0, 0, 0, 0, 0, 0, 0, 0, 0, 1,
1,−1, 1, 0, 1, 1,1, 0, 0, 0, 0, 0, 0, 0, 0, 0, 0, 0, 0, 0, 0, 0, 0, 0, 0, 0, 0, 0, 0] ;
PAPR[dB] : 5.5284

Table 10 illustrates PAPR results measured when the AP transmits a 2.5 MHz WUR packet using Manchester coding using OOK modulation.

TABLE 10

Seq[−28:28] = ± [0, 0, 0, 0, 0, 0, 0, 0, 0, 0, 0, 0, 0, 0, 0, 0, 0, 0, 0, 0, 0, 0, 0, 0, 0, 0, 0, 0, 1,0, 1,0, −
1,0, 1, 0, 0, 0, 0, 0, 0, 0, 0, 0, 0, 0, 0, 0, 0, 0, 0, 0, 0, 0, 0, 0, 0, 0, 0 ]
PAPR[dB]: 2.4763
Seq[−28:28] = ± [0, 0, 0, 0, 0, 0, 0, 0, 0, 0, 0, 0, 0, 0, 0, 0, 0, 0, 0, 0, 0, 0, 0, 0, 0, 0, 0, 0, 1,0, −1,0,
1,0, 1, 0, 0, 0, 0, 0, 0, 0, 0, 0, 0, 0, 0, 0, 0, 0, 0, 0, 0, 0, 0, 0, 0, 0, 0 ]
PAPR[dB]: 2.4763

Hereinafter, a method of determining a sequence per frequency for WUR packet transmission reusing a VHT-STF sequence will be described.

Since the value of ±Sqrt(½)*(1+j) does not affect a PAPR value, a sequence for transmitting a WUR packet may be obtained by dividing the VHT-STF sequence illustrated above by ±Sqrt(½)*(1+j). Subsequently, a sequence for transmitting a WUR packet may be determined reusing only non-zero coefficients in this obtained sequence.

According to this method, the VHT-STF may be modified into a sequence having a length of 13 represented by Equation 3.

Seq[−6:6]=[1,−1,1,−1,−1,1,0,−1,−1,1,1,1,1]  [Equation 3]

PAPR is obtained with 0, used as a DC tone in the sequence having a length of 13, fixed to 1 or −1, after which a sequence having a lower PAPR may be determined as ing phase-rotation on each coefficient, after which five coefficients are added to the sequence, thereby finally obtaining a WUR packet sequence having a length of 57.

For example, the final WUR packet sequence having a length of 52 may be [b, −b, b, b] but is not limited thereto. Further, all the added five coefficients may be mapped to left subcarriers or right subcarriers of the sequence having a length of 52. The added five coefficients may also be mapped in parts to left and right subcarriers.

For example, all the added five coefficients may be mapped to the left subcarriers. The following PAPR values are measured when all the five coefficients may be mapped to left subcarriers.

Table 11 illustrates PAPR results measured when the AP transmits a WUR packet reusing the VHT-STF by OOK modulation.

TABLE 11

Seq[−28:28] = ± [0, 0, 0, 0, 1,−1,1,−1,−1,1,1,−1,−1,1,1,1,1,−1,1,−1,1,1,−1,−1,1,1,−1,−1,−1,1,−
1,1,−1,1,1,−1,−1,1,1,1,1,−1,1,−1,−1,1,1,−1,−1,1,1,1,1,−1,−1,−1,−1, 0, 0, 0]
PAPR[dB] = 4.3643
Seq[−28:28] = ± [0, 0, 0, 0, 1,−1,1,−1,−1,1,1,−1,−1,1,1,1,1,−1,1,−1,1,1,−1,−1,1,1,−1,−1,1, 0,
−1,1,−1,1,1,−1,−1,1,1,1,1,1,1,−1,1,−1,−1,1,1,−1,−1,1,1,1,1,1,1,−1,−1,−1,−1, 0, 0, 0];
PAPR[dB] = 4.7904

VHT-STF base sequence b. For example, VHT-STF base sequence b may be represented by Equation 4.

Seq b[−6:6]=[1,−1,1,−1,−1,1,0,−1,−1,1,1,1,1]  [Equation 4]

A sequence having the lowest PAPR and a length of 52 is obtained by repeating sequence b four times or by perform When the AP transmits a 20 MHz WUR packet reusing the VHT-STF sequence by Manchester coding using OOK modulation, the WUR packet sequence may be determined to be a sequence having a low PAPR obtained as follows: a sequence having a length of 64 is obtained by inserting 0s into a 10 MHz OOK sequence having a length of 32 at intervals and a full search of randomly removing coefficients at both sides of the sequence is applied thereto.

Table 12 illustrates PAPR results measured when the AP transmits a 20 MHz WUR packet reusing the VHT-STF sequence by Manchester coding using OOK modulation.

TABLE 12

Seq[−28:28] = ± [1,0, −1,0, 1,0, −1,0, −1,0, 1,0, −1,0, 1,0, −1,0, −1,0, 1,0, 1,0, −1,0, −1,0, 1,0, 1,0, 1,0, 1,0, 1,0, −1,0, 1,0, −1,0, −1,0, 1,0, 1,0, −1,0, −1,0, 1,0, 1];
PAPR: 5.0009
Seq[−28:28] = ± [1,0, −1,0, 1,0, −1,0, −1,0, 1,0, 1,0, −1,0, −1,0, 1,0, 1,0, 1,0, 1,0, 1,0, −1,0, 1,0, −1,0, −1,0, 1,0, 1,0, −1,0, −1,0, 1,0, 1,0, 1,0, 1,0, −1,0, 1,0, −1]
PAPR: 4.6020

Hereinafter, determination of a sequence for transmitting a 10 MHz WUR packet will be described.

When the AP transmits a WUR packet reusing the VHT-STF sequence by OOK modulation, the WUR packet sequence may be obtained as follows: a sequence having the lowest PAPR and a length of 26 is obtained by repeating sequence b twice or by performing phase-rotation on each coefficient, and then six coefficients are added thereto.

For example, the sequence having a length of 26 may be [b, b], but the present invention is not limited thereto. Further, all the added six coefficients may be mapped to left subcarriers or right subcarriers of the sequence having a length of 26. The added six coefficients may also be mapped in parts to left and right subcarriers.

The finally obtained WUR sequence having a length of 32 may be mapped to 32 consecutive positions in the sequence having a length of 58, in which remaining unmapped coefficients may be set to 0.

In some embodiments illustrated below, [left, right]=[n, m] indicates that n coefficients and m coefficients are added to the WUR packet sequence obtained by repeating sequence b to be mapped to left subcarriers and right subcarriers, respectively.

Table 13 illustrates PAPR results measured when the AP transmits a WUR packet reusing the VHT-STF sequence by OOK modulation.

TABLE 13

[Left Right] = [5, 1] case
Seq[−28:28] = ± [0, 0, 0, 0, 0, 0, 0, 0, 0, 0, 0, 0, 0, 0, 1,−1,1,−1,−1,1,−1,1,−1,−1,1,1,−1,−1,1,1,1,1,1,−1,1,1,1,−1,−1,1,1,1,1,1,1, 0, 0, 0, 0, 0, 0, 0, 0, 0, 0, 0, 0, 0 ]
PAPR: 3.515
Seq[−28:28] = ± [0, 0, 0, 0, 0, 0, 0, 0, 0, 0, 0, 0, 1,−1,1,−1,−1,1,−1,1,−1,−1,1,1,1, 0, 1,1,−1,1,−1,−1,1,1,−1,−1,1,1,1,1,1,1, 0, 0, 0, 0, 0, 0, 0, 0, 0, 0, 0, 0, 0 ];
PAPR: 4.2423
[Left, Right] = [1, 5] case
Seq[−28:28] = ± [0, 0, 0, 0, 0, 0, 0, 0, 0, 0, 0, 0, −1,1,−1,1,−1,−1,1,1,−1,−1,1,1,1,1,1,1,−1,1,−1,1,1,1,−1,−1,1,1,1,1,−1,1,−1,1,1, 0, 0, 0, 0, 0, 0, 0, 0, 0, 0, 0, 0,0]
PAPR: 3.8934
Seq[−28:28] = ± [0, 0, 0, 0, 0, 0, 0, 0, 0, 0, 0, 0, −1,1,−1,1,−1,−1,1,1,−1,−1,1,1,1,1,1,1,−1, 0, −1,−1,1,1,−1,−1,1,1,1,1,−1,1,−1,1,1, 0, 0, 0, 0, 0, 0, 0, 0, 0, 0, 0, 0, 0,0]
PAPR: 4.9314
[Left, Right] = [4, 2] case
Seq[−28:28] = ± [0, 0, 0, 0, 0, 0, 0, 0, 0, 0, 0, 0, −1,−1,−1,−1,1,−1,1,1,−1,−1,1,−1,1,1,1,1,1,1,−1,1,1,−1,−1,1,1,1,1,1,1,10, 0, 0, 0, 0, 0, 0, 0, 0, 0, 0,0]
PAPR: 4.0638
Seq[−28:28] = ± [0, 0, 0, 0, 0, 0, 0, 0, 0, 0, 0, 0, −1,−1,−1,−1,1,−1,1,1,−1,−1,1,1,1,1,1,1, 0, 1,−1,1,−1,−1,1,1,1,−1,1,1,1,1,1,1,10, 0, 0, 0, 0, 0, 0, 0, 0, 0, 0, 0,0]
PAPR: 4.1522

When the AP transmits a 10 MHz WUR packet reusing the VHT-STF sequence by Manchester coding using OOK modulation, the WUR packet sequence may be determined to be a sequence having a low PAPR obtained as follows: a sequence having a length of 32 is obtained by inserting 0s into a 5 MHz OOK sequence having a length of 16 at intervals and a full search of randomly removing coefficients at both sides of the sequence is applied thereto.

The finally obtained WUR sequence having a length of 32 may be mapped to 32 consecutive positions in the sequence having a length of 58, in which remaining unmapped coefficients may be set to 0.

Table 14 illustrates PAPR results measured when the AP transmits a WUR packet reusing the VHT-STF sequence by Manchester coding using OOK modulation.

TABLE 14

Seq[−28:28] = ± [0, 0, 0, 0, 0, 0, 0, 0, 0, 0, 0, 0, 0, 1,0, 1,0, −1,0, 1,0, −1,0, 1,0, −1,0, −1,0, 1,0, 1,0, −1,0, −1,0, 1,0, 1,0, 1,0, 1, 0, 0, 0, 0, 0, 0, 0, 0, 0, 0, 0, 0,0];
PAPR[dB] : 3.4912

TABLE 14-continued

Seq[−28:28] = ± [0, 0, 0, 0, 0, 0, 0, 0, 0, 0, 0, 0, 0, 1,0, 1,0, −1,0, 1,0, −1,0, 1,0, −1,0, −1,0, 1,0, 1,0, −1,0, −1,0, 1,0, 1,0, 1,0, 1, 0, 0, 0, 0, 0, 0, 0, 0, 0, 0, 0, 0, 0];
PAPR[dB] : 3.4912
Seq[−28:28] = ± [0, 0, 0, 0, 0, 0, 0, 0, 0, 0, 0, 0, 0, −1,0, −1,0, 1,0, −1,0, 1,0, −1,0, −1,0, 1,0, 1,0, −1,0, −1,0, 1,0, 1,0, 1,0, 1,0, 1, 0, 0, 0, 0, 0, 0, 0, 0, 0, 0, 0, 0, 0,0]
PAPR[dB] : 3.1036
Seq[−28:28] = ± [0, 0, 0, 0, 0, 0, 0, 0, 0, 0, 0, 0, 0, −1,0, −1,0, 1,0, −1,0, 1,0, −1,0, −1,0, 1,0, 1,0, −1,0, −1,0, 1,0, 1,0, 1,0, 1,0, 1, 0, 0, 0, 0, 0, 0, 0, 0, 0, 0, 0, 0, 0]
PAPR[dB] : 3.1036
Seq[−28:28] = ± [0, 0, 0, 0, 0, 0, 0, 0, 0, 0, 0, 0, 0, −1,0, 1,0,−1,0, 1,0,−1,0,−1,0, 1,0, 1,0,−1,0,−1,0, 1,0, 1,0,1,0,1,0,1,0,1, 0, 0, 0, 0, 0, 0, 0, 0, 0, 0, 0, 0,0]
PAPR[dB] : 3.2992
Seq[−28:28] = ± [0, 0, 0, 0, 0, 0, 0, 0, 0, 0, 0, 0, 0,−1,0, 1,0,−1,0, 1,0,−1,0,−1,0, 1,0, 1,0,−1,0,−1,0, 1,0, 1,0,1,0,1,0,1,0,1, 0, 0, 0, 0, 0, 0, 0, 0, 0, 0, 0, 0, 0];
PAPR[dB] : 3.2992

Hereinafter, determination of a sequence for transmitting a 5 MHz WUR packet will be described.

When the AP transmits a 5 MHz WUR packet reusing the VHT-STF sequence by OOK modulation, the final WUR sequence having a length of 16 may be obtained by adding three coefficients to sequence b.

The added three coefficients may be mapped to left subcarriers or right subcarriers of the sequence having a length of 13. The added three coefficients may also be mapped in parts to left and right subcarriers The finally obtained WUR sequence having a length of 16 may be disposed on the sequence having a length of 58, where index k=0. The sequence having a length of 16 may be mapped to either [−8:7] or [−7:8]. Here, remaining unmapped coefficients may be set to 0.

Table 15 illustrates PAPR results measured when the AP transmits a 5 MHz WUR packet reusing the VHT-STF sequence by OOK modulation.

TABLE 15

[Left Right] = [3, 0] case
Seq[−28:28] = ± [0, 0, 0, 0, 0, 0, 0, 0, 0, 0, 0, 0, 0, 0, 0, 0, 0, 0, 0, 0, 1, 1,−1, 1,−1, 1,−1,−1,1, 1,−1,−1,1,1,1,1, 0, 0, 0, 0, 0, 0, 0, 0, 0, 0, 0, 0, 0, 0, 0, 0, 0, 0, 0, 0, 0, 0]
PAPR: 3.1036
Seq[−28:28] = ± [0, 0, 0, 0, 0, 0, 0, 0, 0, 0, 0, 0, 0, 0, 0, 0, 0, 0, 0, 0, 1, 1,−1, 1,−1, 1,−1, 0, 1,−1,−1,1,1,1,1, 0, 0, 0, 0, 0, 0, 0, 0, 0, 0, 0, 0, 0, 0, 0, 0, 0, 0, 0, 0, 0, 0, 0] ;
PAPR: 3.5297
[Left Right] = [1, 2] case
Seq[−28:28] = ± [0, 0, 0, 0, 0, 0, 0, 0, 0, 0, 0, 0, 0, 0, 0, 0, 0, 0, 0, 0, 0, −1,−1, 1,−1, 1,−1,−1, 1, 1,−1,−1, 1,1,1,1,1, 0, 0, 0, 0, 0, 0, 0, 0, 0, 0, 0, 0, 0, 0, 0, 0, 0, 0, 0, 0, 0]
PAPR: 3.1036
Seq[−28:28]= ± [0, 0, 0, 0, 0, 0, 0, 0, 0, 0, 0, 0, 0, 0, 0, 0, 0, 0, 0, 0, −1,−1, 1,−1, 1,−1,−1, 1, 0, −1,−1, 1,1,1,1,1, 0, 0, 0, 0, 0, 0, 0, 0, 0, 0, 0, 0, 0, 0, 0, 0, 0, 0, 0, 0, 0];
PAPR: 3.2692
Seq[−28:28] = ± [0, 0, 0, 0, 0, 0, 0, 0, 0, 0, 0, 0, 0, 0, 0, 0, 0, 0, 0, 0, 1,−1,1,−1,−1,1,1,−1,−1, 1,1,1,1,1,1,1,1, 0, 0, 0, 0, 0, 0, 0, 0, 0, 0, 0, 0, 0, 0, 0, 0, 0, 0, 0, 0]
PAPR: 3.4912
Seq[−28:28] = ± [0, 0, 0, 0, 0, 0, 0, 0, 0, 0, 0, 0, 0, 0, 0, 0, 0, 0, 0, 0, 1,−1,1,−1,−1,1,1,−1, 0, 1,1,1,1,1,1,1,1, 0, 0, 0, 0, 0, 0, 0, 0, 0, 0, 0, 0, 0, 0, 0, 0, 0, 0, 0, 0]
PAPR: 5.1410
[Left Right] = [2, 1] case
Seq[−28:28] = ± [0, 0, 0, 0, 0, 0, 0, 0, 0, 0, 0, 0, 0, 0, 0, 0, 0, 0, 0, 0, −1, 1,−1, 1,−1,−1, 1, 1,−1,−1, 1, 1, 1,1,1,1, 0, 0, 0, 0, 0, 0, 0, 0, 0, 0, 0, 0, 0, 0, 0, 0, 0, 0, 0, 0]
PAPR: 3.3345
Seq[−28:28] = ± [0, 0, 0, 0, 0, 0, 0, 0, 0, 0, 0, 0, 0, 0, 0, 0, 0, 0, 0, 0, −1, 1,−1, 1, −1,−1, 1, 1, 0, −1, 1, 1,1,1,1,1, 0, 0, 0, 0, 0, 0, 0, 0, 0, 0, 0, 0, 0, 0, 0, 0, 0, 0, 0, 0];
PAPR: 3.8464

When the AP transmits a 5 MHz WUR packet reusing the VHT-STF sequence by Manchester coding using OOK modulation, the 5 MHz WUR packet sequence may be determined by inserting 0s into a 2.5 MHz OOK WUR packet sequence having a length of 8 at intervals. The finally obtained WUR sequence having a length of 16 may be mapped to 16 consecutive positions in the sequence having a length of 58, in which remaining unmapped coefficients may be set to 0.

Table 16 illustrates PAPR results measured when the AP transmits a 5 MHz WUR packet reusing the VHT-STF sequence by Manchester coding using OOK modulation.

TABLE 16

Seq[−28:28] = ± [0, 0, 0, 0, 0, 0, 0, 0, 0, 0, 0, 0, 0, 0, 0, 0, 0, 0, 0, 0, 0, 0, 0, −1,0, 1,0, −1,0, 1,0, −1,0, −1,0, 1,0, 1, 0, 0, 0, 0, 0, 0, 0, 0, 0, 0, 0, 0, 0, 0, 0, 0, 0, 0, 0, 0, 0, 0]
PAPR[dB]: 3.0103
Seq[−28:28] = ± [0, 0, 0, 0, 0, 0, 0, 0, 0, 0, 0, 0, 0, 0, 0, 0, 0, 0, 0, 0, 0, 0, 0, 0, −1,0, 1,0, −1,0, 1,0, −1,0, −1,0, 1,0, 1, 0, 0, 0, 0, 0, 0, 0, 0, 0, 0, 0, 0, 0, 0, 0, 0, 0, 0, 0, 0, 0]
PAPR[dB]: 3.0103
Seq[−28:28] = ± [0, 0, 0, 0, 0, 0, 0, 0, 0, 0, 0, 0, 0, 0, 0, 0, 0, 0, 0, 0, 0, 0, 0, 0, 1,0, −1,0, −1,0, 1,0, 1,0, 1,0, 1, 0, 0, 0, 0, 0, 0, 0, 0, 0, 0, 0, 0, 0, 0, 0, 0, 0, 0, 0, 0, 0, 0]
PAPR[dB]: 3.0103
Seq[−28:28] = ± [0, 0, 0, 0, 0, 0, 0, 0, 0, 0, 0, 0, 0, 0, 0, 0, 0, 0, 0, 0, 0, 0, 0, 0, 0, 1,0, −1,0, −1,0, 1,0, 1,0, 1,0, 1,0, 1, 0, 0, 0, 0, 0, 0, 0, 0, 0, 0, 0, 0, 0, 0, 0, 0, 0, 0, 0, 0, 0 ]
PAPR[dB]: 3.0103

Hereinafter, determination of a sequence for transmitting a 4 MHz WUR packet will be described.

When the AP transmits a 4 MHz WUR packet reusing the VHT-STF sequence by OOK modulation, sequence b may be determined as a sequence for transmitting a WUR packet.

The WUR sequence (b) having a length of 13 may be mapped to 13 consecutive positions in the sequence having a length of 58, in which remaining unmapped coefficients may be set to 0.

Table 17 illustrates PAPR results measured when the AP transmits a 4 MHz WUR packet reusing the VHT-STF sequence by OOK modulation.

TABLE 17

Seq[−28:28] = ± [0, 0, 0, 0, 0, 0, 0, 0, 0, 0, 0, 0, 0, 0, 0, 0, 0, 0, 0, 0, 0, 0, 1, −1, 1, −1, −1, 1, 1, −1, −1, 1, 1, 1, 0, 0, 0, 0, 0, 0, 0, 0, 0, 0, 0, 0, 0, 0, 0, 0, 0, 0, 0, 0, 0, 0 ]
PAPR[dB] : 3.0222
Seq[−28:28] = ± [0, 0, 0, 0, 0, 0, 0, 0, 0, 0, 0, 0, 0, 0, 0, 0, 0, 0, 0, 0, 0, 0, 1, −1, 1, −1, −1, 1, 0, −1, −1, 1, 1, 1, 1, 0, 0, 0, 0, 0, 0, 0, 0, 0, 0, 0, 0, 0, 0, 0, 0, 0, 0, 0, 0, 0, 0 ];
PAPR[dB] : 2.2394

When the AP transmits a 4 MHz WUR packet reusing the VHT-STF sequence by Manchester coding using OOK modulation, the WUR packet sequence may be determined to be a sequence obtained by inserting 0s into a 6/7 continuous portion of a 2.5 MHz OOK sequence at intervals. The finally obtained WUR packet sequence having a length of 12 or 14 may be mapped to consecutive positions in the sequence having a length of 58, in which remaining unmapped coefficients may be set to 0.

Table 18 illustrates PAPR results measured when the AP transmits a 4 MHz WUR packet reusing the VHT-STF sequence by Manchester coding using OOK modulation.

TABLE 18

− # of sub-carriers : 6
Seq[−28:28] = ± [0, 0, 0, 0, 0, 0, 0, 0, 0, 0, 0, 0, 0, 0, 0, 0, 0, 0, 0, 0, 0, 0, 0,0, 1, 0, −1, 0, −1, 0, 1, 0, 1, 0, 1, 0, 0, 0, 0, 0, 0, 0, 0, 0, 0, 0, 0, 0, 0, 0, 0, 0, 0, 0, 0, 0]
PAPR[dB] = 3.5088
− # of sub-carriers : 7
Seq[−28:28] = ± [0, 0, 0, 0, 0, 0, 0, 0, 0, 0, 0, 0, 0, 0, 0, 0, 0, 0, 0, 0, 0, 0, 1, 0, −1, 0, −1, 0, 1, 0, 1, 0, 1, 0, 1, 0, 0, 0, 0, 0, 0, 0, 0, 0, 0, 0, 0, 0, 0, 0, 0, 0, 0, 0, 0, 0, 0]
PAPR[dB] = 2.7711

Hereinafter, determination of a sequence for transmitting a 2.5 MHz WUR packet will be described.

When the AP transmits a 2.5 MHz WUR packet reusing the VHT-STF sequence by OOK modulation, the WUR packet sequence may be set to any continuous sequence having a length of 8 of sequence b.

The WUR packet sequence having a length of 8 may be mapped to 8 consecutive positions in the sequence having a length of 58, in which remaining unmapped coefficients may be set to 0.

Table 19 illustrates PAPR results measured when the AP transmits a 2.5 MHz WUR packet reusing the VHT-STF sequence by OOK modulation.

TABLE 19

Seq[−28:28] = ± [0, 0, 0, 0, 0, 0, 0, 0, 0, 0, 0, 0, 0, 0, 0, 0, 0, 0, 0, 0, 0, 0, 0, 0, 0, 0, 0, −1,1,−1,1,−1,-
1,1,1, 0,0, 0, 0, 0, 0, 0, 0, 0, 0, 0, 0, 0, 0, 0, 0, 0, 0, 0, 0, 0, 0, 0, 0, 0, 0 ]
PAPR[dB]: 3.0103
Seq[−28:28] = ± [0, 0, 0, 0, 0, 0, 0, 0, 0, 0, 0, 0, 0, 0, 0, 0, 0, 0, 0, 0, 0, 0, 0, 0, 0, 0, 0, 0,0, −1,1,−1,0,−
1,−1,1,1, 0, 0, 0, 0, 0, 0, 0, 0, 0, 0, 0, 0, 0, 0, 0, 0, 0, 0, 0, 0, 0, 0, 0, 0, 0 ] ;
PAPR[dB]: 2.2902
Seq[−28:28] = ± [0, 0, 0, 0, 0, 0, 0, 0, 0, 0, 0, 0, 0, 0, 0, 0, 0, 0, 0, 0, 0, 0, 0, 0, 0, 0, 0, 0, 1,−1,-
1,1,1,1,1, 0, 0, 0, 0, 0, 0, 0, 0, 0, 0, 0, 0, 0, 0, 0, 0, 0, 0, 0, 0, 0, 0, 0, 0, 0, 0]
PAPR[dB] : 3.0103
Seq[−28:28] = ± [0, 0, 0, 0, 0, 0, 0, 0, 0, 0, 0, 0, 0, 0, 0, 0, 0, 0, 0, 0, 0, 0, 0, 0, 0, 0, 0, 0, 1,−1,-
1,1,0,1,1,1, 0, 0, 0, 0, 0, 0, 0, 0, 0, 0, 0, 0, 0, 0, 0, 0, 0, 0, 0, 0, 0, 0, 0, 0, 0, 0] ;
PAPR[dB] : 2.2902

When the AP transmits a 2.5 MHz WUR packet reusing the VHT-STF sequence by Manchester coding using OOK modulation, the WUR packet sequence may be determined to be a sequence having a length of 8 obtained by inserting 0s into a portion having a length of 4 of any OOK sequence at intervals. The finally obtained WUR sequence having a length of 8 may be mapped to consecutive positions in the sequence having a length of 58, in which remaining unmapped coefficients may be set to 0.

Table 20 illustrates PAPR results measured when the AP transmits a 2.5 MHz WUR packet reusing the VHT-STF sequence by Manchester coding using OOK modulation.

TABLE 20

Seq[−28:28] = ± [0, 0, 0, 0, 0, 0, 0, 0, 0, 0, 0, 0, 0, 0, 0, 0, 0, 0, 0, 0, 0, 0, 0, 0,
1, 0, −1, 0, −1, 0, 1, 0, 0, 0, 0, 0, 0, 0, 0, 0, 0, 0, 0, 0, 0, 0, 0, 0, 0, 0, 0, 0, 0,
0]
PAPR[dB] : 3.7481

Embodiment 1-2

When the AP generates a sequence directly using a narrowband signal, the AP may use 10 MHz, 5 MHz, 4 MHz, and 2.5 MHz as a frequency of a narrowband. The number of subcarriers corresponding to each frequency band may be set to 32, 16, 13, and 8.

Hereinafter, a method of determining a narrowband WUR packet sequence per frequency reusing a VHT-LTF sequence will be described.

A method of determining a narrowband WUR packet sequence per frequency band is the same as a method of determining a narrowband WUR sequence mapped in a wideband sequence having a length of 58 reusing a VHT-LTF sequence illustrated in Embodiment 1-1, and thus a description thereof is omitted.

Table 21 illustrates PAPR results measured when the AP transmits a 10 MHz narrowband WUR packet reusing a VHT-LTF sequence by OOK modulation. In the following description, for convenience, a narrowband WUR packet sequence is mapped to [−16:15] but may be construed as being mapped to [−15:16] if necessary.

TABLE 21

Seq[−16:15] = ± [1, 1,1,−1, −1,1, 1,−1, 1, −1,1,1, 1, 1, 1,1, 0, −1,1, 1, −1, 1,−1, 1, −1,−1,-
1,−1, −1, 1,1,−1]
PAPR [dB]: 3.5656
Seq[−16:15] = ± [1, 1,1,−1, −1,1, 1,−1, 1, −1, 1, 1, 1, 1, 1, 1, −1, −1,1, 1, −1, 1,−1, 1, −1,−1,-
1,−1, −1, 1,1,−1]
PAPR [dB]: 3.6458
Seq[−16:15] = ± [−1,−1,1, 1, −1,1,−1, 1, 1, 1,1, 1, 1,−1,−1,1, 0, −1,1,−1, 1,−1,−1,−1, −1,−1, 1,
1, −1,−1,1,−1] ;
PAPR [dB]: 4.7194
Seq[−16:15] = ± [ −1,−1,1, 1, −1,1,−1, 1, 1, 1,1, 1, 1,−1,−1,1, 1, −1,1,−1, 1,−1,−1,−1, −1,−1, 1,
1, −1,−1,1,−1] ;
PAPR [dB] : 3.6458
Seq[−16:15] = ± [−1,−1,1, 1, −1,1,−1, 1, 1, 1,1, 1, 1,−1,−1,1, 1,−1,1,−1, 1,−1,−1,−1, −1,−1, 1, 1, -
1,−1,1,−1]
PAPR [dB]: 3.6458
Seq[−16:15] = ± [−1,−1,1, 1, −1,1,−1, 1, 1, 1,1, 1, 1,−1,−1,1, 0, −1,1,−1, 1,−1,−1,−1, −1,−1, 1, 1, -
1,−1,1,−1];
PAPR [dB]: 4.7194

Table 22 illustrates PAPR results measured when the AP transmits a 10 MHz narrowband WUR packet reusing a VHT-LTF sequence by Manchester coding using OOK modulation.

TABLE 22

Seq[−16:15] = ± [−1, 0, −1,0, 1,0, 1,0, −1,0, 1,0, −1,0, 1,0, 1,0, 1,0, 1,0, 1,0, 1,0, −1,0, −1,0, 1, 0]
PAPR[dB]: 2.8418
Seq[−16:15] = ± [−1, 0, −1,0, 1,0, 1,0, −1,0, 1,0, −1,0, 1,0, 1,0, 1,0, 1,0, 1,0, 1,0, −1,0, −1,0, 1, 0]
PAPR[dB]: 2.8418
Seq[−16:15] = ± [0, −1,0, −1,0, 1,0, 1,0, −1,0, 1,0, −1,0, 1,0, −1,0, −1,0, −1,0, −1,0, −1,0, 1,0, 1,0, −1]
PAPR [dB]: 2.8418
Seq[−16:15] = ± [0, −1,0, −1,0, 1,0, 1,0, −1,0, 1,0, −1,0, 1,0, −1,0, −1,0, −1,0, −1,0, −1,0, 1,0, 1,0, −1]
PAPR [dB]: 2.8418

Table 23 illustrates PAPR results measured when the AP transmits a 5 MHz narrowband WUR packet reusing a VHT-LTF sequence by OOK modulation. In the following description, for convenience, a narrowband signal sequence is mapped to [−8:7] but may be construed as being mapped to [−7:8] if necessary.

TABLE 23

Seq[−8:7] = ± [−1, −1, 1, 1, −1, 1, −1,1, 1, 1, 1, 1, −1,−1, 1]
PAPR [dB]: 2.8883
Seq[−8:7] = ± [−1, −1, 1, 1, −1, 1, −1,1, −1, −1,−1,−1,−1, 1, 1,−1]
PAPR [dB]: 2.8883
Seq[−8:7] = ± [−1, −1, 1, 1, −1, 1, −1,1, 0, 1, 1, 1, 1, −1,−1, 1];
PAPR [dB]: 3.3068
Seq[−8:7] = ± [−1, −1, 1, 1, −1, 1, −1,1, 0, −1,−1,−1,−1, 1, 1,−1];
PAPR [dB]: 4.5763

Table 24 illustrates PAPR results measured when the AP transmits a 5 MHz narrowband WUR packet reusing a VHT-LTF sequence by Manchester coding using OOK modulation.

TABLE 24

Seq[−8:7] = ± [−1, 0,−1, 0, 1, 0, 1, 0,−1, 0, 1, 0,−1, 0, 1, 0]
PAPR[dB] : 3.0103
Seq[−8:7] = ± [−1, 0,−1, 0, 1, 0, 1, 0,−1, 0, 1, 0,−1, 0,1, 0]
PAPR[dB] : 3.0103
Seq[−8:7] = ± [1, 0, 1, 0,−1, 0, 1, 0,−1, 0, 1, 0, 1, 0,1, 0]
PAPR[dB] : 3.0103
Seq[−8:7] = ± [1, 0, 1, 0,−1, 0, 1, 0,−1, 0, 1, 0, 1, 0,1, 0]
PAPR[dB] : 3.0103
Seq[−8:7] = ± [−1,0, 1, 0,−1, 0,−1, 0,−1, 0,−1, 0,−1, 0,1, 0]
PAPR[dB] : 3.0103
Seq[−8:7] = ± [−1,0, 1, 0,−1, 0,−1, 0,−1, 0,−1, 0,−1, 0,1, 0]
PAPR[dB] : 3.0103

Table 25 illustrates PAPR results measured when the AP transmits a 4 MHz narrowband WUR packet reusing a VHT-LTF sequence by OOK modulation.

TABLE 25

Seq[6:6] = ± [−1,1, −1,1,1, 1, 1,1,1, −1,−1, 1,1]
PAPR[dB] : 2.8400
Seq[6:6] = ± [1,1, 1,1,1, −1, −1,1,1,−1, 1,−1,1 ]
PAPR [dB]: 2.8400
Seq[6:6] = ± [−1,1, −1,1,1, 1, 0,1,1, −1,−1, 1,1] ;
PAPR[dB] : 3.7237
Seq[6:6] = ± [1,1, 1,1,1, −1, 0,1,1,−1, 1,−1,1 ] ;
PAPR[dB] : 4.7712

Table 26 illustrates PAPR results measured when the AP transmits a 4 MHz narrowband WUR packet reusing a VHT-LTF sequence by Manchester coding using OOK modulation.

TABLE 26

- # of sub-carriers : 6
Seq[−5:6] = ± [−1, 0, −1, 0, 1, 0, 1, 0, −1, 0, 1, 0]
PAPR[dB]: 3.5088
Seq[−5:6] = ± [−1, 0, −1, 0, 1, 0, 1, 0, −1, 0, 1, 0]
PAPR[dB]: 3.5088
Seq[−6:5] = ± [0, −1, 0, −1, 0, 1, 0, 1, 0, −1, 0, 1]
PAPR[dB]: 3.5088
Seq[−6:5] = ± [0, −1, 0, −1, 0, 1, 0, 1, 0, −1, 0, 1]
PAPR[dB]: 3.5088
- # of sub-carriers : 7
Seq[−7:6] = ± [−1, 0, −1, 0, 1, 0, 1, 0, −1, 0, 1, 0, −1, 0]
PAPR[dB]: 3.5088
Seq[−7:6] = ± [−1, 0, −1, 0, 1, 0, 1, 0, −1, 0, 1, 0, −1, 0]
PAPR[dB]: 2.7711
Seq[−7:6] = ± [1, 0, 1, 0, −1, 0, 1, 0, −1, 0, 1, 0, 1, 0]
PAPR[dB]: 3.3234
Seq[−7:6] = ± [1, 0, 1, 0, −1, 0, 1, 0, −1, 0, 1, 0, 1, 0];
PAPR[dB]: 3.3234

Table 27 illustrates PAPR results measured when the AP transmits a 2.5 MHz narrowband WUR packet reusing a VHT-LTF sequence by OOK modulation. In the following description, for convenience, a narrowband WUR packet sequence is mapped to [−4:3] but may be construed as being mapped to [−3:4] if necessary.

TABLE 27

Seq[−4:3] = ± [−1,−1, 1, 1, −1, 1,−1,1] ;
PAPR[dB] : 3.0103
Seq[−4:3] = ± [−1,−1, 1, 1, 0, 1,−1,1 ] ;
PAPR[dB] : 2.2902
Seq[−4:3] = ± [−1,−1, 1, 1,−1, 1,−1,1] ;
PAPR[dB] : 3.0103
Seq[−4:3] = ± [−1,−1, 1, 1, 0, 1,−1,1 ];
PAPR[dB] : 2.2902
Seq[−4:3] = ± [1, 1,−1, 1, −1, 1, 1,1,]
PAPR[dB] : 3.0103
Seq[−4:3] = ± [1, 1,−1, 1, 0, 1, 1,1] ;
PAPR[dB] : 5.5284
Seq[−4:3] = ± [, −1, 1,−1,−1, −1, −1,−1,1]
PAPR [dB]: 3.0103
Seq[−4:3] = ± [−1, 1,−1,−1, 0, −1,−1,1]
PAPR [dB]: 4.8225
Seq[−4:3] = ± [1, 1,−1, 1,−1, 1, 1,1]
PAPR[dB] : 3.0103
Seq[−4:3] = ± [1, 1,−1, 1, 0, 1, 1,1] ;
PAPR[dB] : 5.5284
Seq[−4:3] = ± [−1, 1,−1,−1,−1,−1,−1,1]
PAPR [dB]: 3.0103
Seq[−4:3] = ± [−1, 1,−1,−1, 0, −1,−1,1 ]
PAPR [dB]: 4.8225

Table 28 illustrates PAPR results measured when the AP transmits a 2.5 MHz narrowband WUR packet reusing a VHT-LTF sequence by Manchester coding using OOK modulation.

TABLE 28

Seq[−4:3] = ± [1,0, 1,0, −1,0, 1, 0]
PAPR[dB] : 2.4763
Seq[−4:3] = ± [1,0, −1,0, 1,0, 1, 0]
PAPR[dB] : 2.4763

Hereinafter, a method of determining a narrowband sequence for WUR symbol transmission reusing a VHT-STF sequence in each frequency will be described.

A method of determining a narrowband WUR sequence per frequency band is the same as a method of determining a narrowband WUR sequence mapped in a wideband sequence having a length of 58 reusing a VHT-STE sequence illustrated in Embodiment 1-1, and thus a description thereof is omitted.

Table 29 illustrates PAPR results measured when the AP transmits a 10 MHz narrowband WUR packet reusing a VHT-STE sequence by OOK modulation. In the following description, for convenience, a narrowband WUR packet sequence is mapped to [−16:15] but may be construed as being mapped to [−15:16] if necessary.

TABLE 29

[Left Right] = [5, 1] case
Seq[−16:15] = ± [1,−1,1,−1,1,−1,1,1,−1,−1,1,1,1,−1,−1,1,1,1,1,1,1,−1,1,−1,−1,1,1,1,−1,−1,1,1,1,1,1]
PAPR: 3.515
Seq[−16:15] = ± [1,−1,1,−1,1,−1,1,1,−1,−1,1,1,1,−1,−1,1,1, 0, 1,1,−1,1,−1,−1,1,1,1,−1,-
1,1,1,1,1,1];
PAPR: 4.2423
[Left, Right] = [1,5] case
Seq[−16:15] = ± [−1,1,−1,1,−1,1,−1,1,1,−1,−1,1,1,1,1,1,1,−1,1,−1,−1,1,1,1,−1,−1,1,1,1,1,1,−1,1,−1,1,1]
PAPR: 3.8934
Seq[−16:15] = ± [−1,1,−1,1,−1,1,−1,1,1,−1,−1,1,1,1,1,1,1,−1, 0, −1,−1,1,1,1,−1,−1,1,1,1,1,1,−1,1,-
1,1,1]
PAPR: 4.9314
[Left, Right] = [4, 2] case
Seq[−16:15] = ± [−1,−1,−1,−1,1,−1,1,1,−1,−1,1,1,1,−1,−1,1,1,1,1,1,1,−1,1,−1,−1,1,1,1,−1,−1,1,1,1,1,1,1,1]
PAPR: 4.0638
Seq[−16:15] = ± [−1,−1,−1,−1,1,−1,1,1,−1,−1,1,1,1,−1,−1,1,1,1, 0, 1,−1,1,−1,−1,1,1,1,−1,-
1,1,1,1,1,1,1]
PAPR: 4.1522

Table 30 illustrates PAPR results measured when the AP transmits a 10 MHz narrowband WUR packet reusing a VHT-STE sequence by Manchester coding using OOK modulation.

TABLE 30

Seq[−16:15] = ± [1,0, 1,0, −1,0, 1,0, −1,0, 1,0, −1,0, −1,0, 1,0,
1,0, −1,0, −1,0, 1,0, 1,0,
1,0, 1, 0];
PAPR[dB] : 3.4912
Seq[−16:15] = ± [ 1,0, 1,0, −1,0, 1,0, −1,0, 1,0, −1,0, −1,0, 1,0,
1,0, −1,0, −1,0, 1,0, 1,0,
1,0, 1, 0];
PAPR[dB] : 3.4912
Seq[−16:15] = ± [−1,0, −1,0, 1,0, −1,0, 1,0, −1,0, −1,0, 1,0,
1,0, −1,0, −1,0, 1,0, 1,0,
1,0, 1,0, 1, 0]
PAPR[dB] : 3.1036
Seq[−16:15] = ± [−1,0, −1,0, 1,0, −1,0, 1,0, −1,0, −1,0, 1,0,
1,0, −1,0, −1,0, 1,0, 1,0,
1,0, 1,0, 1, 0]
PAPR[dB] : 3.1036

TABLE 30-continued

Seq[−16:15] = ± [−1,0, 1,0,−1,0, 1,0,−1,0,−1,0, 1,0, 1,0,−1,0,−1,0, 1,0,
1,0,1,0,1,0,1,0,1, 0]
PAPR[dB] : 3.2992
Seq[−16:15] = ± [1,0, 1,0,−1,0, 1,0,−1,0,−1,0, 1,0, 1,0,−1,0,−1,0, 1,0,
1,0,1,0,1,0,1,0,1, 0];
PAPR[dB] : 3.2992

Table 31 illustrates PAPR results measured when the AP transmits a 5 MHz narrowband WUR packet reusing a VHT-STF sequence by OOK modulation. In the following description, for convenience, a narrowband WUR packet sequence is mapped to [−8:7] but may be construed as being mapped to [−7:8] if necessary.

TABLE 31

[Left Right] = [3, 0] case
Seq[−8:7] = ± [1, 1,−1, 1,−1, 1,−1,−1,1, 1,−1,−1,1,1,1,1]
PAPR: 3.1036
Seq[−8:7] = ± [1, 1,−1, 1,−1, 1,−1,−1, 0, 1,−1,−1,1,1,1,1] ;
PAPR: 3.5297
[Left Right] = [1, 2] case
Seq[−8:7] = ± [−1,−1, 1,−1, 1,−1,−1, 1, 1,−1,−1, 1,1,1,1,1]
PAPR: 3.1036
Seq[−8:7] = ± [−1,−1, 1,−1, 1,−1,−1, 1, 0, −1,−1, 1,1,1,1,1];
PAPR: 3.2692

TABLE 31-continued

[Left Right] = [0, 3] case
Seq[−8:7] = ± [1,−1,1,−1,−1,1,1,−1,−1,1,1,1,1,1,1,1]
PAPR: 3.4912
Seq[−8:7] = ± , 1,−1,1,−1,−1,1,1,−1, 0, 1,1,1,1,1,1,1]
PAPR: 5.1410
[Left Right] = [2, 1] case
Seq[−8:7] = ± [−1, 1,−1, 1,−1,−1, 1, 1,−1,−1, 1, 1,1,1,1,1]
PAPR: 3.3345
Seq[−8:7] = ± [−1, 1,−1, 1, −1,−1, 1, 1, 0, −1, 1, 1,1,1,1,1];
PAPR: 3.8464

Table 32 illustrates PAPR results measured when the AP transmits a 5 MHz narrowband WUR packet reusing a VHT-STF sequence by Manchester coding using OOK modulation.

TABLE 32

Seq[−7:8] = ± [−1,0, 1,0, −1,0, 1,0, −1,0, −1,0, 1,0, 1, 0]
PAPR[dB] : 3.0103

TABLE 32-continued

Seq[−7:8] = ± [−1,0, 1,0, −1,0, 1,0, −1,0, −1,0, 1,0, 1, 0]
PAPR[dB] : 3.0103
Seq[−7:8] = ± [1,0, −1,0, −1,0, 1,0, 1,0, 1,0, 1,0, 1, 0]
PAPR[dB] : 3.0103
Seq[−7:8] = ± [1,0, −1,0, −1,0, 1,0, 1,0, 1,0, 1,0, 1,0]
PAPR[dB] : 3.0103

Table 33 illustrates PAPR results measured when the AP transmits a 4 MHz narrowband WUR packet reusing a VHT-STF sequence by OOK modulation.

TABLE 33

Seq[−6:6] = ± [ 1, −1, 1, −1, −1, 1, 1, −1, −1, 1, 1, 1, 1]
PAPR[dB] : 3.0222
Seq[−6:6] = ± [1, −1, 1, −1, −1, 1, 0, −1, −1, 1, 1, 1, 1];
PAPR[dB] : 2.2394

Table 34 illustrates PAPR results measured when the AP transmits a 4 MHz narrowband WUR packet reusing a VHT-STF sequence by Manchester coding using OOK modulation.

TABLE 34

- # of sub-carriers : 6
Seq[−5:6] = ± [1, 0, −1, 0, −1, 0, 1, 0, 1, 0, 1, 0]
PAPR[dB] = 3.5088
Seq[−5:6] = ± [0, 1, 0, −1, 0, −1, 0, 1, 0, 1, 0, 1]
PAPR[dB] = 3.5088
- # of sub-carriers : 7
Seq[−7:6] = ± [1, 0, −1, 0, −1, 0, 1, 0, 1, 0, 1, 0, 1, 0]
PAPR[dB] = 2.7711
Seq[−6:7] = ± [0, 1, 0, −1, 0, −1, 0, 1, 0, 1, 0, 1, 0, 1]
PAPR[dB] = 2.7711

Table 35 illustrates PAPR results measured when the AP transmits a 2.5 MHz narrowband WUR packet reusing a VHT-STF sequence by OOK modulation. In the following description, for convenience, a narrowband WUR packet sequence is mapped to [−4:3] but may be construed as being mapped to [−3:4] if necessary.

TABLE 35

Seq[−4:3] = ± [−1,1,−1,1,−1,−1,1,1]
PAPR[dB]: 3.0103
Seq[−4:3] = ± [−1,1,−1,0,−1,−1,1,1];
PAPR[dB]: 2.2902
Seq[−4:3] = ± [1,−1,−1,1,1,1,1,1]
PAPR[dB] : 3.0103
Seq[−4:3] = ± [1,−1,−1,1,0,1,1,1] ;
PAPR[dB] : 2.2902

Table 36 illustrates PAPR results measured when the AP transmits a 2.5 MHz narrowband WUR packet reusing a VHT-STF sequence by Manchester coding using OOK modulation.

TABLE 36

Seq[−3:4] = ± [1, 0, −1, 0, −1, 0, 1, 0]
PAPR[dB] : 3.7481
Seq[−4:3] = ± [0, 1, 0, −1, 0, −1, 0, 1]
PAPR[dB] : 3.7481

Embodiment 2

In some embodiments of the present invention, the AP may use a frequency band of 8 MHz as a frequency band for a WUR symbol. Here, the number of subcarriers corresponding to the frequency band of 8 MHz may be set to 26.

Hereinafter, methods of determining a sequence having a length of 26 for an 8 MHz WUR packet respectively using a full search method, an optimal search method, and a conventional reusing method will be described. A sequence having a length of 26 for a WUR packet may be determined according to OOK modulation, Manchester coding using OOK modulation, and a symbol reduction method.

Hereinafter, a WUR sequence that can be obtained using a full search method will be described.

Table 37 illustrates WUR packet sequences according to OOK modulation determined by the full search method and PAPR results measured using the sequences.

TABLE 37

Seq = ± [−1 1 −1 1 1 1 −1 1 −1 −1 1
1 1 1 1 1 −1 1 1 −1 −1 −1 1 1
−1 −1]
Seq = ± [1 1 −1 −1 1 1 1 −1 −1 1 1 −1 −1
−1 −1 −1 −1 1 1 −1 1 −1 −1 −1 1 −1
1]
Seq = ± [1 1 1 1 −1 1 1 1 1 1 −1 −1
1 −1 1 −1 1 1 1 −1 −1 1 1 −1 −1 1
1 −1]
Seq = ± [1 −1 −1 1 1 −1 1 1 −1 −1 1 1
−1 1 −1 1 1 −1 1 −1 −1 1 1 −1 −1 −1
−1]
PAPR[dB] = 2.3665

Table 38 illustrates WUR packet sequences according to Manchester coding using OOK modulation determined by the full search method and PAPR results measured using the sequences.

TABLE 38

Seq = ± [1 0 1 0 1 0 −1 0 −1 0 −1
0 1 0 1 0 −1 0 1 0 1 0 −1 0
1 0]
Seq = ± [1 0 −1 0 1 0 1 0 −1 0 1
0 1 0 −1 0 −1 0 −1 0 1 0 1 0
1 0]
Seq = ± [0 1 0 1 0 1 0 −1 0 −1 0 −1
0 1 0 1 0 −1 0 1 0 1 0 −1 0
1]
Seq = ± [0 1 0 −1 0 1 0 1 0 −1 0 1
0 1 0 −1 0 −1 0 −1 0 1 0 1 0
1]
PAPR[dB] = 2.0992

Table 39 illustrates WUR packet sequences according to 0.8-usec symbol reduction determined by the full search method and PAPR results measured using the sequences.

TABLE 39

Seq = ± [1 0 0 0 1 0 0 0 1 0 0
0 −1 0 0 0 −1 0 0 0 1 0 0 0
−1 0]
Seq = ± [1 0 0 0 −1 0 0 0 1 0 0
0 1 0 0 0 −1 0 0 0 −1 0 0 0
−1 0]
Seq = ± [0 1 0 0 0 1 0 0 0 1 0
0 0 −1 0 0 0 −1 0 0 0 1 0 0 0
0 −1]
Seq = ± [0 1 0 0 0 −1 0 0 0 1 0
0 0 1 0 0 0 −1 0 0 0 −1 0 0 0
0 −1]
PAPR[dB] = 1.3576
Seq = ± [0 0 1 0 0 0 1 0 0 0 −1 0
0 0 1 0 0 0 −1 0 0 0 −1 0 0
0]

TABLE 39-continued

Seq = ± [0 0 1 0 0 0 −1 0 0 0 −1 0 0 0 −1 0 0 0 −1 0 0 0 1 0 0 0]
Seq = ± [0 0 0 1 0 0 0 1 0 0 0 −1 0 0 0 1 0 0 0 −1 0 0 0 −1 0 0]
Seq = ± [0 0 0 1 0 0 0 −1 0 0 0 −1 0 0 0 −1 0 0 0 −1 0 0 0 1 0 0]
PAPR[dB] = 3.1145
Seq = ± [1 0 0 0 1 0 0 0 1 0 0 0 −1 0 0 0 1 0 0 0 −1 0 0 0 −1 0]
Seq = ± [−1 0 0 0 1 0 0 0 −1 0 0 0 −1 0 0 0 −1 0 0 0 1 0 0 0 1 0]
Seq = ± [0 1 0 0 0 1 0 0 0 1 0 0 0 −1 0 0 0 1 0 0 0 −1 0 0 0 −1]
Seq = ± [0 −1 0 0 0 1 0 0 0 −1 0 0 0 −1 0 0 0 −1 0 0 0 1 0 0 0 1]
PAPR[dB] = 3.2956

Table 40 illustrates WUR packet sequences according to 0.4-usec symbol reduction determined by the full search method and PAPR results measured using the sequences.

TABLE 40

Seq = ± [1 0 0 0 0 0 0 0 1 0 0 0 0 0 0 1 0 0 0 0 0 0 0 −1 0]
Seq = ± [1 0 0 0 0 0 0 0 1 0 0 0 0 0 −1 0 0 0 0 0 0 0 1 0]
Seq = ± [1 0 0 0 0 0 0 0 −1 0 0 0 0 0 0 1 0 0 0 0 0 0 0 1 0]
Seq = ± [1 0 0 0 0 0 0 0 −1 0 0 0 0 0 −1 0 0 0 0 0 0 0 −1 0]
Seq = ± [0 1 0 0 0 0 0 0 0 1 0 0 0 0 0 0 0 1 0 0 0 0 0 0 0 −1]
Seq = ± [0 1 0 0 0 0 0 0 0 1 0 0 0 0 0 0 −1 0 0 0 0 0 0 0 1]
Seq = ± [0 1 0 0 0 0 0 0 0 −1 0 0 0 0 0 0 0 1 0 0 0 0 0 0 0 1 0]
Seq = ± [0 1 0 0 0 0 0 0 −1 0 0 0 0 0 0 0 −1 0 0 0 0 0 0 0 −1]
PAPR[dB] = 2.4753
Seq = ± [0 0 0 1 0 0 0 0 0 0 0 1 0 0 0 0 0 0 0 −1 0 0 0 0]
Seq = ± [0 0 0 1 0 0 0 0 0 0 0 −1 0 0 0 0 0 0 0 −1 0 0 0 0]
PAPR[dB] = 2.2185

Hereinafter, a WUR packet sequence that can be obtained using an optimal coefficient method will be described.

When the optimal coefficient method is used, a WUR packet sequence may be obtained by setting a first coefficient of each sequence to 1 or −1 and sequentially putting a coefficient value enabling a low PAPR measurement into subsequent coefficients.

Table 41 illustrates WUR packet sequences according to each coding mode determined by the optimal coefficient method and PAPR results measured using the sequences.

TABLE 41

1) OOK

Seq = ± [1,1,−1,1,−1,−1,1,1,−1,1,1,1,1,−1,−1,1,1,1,−1,1,−1,−1,−1,1,1,−1];
PAPR[dB] = 4.6466
2) OOK with Manchester coding Seq = ± [1,0, 1,0, −1,0, 1,0, −1,0, −1,0, −1,0, 1,0, 1,0, −1,0, 1,0, 1,0, 1, 0];
Seq = ± [0, 1,0, 1,0, −1,0, 1,0, −1,0, −1,0, −1,0, 1,0, 1,0, −1,0, 1,0, 1,0, 1];
PAPR[dB] = 3.8686
3) symbol reduction 0.8us Seq = ± [1 0 0 0 1 0 0 0 −1 0 0 0 1 0 0 0 −1 0 0 0 −1 0 0 0 −1 0];
Seq = ± [0 1 0 0 0 1 0 0 0 −1 0 0 0 1 0 0 0 −1 0 0 0 −1 0 0 0 −1];
PAPR[dB]=3.2956
Seq = ± [0 0 1 0 0 0 1 0 0 0 −1 0 0 0 1 0 0 0 −1 0 0 0 −1 0 0];
Seq = ± [0 0 0 1 0 0 0 1 0 0 0 −1 0 0 0 1 0 0 0 −1 0 0 0 −1 0 0];
PAPR[dB] = 3.1145
4) symbol reduction 0.4us Seq = ± [1 0 0 0 0 0 0 1 0 0 0 0 0 0 −1 0 0 0 0 0 0 0 1 0];
Seq = ± [0 1 0 0 0 0 0 0 1 0 0 0 0 0 0 −1 0 0 0 0 0 0 0 1];
PAPR[dB] = 2.4753
Seq = ± [0 0 1 0 0 0 0 0 0 1 0 0 0 0 0 0 −1 0 0 0 0 0 0 0];
Seq = ± [0 0 0 1 0 0 0 0 0 0 1 0 0 0 0 0 0 −1 0 0 0 0 0 0];
Seq = ± [0 0 0 0 1 0 0 0 0 0 0 1 0 0 0 0 0 0 −1 0 0 0 0 0 0];
Seq = ± [0 0 0 0 0 1 0 0 0 0 0 0 1 0 0 0 0 0 0 −1 0 0 0 0];
Seq = ± [0 0 0 0 0 0 1 0 0 0 0 0 0 1 0 0 0 0 0 0 −1 0 0 0];
Seq = ± [0 0 0 0 0 0 0 1 0 0 0 0 0 0 1 0 0 0 0 0 0 −1 0 0];
PAPR[dB] = 2.2185

Hereinafter, a WUR packet sequence that can be obtained reusing an existing sequence will be described.

In one embodiment, a method of determining a sequence for WUR packet transmission reusing a Baker sequence will be described. A Baker sequence having a length of 4 may be {1,1,−1,1} or {1,1,1,−1}, and a Baker sequence having a length of 7 may be {1,1,1,−1,−1,1,−1}. Further, a Baker sequence having a length of 13 may be {1,1,1,1,1, −1,−1, 1,1,−1,1,−1,1}.

According to Manchester coding using OOK modulation, a sequence having a length of 26 may be obtained by inserting a coefficient of 0 into the Baker sequence having a length of 13 at intervals. According to 0.8-usec symbol reduction, a sequence having a length of 26 may be obtained by inserting three coefficients of 0 into the Baker sequence having a length of 7 at intervals. According to 0.4-usec symbol reduction, a sequence having a length of 26 may be obtained by inserting seven coefficients of 0 into the Baker sequence having a length of 4 at intervals.

Table 42 illustrates WUR packet sequences according to each coding mode determined using a Baker sequence and PAPR results measured using the sequences.

TABLE 42

1) OOK

Seq = ± [1, −1, 1, −1, −1, 1, 1, −1, −1, 1, 1, 1, 1 1 1 1 −1 −1 1 1 −1 −1 1 −1 1]
PAPR[dB] = 5.3659
Seq = ± [1,−1, 1, −1, −1, 1, 1, −1, −1, 1, 1, 1, 1, j, −j, j, −j, −j, j, j, −j, −j, j, j, j, j];
PAPR[dB] = 5.7112

TABLE 42-continued

2) OOK with Manchester coding

Seq = ± [1,0, −1,0, 1,0, −1,0, −1,0, 1,0, 1,0, −1,0, −1,0, 1,0, 1,0, 1,0, 1, 0];
Seq = ± [0, 1,0, −1,0, 1,0, −1,0, −1,0, 1,0, 1,0, −1,0, −1,0, 1,0, 1,0, 1,0, 1];
PAPR[dB] = 3.0222
2) symbol reduction 8us Seq = ± [1 0 0 0 1 0 0 0 1 0 0 0 −1 0 0 0 −1 0 0 0 1 0 0 0 −1 0 ];
Seq = ± [0 1 0 0 0 1 0 0 0 1 0 0 0 −1 0 0 0 −1 0 0 0 1 0 0 0 −1];
PAPR[dB] = 1.3576
3) symbol reduction 4us Seq = ± [1 0 0 0 0 0 0 0 1 0 0 0 0 0 0 0 −1 0 0 0 0 0 0 0 1 0];
Seq = ± [0 1 0 0 0 0 0 0 0 1 0 0 0 0 0 0 0 −1 0 0 0 0 0 0 0 1];
Seq = ± [1 0 0 0 0 0 0 0 1 0 0 0 0 0 0 0 1 0 0 0 0 0 0 0 −1 0];
Seq = ± [0 1 0 0 0 0 0 0 0 1 0 0 0 0 0 0 0 1 0 0 0 0 0 0 0 −1];
PAPR[dB] = 2.4753

In another embodiment, a method of determining a WUR packet sequence for WUR packet transmission reusing the foregoing VHT-STF sequence will be described.

A sequence having the lowest PAPR and a length of 26 may be obtained by repeating sequence b twice or by performing phase-rotation on each coefficient. Alternatively, a method of repeating sequence b multiplied by −1^(index) may be considered. For example, the sequence having a length of 26 may be, for example, [b, j*b] or [b, b*b], but the present invention is not limited thereto.

Table 43 illustrates WUR packet sequences according to each coding mode determined using a VHT-STF sequence and PAPR results measured using the sequences

TABLE 43

1) OOK

Seq = ± = 1, −1, 1, −1, −1, 1, 1, −1, −1, 1, 1, 1, 1 1 1 1 1 −1 −1 1 1 −1 −1
1 −1 1]
PAPR[dB] = 5.3659
Seq = ± = 1, −1, 1, −1, −1, 1, 1, −1, −1, 1, 1, 1, 1, j, −j, j, −j, −j, j, j, −j, −j,
j, j, j, j ];
PAPR[dB] = 5.7112
2) OOK with Manchester coding Seq = ± [1,0, −1,0, 1,0, −1,0, −1,0, 1,0, 1,0, −1,0, −1,0, 1,0, 1,0, 1,0, 1, 0];
Seq = ± [0, 1,0, −1,0, 1,0, −1,0, −1,0, 1,0, 1,0, −1,0, −1,0, 1,0, 1,0, 1,0, 1];
PAPR[dB] = 3.0222

Embodiment 3

Hereinafter, a method of mapping a WUR packet sequence determined according to Embodiment 1-1, 1-2, or 2 to the entire 20 MHz subcarrier frequency band.

For convenience, the present specification illustrates a method of mapping a determined WUR packet sequence to a subcarrier arrangement provided by an IEEE 802.11a or IEEE 802.11ac system, but the present invention is not limited thereto.

Although a method in which an AP maps an 8 MHz WUR packet sequence to a subcarrier arrangement is illustrated below, which is for convenience of description, the foregoing 10 MHz, 5 MHz, 4 MHz, and 2.5 MHz sequences may also be mapped to a subcarrier arrangement in the same manner. Further, the illustrated 8 MHz sequence is an example of a plurality of sequences described above, and the present invention is not limited to proposed mapping of the sequence having a length of 26.

FIG. 18 illustrates a method of mapping a WUR packet sequence onto a frequency domain according to one embodiment of the present invention.

In FIG. 18, (a) and (b) illustrate subcarrier mapping that can be used for an AP to transmit a WUR packet using a narrowband signal as a portion of a wideband signal.

The AP may map a WUR packet sequence to consecutive subcarriers and may set the coefficients of subcarriers other than the mapped subcarriers and a guard subcarrier to 0.

In one embodiment, the determined WUR packet sequence may be mapped to the center of the entire subcarrier frequency domain. Specifically, the WUR sequence may be set to be disposed near subcarrier index k=0.

Table 44 illustrates a WUR packet sequence having a length of 26 of the IEEE 802.11ac system and a sequence in which the WUR packet sequence having a length of 26 of the IEEE 802.11ac system is mapped to the entire 20 MHz signal sequence. That is, Table 44 shows the subcarrier mapping illustrated in (a) and (b) of FIG. 18 in a sequence form.

TABLE 44

Seq[−28:28] = ± [0 0 0 0 0 0 0 0 0 0 0 0 0 0 0 −1 1 −1 1 1 1
−1 1 −1 −1 1 1 1 1 1 1 −1 1 1 1
−1 −1 −1 1 1 1 −1 −1 1 0 0 0 0 0 0 0 0 0 0 0 0 0 0 0]
Seq[−26:26] = ± [ 0 0 0 0 0 0 0 0 0 0 0 0 0 −1 1 −1 1 1 1 −1
1 −1 −1 1 1 1 1 1 1 −1 1 1 1 −1
−1 −1 1 1 1 −1 −1 1 0 0 0 0 0 0 0 0 0 0 0 0 0 0 ]

FIG. 19 illustrates a method of mapping a WUR sequence onto a frequency domain according to another embodiment of the present invention.

In FIG. 19, (a) and (b) illustrate subcarrier mapping that can be used for an AP to transmit a WUR packet directly using a narrowband signal.

When the AP transmits a WUR packet directly using a narrowband signal, the narrowband subcarrier sequence may also be mapped onto the entire 20 MHz signal sequence. In this case, since the WUR packet is transmitted only via the narrowband signal, it is not necessary to consider the coefficients of subcarriers other than subcarriers mapped to the WUR packet sequence. That is, the WUR packet sequence having a length of 26 is mapped only to [−13:12] or [−12:13] and does not affect the coefficients of the remaining subcarriers.

Table 45 illustrates a narrowband WUR packet sequence having a length of 26 of the IEEE 802.11ac system and a sequence in which the narrowband WUR packet sequence having a length of 26 of the IEEE 802.11ac system is mapped to the entire 20 MHz signal sequence. That is, Table 45 shows the subcarrier mapping illustrated in (a) and (b) of FIG. 19 in a sequence form.

TABLE 45

Seq[−13:12] = ± [−1 1 −1 1 1 1 −1 1 −1 −1
1 1 1 1 1 1 −1 1 1 1 −1 −1 −1 1
1 −1 −1]
Seq[−12:13] = ± [−1 1 −1 1 1 1 −1 1 −1 −1
1 1 1 1 1 1 −1 1 1 1 −1 −1 −1 1 1
1 −1 −1]

Hereinafter, a case where a WUR sequence is not mapped to the center of an entire signal sequence will be described.

FIG. 20 illustrates a method of mapping a WUR sequence onto a frequency domain according to another embodiment of the present invention.

In FIG. 20, (a) to (d) illustrate an example of subcarrier mapping that can be used for an AP to transmit a WUR packet using a narrowband signal as a portion of a wideband signal.

According to one embodiment of the present invention, the WUR sequence may be mapped using negative indexes or positive indexes relative to subcarrier index k=0. The coefficients of subcarriers other than subcarriers mapped to the WUR sequence and a guard subcarrier may be set to 0.

Since there are 28 subcarriers having positive or negative indexes in the IEEE 802.11ac system, 26 consecutive subcarriers mapped to a WUR sequence may be selectively mapped to 26 consecutive subcarriers among the positive or negative indexes.

However, since there are 26 subcarriers having positive or negative indexes in the IEEE 802.11a system, 26 consecutive subcarriers mapped to a WUR sequence may have only one pattern for the positive indexes or for the negative indexes.

In FIG. 20, (a) to (c) illustrate an example in which 26 subcarriers mapped to a WUR packet sequence are mapped to subcarriers having a negative index in the IEEE 802.11ac system. In FIG. 20, (d) illustrates an example in which 26 subcarriers mapped to a WUR packet sequence are mapped to subcarriers having a negative index in the IEEE 802.11a system.

Table 46 illustrates an entire sequence in which subcarriers mapped to a WUR packet sequence are mapped to subcarriers having a negative index.

TABLE 46

Seq[−28:28] = ± [−1 1 −1 1 1 1 −1 1 −1 −1
1 1 1 1 1 1 −1 1 1 −1 −1 −1 1
1 −1 −1 0 0 0 0 0 0 0 0 0 0 0 0 0 0 0 0 0 0 0 0 0 0 0 0 0]
Seq[−28:28] = ± [0 −1 1 −1 1 1 1 −1 1 −1 −1
1 1 1 1 1 1 −1 1 1 −1 −1 −1 1
1 −1 −1 0 0 0 0 0 0 0 0 0 0 0 0 0 0 0 0 0 0 0 0 0 0 0 0]
Seq[−28:28] = ± [0 0 −1 1 −1 1 1 1 −1 1 −1 −1
1 1 1 1 1 1 −1 1 1 −1 −1 −1 1
1 −1 −1 0 0 0 0 0 0 0 0 0 0 0 0 0 0 0 0 0 0 0 0 0 0 0]
Seq[−26:26] = ± [−1 1 −1 1 1 1 −1 1 −1 −1
1 1 1 1 1 1 −1 1 1 −1 −1 −1 1
1 −1 −1 0 0 0 0 0 0 0 0 0 0 0 0 0 0 0 0 0 0 0 0 0]

FIG. 21 illustrates a method of mapping a WUR sequence onto a frequency domain according to another embodiment of the present invention.

In FIG. 21, (a) to (d) illustrate another example of subcarrier mapping that can be used for an AP to transmit a WUR packet using a narrowband signal as a portion of a wideband signal.

In the same manner as 26 subcarriers mapped to a WUR packet sequence are mapped to subcarriers having a negative index, the 26 subcarriers may be mapped to subcarriers having a positive index.

In FIG. 21, (a) to (c) illustrate an example in which 26 subcarriers mapped to a WUR packet sequence are mapped to subcarriers having a positive index in the IEEE 802.11ac system. In FIG. 21, (d) illustrates an example in which 26 subcarriers mapped to a WUR packet sequence are mapped to subcarriers having a negative index in the IEEE 802.11a system.

Table 47 illustrates an entire sequence in which subcarriers mapped to a WUR sequence are mapped to subcarriers having a positive index.

TABLE 47

Seq[−28:28] = ± [0 0 0 0 0 0 0 0 0 0 0 0 0 0 0 0 0 0 0 0 0 0 0 0 0 0 0 0 0 0
0 −1 1 −1
1 1 1 −1 1 −1 −1 1 1 1 1 1 1
−1 1 1 −1 −1 −1 1 1 −1 −1 −1]
Seq[−28:28] = ± [0 0 0 0 0 0 0 0 0 0 0 0 0 0 0 0 0 0 0 0 0 0 0 0 0 0 0 0 0
0
0 −1 1 −1
1 1 1 −1 1 −1 −1 1 1 1 1 1 1
−1 1 1 −1 −1 −1 1 1 −1 −1 −1 0]
Seq[−28:28] = ± [0 0 0 0 0 0 0 0 0 0 0 0 0 0 0 0 0 0 0 0 0 0 0 0 0 0 0 0 0 0
0 −1 1 −1
1 1 1 −1 1 −1 −1 1 1 1 1 1 1
−1 1 1 −1 −1 −1 1 1 −1 −1 0 0 ]
Seq[−26:26] = ± [0 0 0 0 0 0 0 0 0 0 0 0 0 0 0 0 0 0 0 0 0 0 0 0 0 0
−1
1 −1 1
1 1 −1 1 −1 −1 1 1 1 1 1 1 −1
1 1 −1 −1 −1 1 1 −1 −1 −1]

FIG. 22 illustrates a method of mapping a WUR packet sequence onto a frequency domain according to another embodiment of the present invention.

In FIG. 22, (a) to 22(d) illustrate another example of subcarrier mapping that can be used for an AP to transmit a WUR packet directly using a narrowband signal.

When the AP transmits a WUR packet directly using a narrowband signal, 26 subcarriers mapped to a WUR packet sequence may also be mapped to subcarriers having a negative index or a positive index in the same manner as the AP transmits a WUR symbol using a narrowband signal as a portion of a wideband signal. In this case, since the WUR packet is transmitted only via the narrowband signal, it is not necessary to consider the coefficients of subcarriers other than subcarriers mapped to the WUR packet sequence.

In FIG. 22, (a) to 22(c) illustrate an example in which 26 subcarriers mapped to a narrowband WUR packet sequence are mapped to subcarriers having a negative index in the IEEE 802.11ac system. In FIG. 22, (d) illustrates an example in which 26 subcarriers mapped to a narrowband WUR packet sequence are mapped to subcarriers having a negative index in the IEEE 802.11a system.

Table 48 illustrates an entire sequence in which subcarriers mapped to a WUR packet sequence are mapped to subcarriers having a positive index.

TABLE 48

Seq[−28:−3] = ± [−1 1 −1 1 1 1 −1 1 −1 −1
1 1 1 1 1 1 −1 1 1 −1 −1 −1 1
1 −1 −1]
Seq[−27:−2] = ± [−1 1 −1 1 1 1 −1 1 −1 −1
1 1 1 1 1 1 −1 1 1 −1 −1 −1 1
1 −1 −1]
Seq[−26:−1] = ± [−1 1 −1 1 1 1 −1 1 −1 −1
1 1 1 1 1 1 −1 1 1 −1 −1 −1 1
1 −1 −1]

FIG. 23 illustrates a method of mapping a WUR packet sequence onto a frequency domain according to another embodiment of the present invention.

In FIG. 23, (a) to 23(d) illustrate another example of subcarrier mapping that can be used for an AP to transmit a WUR packet directly using a narrowband signal.

In the same manner as 26 subcarriers mapped to a narrowband WUR packet sequence are mapped to subcarriers having a negative index, the 26 subcarriers may be mapped to subcarriers having a positive index.

In FIG. 23, (a) to 22(c) illustrate an example in which 26 subcarriers mapped to a narrowband WUR packet sequence are mapped to subcarriers having a positive index in the IEEE 802.11ac system. In FIG. 23, (d) illustrates an example in which 26 subcarriers mapped to a narrowband WUR packet sequence are mapped to subcarriers having a positive index in the IEEE 802.11a system.

Table 49 illustrates an entire sequence in which subcarriers mapped to a WUR packet sequence are mapped to subcarriers having a positive index.

TABLE 49

Seq[1:26] = ± [−1 1 −1 1 1 1 −1 1 −1 −1 1 1 1 1 1 1 −1 1 1 −1 −1 −1 1 1 −1 −1]
Seq[2:27] = ± [−1 1 −1 1 1 1 −1 1 −1 −1 1 1 1 1 1 1 −1 1 1 −1 −1 −1 1 1 −1 −1]
Seq[3:28] = ± [−1 1 −1 1 1 1 −1 1 −1 −1 1 1 1 1 1 1 −1 1 1 −1 −1 −1 1 1 −1 −1]

As described above, there are three examples using a positive index and three example using a negative index as a method for mapping a WUR sequence having a length of 26 in the IEEE 802.11ac system.

Here, the AP may transmit the mapping pattern of a WUR packet sequence to a STA using BSS COLOR bits or STAID.

For example, the AP may transmit the mapping pattern of a WUR packet sequence to a STA through the most significant bit (MSB) or the least significant bit (LSB) of the BSS COLOR bits. When the MSB or LSB of the COLOR bits transmitted by the AP is 0, the STA may determine that the WUR sequence is transmitted, being to mapped subcarriers having a negative index. When the MSB or LSB of the COLOR bits transmitted by the AP is 1, the STA may determine that the WUR sequence is transmitted, being mapped to subcarriers having a positive index. The AP may also reverse the above relationship.

In addition, information about a specific mapping pattern and a mapping index value may be transmitted to the STA via the BSS COLOR bits or STAID.

Embodiment 4

Hereinafter, a method in which an AP transmits a WUR packet to a plurality of STAs at the same time using an entire signal bandwidth when there is a plurality of STAs in a wireless communication system will be described.

In some embodiments of the present invention, the AP may use 4 MHz, 5 MHz, or 8 MHz as a frequency band for WUR packet transmission to a plurality of STAs. Sequences for 13 subcarriers, 16 subcarriers, and 26 subcarriers may be allocated for the respective bands.

A selected frequency band is merely an example of the present invention and is not intended to limit the present invention. A frequency band of 2.5 MHz illustrated above or other frequency bands may be used as a frequency band for WUR packet transmission to a plurality of STAs depending on methods proposed in the present specification.

In some example to be illustrated below, each number in a subcarrier sequence indicates that as many subcarriers as the number are allocated from the start of the indexes of total 20 MHz subcarriers ranging from −32 to 31. Here, an underlined number indicates the number of guard subcarriers (guard tones), and an italic number indicates the number of subcarriers to which a WUR packet is actually allocated. The remaining numbers indicate the number of null subcarriers (null tones).

Further, in each mapping pattern, a subcarrier mapping pattern for transmitting a plurality of WUR packets is preferably determined to be as even as possible, and an entire mapping pattern is preferably configured to be symmetrical. However, the present invention is not limited thereto. In each case, a null tone may be used as a guard tone between different WUR packets.

Hereinafter, a subcarrier mapping pattern for transmitting a plurality of WUR packets may be determined in view of a case where guard subcarriers (6, 5) are allocated, guard subcarriers (4, 3) are allocated, or an arrangement of guard subcarriers is not considered for each WUR packet bandwidth used by the AP.

Hereinafter, a method in which the AP transmits a WUR packet to a plurality of STAs using a 4 MHz band will be described.

Table 50 illustrates a mapping pattern that the AP can use to transmit a WUR packet according to OOS modulation to four STAs using a 4 MHz WUR packet band.

TABLE 50

Option 1 : guard tones (4,3)
    Case 1 : [4 1 *13* 1 *13* 1 *13* 1 *13* 1 3]
    Case 2 : [4 *13* 2 *13* 1 *13* 2 *13* 3]
Option 2 : guard tones (6,5)
    Case 1 : [6 *13* *13* 1 *13* *13* 5]
Option 3 : No considered guard tone
    Case 1 : [3 *13* 2 *13* 3 *13* 2 *13* 2]
    Case 2 : [3 *13* 2 *13* 2 *13* 2 *13* 3]
    Case 3 : [2 *13* 3 *13* 2 *13* 3 *13* 2]
    Case 4 : [2 *13* 2 *13* 3 *13* 2 *13* 3]

Table 51 illustrates a mapping pattern that the AP can use to transmit a WUR packet to three STAs using a 4 MHz WUR packet band. Each mapping pattern may be configured by selecting three examples of 13 subcarriers from among the examples in which the AP transmits the WUR packet to the four STAs.

TABLE 51

Option 1 : guard tones (4,3)
    Case 1 : [4 5 *13* 4 *13* 4 *13* 5 3]
    Case 2 : [4 4 *13* 5 *13* 5 *13* 4 3]
    Case 3 : [4 *13* 9 *13* 9 *13* 3]
Option 2 : guard tones (6,5)
    Case 1 : [6 3 *13* 4 *13* 4 *13* 3 5]
    Case 2 : [6 4 *13* 3 *13* 3 *13* 4 5]
    Case 3 : [6 *13* 7 *13* 7 *13* 5]
Option 3 : No considered guard tone
    Case 1 : [7 *13* 6 *13* 6 *13* 6]
    Case 2 : [6 *13* 7 *13* 6 *13* 6]
    Case 3 : [6 *13* 6 *13* 7 *13* 6]
    Case 4 : [6 *13* 6 *13* 6 *13* 7]

Table 52 illustrates a mapping pattern that the AP can use to transmit a WUR packet to two STAs using a 4 MHz WUR packet band. Each mapping pattern may be configured by selecting two examples of 13 subcarriers from among the examples in which the AP transmits the WUR packet to the three or four STAs.

TABLE 52

Option 1 : guard tones (4,3)
    Case 1 : [4 10 *13* 11 *13* 10 3]
    Case 2: [4 *13* 31 *13* 3]
Option 2 : guard tones (6,5)
    Case 1 : [6 9 *13* 9 *13* 9 5]
    Case 2 : [6 *13* 27 *13* 5]

TABLE 52-continued

Option 3 : No considered guard tone
Case 1 : [13 *13* 13 *13* 12]
Case 2: [13 *13* 12 *13* 13]
Case 3 : [12 *13* 13 *13* 13]

In order that the AP transmits a WUR packet to one STA using a 4 MHz WUR packet band, each mapping pattern may be configured by selecting one example of 13 subcarriers from among the examples in which the AP transmits the WUR packet to the two, three, or four STAs. Alternatively, a mapping pattern may be configured by mapping a subcarrier for a WUR packet to sequence index k=0. This mapping pattern may be [26 13 25]. In this case, interference by a contiguous band is reduced.

Hereinafter, a method in which the AP transmits a WUR packet to a plurality of STAs using a 5 MHz band will be described.

Table 53 illustrates a mapping pattern that the AP can use to transmit a WUR packet to three STAs using a 5 MHz WUR packet band.

TABLE 53

Option 1 : guard tones (4,3)
Case 1 : [4 3 *16* 2 *16* 2 *16* 2 3]
Case 2 : [4 2 *16* 3 *16* 2 *16* 2 3]
Case 3 : [4 2 *16* 2 *16* 3 *16* 2 3]
Case 4 : [4 2 *16* 2 *16* 2 *16* 3 3]
Case 5 : [4 *16* 4 *16* 5 *16* 3]
Case 6: [4 *16* 5 *16* 4 *16* 3]
Option 2 : guard tones (6,5)
Case 1 : [6 2 *16* 1 *16* 1 *16* 1 5]
Case 2 : [6 1 *16* 2 *16* 1 *16* 1 5]
Case 3 : [6 1 *16* 1 *16* 2 *16* 1 5]
Case 4 : [6 1 *16* 1 *16* 1 *16* 2 5]
Case 5 : [6 *16* 2 *16* 3 *16* 5]
Case 6 : [6 *16* 3 *16* 2 *16* 5]
Option 3 : No considered guard tone
Case 1 : [4 *16* 4 *16* 4 *16* 4]

Table 54 illustrates a mapping pattern that the AP can use to transmit a WUR packet to two STAs using a 5 MHz WUR packet band. Each mapping pattern may be configured by selecting two examples of six subcarriers from among the examples in which the AP transmits the WUR packet to the three STAs.

TABLE 54

Option 1 : guard tones (4,3)
Case 1 : [4 9 *16* 8 *16* 8 3]
Case 2 : [4 8 *16* 9 *16* 8 3]
Case 3 : [4 8 *16* 8 *16* 9 3]
Case 4 : [4 *16* 25 *16* 3]
Case 5 : [4 9 *16* 8 *16* 8 3]
Option 2 : guard tones (6,5)
Case 1 : [6 7 *16* 7 *16* 7 5]
Case 2 : [6 *16* 21*16* 5]
Option 3 : No considered guard tone
Case 1 : [11 *16* 11 *16* 10]
Case 2 : [11 *16* 10 *16* 10]
Case 3 : [10 *16* 11 *16* 10]

Hereinafter, a method in which the AP transmits a WUR packet to a plurality of STAs using a 8 MHz band will be described.

Table 55 illustrates a mapping pattern that the AP can use to transmit a WUR packet to four STAs using a 8 MHz WUR packet band.

TABLE 55

Option 1 : guard tones (4,3)
Case 1 : [4 1 26 3 26 1 3]
Case 2 : [4 2 26 1 26 2 3]
Case 3 : [4 2 26 2 26 1 3]
Case 4 : [4 1 26 2 26 2 3]
Case 5 : [4 26 5 26 3]
Option 2 : guard tones (6,5)
Case 1 : [6 2 *16* 1 *16* 1 *16* 1 5]
Case 2 : [6 1 *16* 2 *16* 1 *16* 1 5]
Case 3 : [6 1 *16* 1 *16* 2 *16* 1 5]
Case 4 : [6 1 *16* 1 *16* 1 *16* 2 5]
Case 5 : [6 *16* 2 *16* 3 *16* 5]
Case 6 : [6 *16* 3 *16* 2 *16* 5]
Option 3 : No considered guard tone
Case 1 : [4 26 4 26 4]

According to the foregoing methods, when the AP transmits a plurality of WUR packets, the AP transmits the WUR packets having the same WUR sequence to the respective STA. When the AP transmits the WUR packets having the same sequence to the plurality of STAs, an entire channel has a high PAPR. To reduce the PAPR of the entire channel, the present invention proposes a method in which the AP transmits a WUR packet sequence allocated for each STA via phase rotation to the plurality of STAs.

Specifically, two sequences according to OOK modulation and Manchester coding using OOK modulation are illustrated as examples, but the present invention is not limited thereto. Various examples of a sequence illustrated in Embodiment 1 and Embodiment 2 may be applied to the present invention.

Table 56 illustrates a WUR packet sequence available in some embodiments of the present invention. For convenience of description, a method in which the AP transmits a WUR packet to the plurality of STAs using a sequence proposed in Table 54 is illustrated below.

TABLE 56

OOK sequence

OOK_4 MHz (number of sub-carriers: 13) = ± [1, 1, 1, −1, −1, −1, 1, 1, −1, 1, 1, −1, 1]
OOK_5 MHz (number of sub-carriers: 16) = ± [1, 1, 1, −1, −1, −1, −1, 1, −1, −1, 1, −1, −1, −1, 1, −1]
OOK_8 MHz (number of sub-carriers: 26) = ± [1, 1, 1, 1, −1, 1, 1, 1, 1,−1,−1, 1,−1, 1,−1, 1, 1, 1,−1,−1, 1,−1, −1, 1, 1,−1]
OOK with Manchester coding sequence OOK_with_Man_4 MHz (number of sub-carriers: 13) = ± [1, 0, 1, 0, 1, 0, −1, 0, −1, 0, 1, 0, −1]
OOK_with_Man_5 MHz (number of sub-carriers: 16) = ± [1, 0, 1, 0, 1, 0, −1, 0, 1, 0, −1, 0, − 1, 0, 1, 0]
OOK_with_Man_8 MHz (number of sub-carriers: 26) = ± [1, 0, 1, 0, 1, 0, −1, 0, −1, 0, −1, 0, − 1, 0, 1, 0, −1, 0, −1, 0, 1, 0, −1, 0, −1, 0, −1, 0, 1, 0, 1, 0, −1, 0]

A subcarrier mapping pattern for WUR packet sequences for a plurality of STAs may be obtained by mapping a plurality of WUR packet sequences to an entire 20 MHz frequency band and performing phase rotation on each WUR sequence allocated to each STA. An optimal mapping pattern is preferably obtained by selecting a mapping pattern in which the lowest PAPR is measured.

Phase rotation may be performed by rotating an entire sequence for each STA through 0°, 90°, 180°, and 270°. That is, phase rotation may be performed by multiplying each sequence by 1 (0°), j (90°), −1 (180°), and −j (270°).

In some examples to be illustrated below, the expressions of Case [ ] and rotation [d1, d2, d3] are used to indicate a mapping pattern obtained by performing phase rotation by d1 on a sequence for a first STA in a sequence having 64 indexes and performing phase rotation by d2 and phase rotation by d3 respectively on sequences for a second STA and a third STA. Further, PAPR measured in each example is illustrated. Illustrated PAPR values and phase rotation values are merely examples and are not intended to limit the present invention.

Embodiment 4-1

Hereinafter, a method in which an AP transmits a WUR packet using OOK modulation to a plurality of STAs using a 4 MHz band will be described.

Table 57 illustrates a mapping pattern that the AP can use to transmit a WUR packet using OOK modulation to four STAs using a 4 MHz WUR packet band and a PAPR value measured in each mapping pattern.

TABLE 57

Option 1 : guard tones (4,3)
    Case 1 : [4 1 *13* 1 *13* 1 *13* 1 *13* 1 3] , Rotation: [1 1 1 −1] or [1 −1 −1 −1],
    PAPR[dB] = 4.4254
    Case 2 : [4 *13* 2 *13* 1 *13* 2 *13* 3] , Rotation: [1 1 −1 1] or [1 −1 1 1],
    PAPR[dB] = 4.5976
Option 2 : guard tones (6,5)
    Case 1 : [6 *13* *13* 1 1 *13* *13* 5] , Rotation: [1 j −j −1] or [1 −j j −1],
    PAPR[dB] = 4.4204
Option 3 : No considered guard tone
    Case 1 : [3 *13* 2 *13* 3 *13* 2 *13* 2] , Rotation: [1 1 1 −1] or [1 −1 −1 −1],
    PAPR[dB] = 4.4802
    Case 2 : [3 *13* 2 *13* 2 *13* 2 *13* 3] , Rotation: [1 1 1 −1] or [1 −1 −1 −1] or [1 1 −1 1] or [1 −1 1 1], PAPR[dB] = 4.5483
    Case 3 : [2 *13* 3 *13* 2 *13* 3 *13* 2] , Rotation: [1 1 j −j] or [1 1 −j j] or [1 −1 j j] or [1 −1 −j −j], PAPR[dB] = 4.7293
    Case 4 : [2 *13* 2 *13* 3 *13* 2 *13* 3] , Rotation: [1 1 1 −1] or [1 −1 −1 −1],
    PAPR[dB] = 4.4802

Table 58 illustrates a mapping pattern that the AP can use to transmit a WUR packet using OOK modulation to three STAs using a 4 MHz WUR packet band and a PAPR value measured in each mapping pattern.

TABLE 58

Option 1 : guard tones (4,3)
    Case 1 : [4 5 *13* 4 *13* 4 *13* 5 3] , Rotation: [1 j 1] or [1 −j 1],
    PAPR[dB] = 4.1095
    Case 2 : [4 4 *13* 5 *13* 5 *13* 4 3] , Rotation: [1 j 1] or [1 −j 1],
    PAPR[dB] = 4.2123
    Case 3 : [4 *13* 9 *13* 9 *13* 3] , Rotation: [1 1 −1] or [1 −1 −1],
    PAPR[dB] = 4.1507
Option 2 : guard tones (6,5)
    Case 1 : [6 3 *13* 4 *13* 4 *13* 3 5] , Rotation: [1 j 1] or [1 −j 1],
    PAPR[dB] = 4.1095
    Case 2 : [6 4 *13* 3 *13* 3 *13* 4 5] , Rotation: [1 1 −1] or [1 −1 −1],
    PAPR[dB] = 4.2250
    Case 3 : [6 *13* 7 *13* 7 *13* 5] , Rotation: [1 j 1] or [1 −j 1], PAPR[dB] = 4.0948
Option 3 : No considered guard tone
    Case 1 : [7 *13* 6 *13* 6 *13* 6] , Rotation: [1 j 1] or [1 −j 1], PAPR[dB] = 4.1572

TABLE 58-continued

Case 2 : [6 *13* 7 *13* 6 *13* 6] , Rotation: [1 −1 1] or [1 −1 −1], PAPR[dB] = 6.2662
Case 3 : [6 *13* 6 *13* 6 *13* 7] , Rotation: [1 j 1] or [1 −j 1], PAPR[dB] = 4.1572

Table 59 illustrates a mapping pattern that the AP can use to transmit a WUR packet using OOK modulation to two STAs using a 4 MHz WUR packet band and a PAPR value measured in each mapping pattern.

TABLE 59

Option 1 : guard tones (4,3)
    Case 1 : [4 10 *13* 11 *13* 10 3] , Rotation: [1 −1], PAPR[dB] = 4.8662
    Case 2 : [4 *13* 31 *13* 3] , Rotation: [1 −1], PAPR[dB] = 4.9341
Option 2 : guard tones (6,5)
    Case 1 : [6 9 *13* 9 *13* 9 5] , Rotation: [1 1], PAPR[dB] = 4.7749
    Case 2 : [6 *13* 27 *13* 5] , Rotation: [1 1], PAPR[dB] = 4.8782
Option 3 : No considered guard tone
    Case 1 : [13 *13* 13 *13* 12] , Rotation: [1 1], PAPR[dB] = 4.9712
    Case 2 : [13 *13* 12 *13* 13] , Rotation: [1 j] or [1 −j], PAPR[dB] = 4.9685
    Case 3 : [12 *13* 13 *13* 13] , Rotation: [1 1], PAPR[dB] = 4.9712

Hereinafter, a method in which an AP transmits a WUR packet to a plurality of STAs using a 5 MHz band will be described.

Table 60 illustrates a mapping pattern that the AP can use to transmit a WUR packet using OOK modulation to three STAs using a 5 MHz WUR packet band and a PAPR value measured in each mapping pattern.

TABLE 60

Option 1: guard tones (4,3)
    Case 1 : [4 3 *16* 2 *16* 2 *16* 2 3] , Rotation: [1 j 1] or [1 −j 1],
    PAPR[dB] = 4.3587
    Case 2 : [4 2 *16* 3 *16* 2 *16* 2 3] , Rotation: [1 −1 −1],
    PAPR[dB] = 5.5757
    Case 3 : [4 2 *16* 2 *16* 3 *16* 2 3] , Rotation: [1 1 −1],
    PAPR[dB] = 5.5757
    Case 4 : [4 2 *16* 2 *16* 2 *16* 3 3] , Rotation: [1 j 1] or [1 −j 1],
    PAPR[dB] = 4.3578
    Case 5 : [4 *16* 4 *16* 5 *16* 3] , Rotation: [1 1 1],
    PAPR[dB] = 6.1238
    Case 6: [4 *16* 5 *16* 4 *16* 3] , Rotation: [1 1 1],
    PAPR[dB] = 6.1238
Option 2 : guard tones (6,5)
    Case 1 : [6 2 *16* 1 *16* 1 *16* 1 5] , Rotation: [1 j 1] or [1 −j 1],
    PAPR[dB] = 4.2838
    Case 2 : [6 1 *16* 2 *16* 1 *16* 1 5] , Rotation: [1 1 1],
    PAPR[dB] = 5.7755
    Case 3 : [6 1 *16* 1 *16* 2 *16* 1 5] , Rotation: [1 −1 −1],
    PAPR[dB] = 5.7755
    Case 4 : [6 1 *16* 1 *16* 1 *16* 2 5] , Rotation: [1 1 1] or [1 −j 1] or [1 j 1],
    PAPR[dB] = 4.2838
    Case 5 : [6 *16* 2 *16* 3 *16* 5] , Rotation: [1 1 −1],
    PAPR[dB] = 5.5757
    Case 6 : [6 *16* 3 *16* 2 *16* 5] , Rotation: [1 −1 −1],
    PAPR[dB] = 5.5757
Option 3 : No considered guard tone
    Case 1 : [4 *16* 4 *16* 4 *16* 4] , Rotation: [1 1 −1] or [1 −1 −1],
    PAPR[dB] = 4.4020

Table 61 illustrates a mapping pattern that the AP can use to transmit a WUR packet using OOK modulation to two STAs using a 5 MHz WUR packet band and a PAPR value measured in each mapping pattern.

TABLE 61

Option 1: guard tones (4,3)
  Case 1 : [4 9 *16* 8 *16* 8 3] , Rotation: [1 j] or[1 -j],
  PAPR[dB] = 5.1607
  Case 2 : [4 8 *16* 9 *16* 8 3] , Rotation: [1 -1], PAPR[dB] = 5.0467
  Case 3 : [4 8 *16* 8 *16* 9 3] , Rotation: [1 j] or[1 -j],
  PAPR[dB] = 5.1607
  Case 4 : [4 *16* 25 *16* 3] , Rotation: [1 -1], PAPR[dB] = 5.1841
Option 2 : guard tones (6,5) are considered
  Case 1 : [6 7 *16* 7 *16* 7 5] , Rotation: [1 -1], PAPR[dB] = 4.7119
  Case 2 : [6 *16* 21*16* 5] , Rotation: [1 1], PAPR[dB] = 5.0414
Option 3 : No considered guard tone
  Case 1 : [11 *16* 11 *16* 10] , Rotation: [1 1], PAPR[dB] = 5.0753
  Case 2 : [11 *16* 10 *16* 10] , Rotation: [1 -1], PAPR[dB] = 5.1848
  Case 3 : [10 *16* 11 *16* 10] , Rotation: [1 1], PAPR[dB] = 5.0753

Hereinafter, a method in which an AP transmits a WUR packet using OOK modulation to a plurality of STAs using an 8 MHz band will be described.

Table 62 illustrates a mapping pattern that the AP can use to transmit a WUR packet using OOK modulation to two STAs using an 8 MHz WUR packet band and a PAPR value measured in each mapping pattern.

TABLE 62

Option 1 : guard tones (4,3)
  Case 1 : [4 1 *26* 3 *26* 1 3] , Rotation: [1 1], PAPR[dB] = 4.6042
  Case 2 : [4 2 *26* 1 *26* 2 3] , Rotation: [1 1], PAPR[dB] = 4.6830
  Case 3 : [4 2 *26* 2 *26* 1 3] , Rotation: [1 j] or [1 -j],
  PAPR[dB] = 4.9204
  Case 4 : [4 1 *26* 2 *26* 2 3] , Rotation: [1 j] or [1 -j],
  PAPR[dB] = 4.9204
  Case 5 : [4 *26* 5 *26* 3] , Rotation: [1 -1], PAPR[dB] = 4.6252
Option 2 : guard tones (6,5)
  Case 1 : [6 *26* 1 *26* 5] , Rotation: [1 1], PAPR[dB] = 4.6830
Option 3 : No considered guard tone
  Case 1 : [4 *26* 4 *26* 4] , Rotation: [1 -1], PAPR[dB] = 4.7349

Embodiment 4-2

Hereinafter, a method in which an AP transmits a WUR packet according to Manchester coding using OOK modulation to a plurality of STAs using a 4 MHz band will be described.

Table 63 illustrates a mapping pattern that the AP can use to transmit a WUR packet according to Manchester coding using OOK modulation to four STAs using a 4 MHz WUR packet band and a PAPR value measured in each mapping pattern.

TABLE 63

Option 1 : guard tones (4,3)
  Case 1 : [4 1 *13* 1 *13* 1 *13* 1 *13* 1 3]
    Rotation: [1 j j 1] or [1 j -j -1] or [1 -j j -1] or [1 -j -j 1],
    PAPR[dB]
    = 3.6062
  Case 2 : [4 *13* 2 *13* 1 *13* 2 *13* 3]
    Rotation: [1 1 1 -1] or [1 j -j -1] or [1 -1 -1 -1] or [1 -j j -1],
    PAPR[dB] = 3.4791
Option 2 : guard tones (6,5)
  Case 1 : [6 *13* *13* 1 *13* *13* 5]
    Rotation: [1 1 -1 1] or [1 j j 1] or [1 -1 1 1] or [1 -j j -1],
    PAPR[dB]
    = 3.4579
Option 3 : No considered guard tone
  Case 1 : [3 *13* 2 *13* 3 *13* 2 *13* 2]
    Rotation: [1 1 -1 1] or [1 j -j -1] or [1 -1 1 1 ] or [1 -j j -1],
    PAPR[dB]
    = 3.4358

TABLE 63-continued

Case 2 : [3 *13* 2 *13* 2 *13* 2 *13* 3]
    Rotation: [1 1 1 -1] or [1 1 -1 1] or [1 j 1 -j] or [1 j -1 j] or
    [1 -j 1 j],
    PAPR[dB] = 3.6590
  Case 3 : [2 *13* 3 *13* 2 *13* 3 *13* 2]
    Rotation: [1 j 1 -j] or [1 j j 1] or [1 j -1 j] or [1 j 01 j],
    PAPR[dB] =
    3.9332
  Case 4 : [2 *13* 2 *13* 3 *13* 2 *13* 3]
    Rotation: [1 1 -1 1] or [1 j -j -1] or [1 -1 1 1 ] or [1 -j j -1],
    PAPR[dB]
    = 3.4358

Table 64 illustrates a mapping pattern that the AP can use to transmit a WUR packet according to Manchester coding using OOK modulation to three STAs using a 4 MHz WUR packet band and a PAPR value measured in each mapping pattern.

TABLE 64

Option 1 : guard tones (4,3)
  Case 1 : [4 5 *13* 4 *13* 4 *13* 5 3] , Rotation: [1 1 -1] or [1 j 1] or
    [1 -j 1] or
    [1 -1 -1], PAPR[dB] = 3.4717
  Case 2 : [4 4 *13* 5 *13* 5 *13* 4 3] , Rotation: [1 1 -1] or [1 -1 -1],
    PAPR[dB] = 3.3104
  Case 3 : [4 *13* 9 *13* 9 *13* 3] , Rotation: [1 1 -1] or [1 -1 -1],
    PAPR[dB]
    = 3.3099
Option 2 : guard tones (6,5)
  Case 1 : [6 3 *13* 4 *13* 4 *13* 3 5] , Rotation: [1 1 -1] or [1 j 1] or [1 -j
    1] or
    [1 -1 -1], PAPR[dB] = 3.4717
  Case 2 : [6 4 *13* 3 *13* 3 *13* 4 5] , Rotation: [1 j 1] or [1 -j 1],
    PAPR[dB]
    = 3.3099
  Case 3 : [6 *13* 7 *13* 7 *13* 5] , Rotation: [1 1 -1] or [1 -1 -1],
    PAPR[dB]
    = 3.3099
Option 3 : No considered guard tone
  Case 1 : [7 *13* 6 *13* 6 *13* 6] , Rotation: [1 1 -1] or [1 j 1] or [1-j 1]
    or
    [1 -
    1 -1], PAPR[dB] = 3.4330
  Case 2 : [6 *13* 7 *13* 6 *13* 6] , Rotation: [1 1 -1] or [1 j 1] or
    [1 -1 -1] or [1
    -1 j], PAPR[dB] = 5.6543
  Case 3 : [6 *13* 6 *13* 6 *13* 7] , Rotation: [1 1 -1] or [1 j 1] or [1 -j
    1] or [1 -
    1 -1], PAPR[dB] = 3.4330

Table 65 illustrates a mapping pattern that the AP can use to transmit a WUR packet according to Manchester coding using OOK modulation to two STAs using a 4 MHz WUR packet band and a PAPR value measured in each mapping pattern.

TABLE 65

Option 1 : guard tones (4,3)
  Case 1 : [4 10 *13* 11 *13* 10 3] , Rotation: [1 -1], PAPR[dB] = 4.1017
  Case 2 : [4 *13* 31 *13* 3] , Rotation: [1 -1], PAPR[dB] = 4.1017
Option 2 : guard tones (6,5)
  Case 1 : [6 9 *13* 9 *13* 9 5] , Rotation: [1 j] or [1 -j],
    PAPR[dB] = 4.2733
  Case 2 : [6 *13* 27 *13* 5] , Rotation: [1 -1], PAPR[dB] = 4.1017
Option 3 : No considered guard tone
  Case 1 : [13 *13* 13 *13* 12] , Rotation: [1 1] or [1 -1],
    PAPR[dB] = 4.2421
  Case 2 : [13 12 *13* 13] , Rotation: [1 1], PAPR[dB] = 4.3785
  Case 3 : [12 *13* 13 *13* 13] , Rotation: [1 1] or [1 -1],
    PAPR[dB] = 4.2421

Hereinafter, a method in which an AP transmits a WUR packet according to Manchester coding using OOK modulation to a plurality of STAs using a 5 MHz band will be described.

Table 66 illustrates a mapping pattern that the AP can use to transmit a WUR packet according to Manchester coding using OOK modulation to three STAs using a 5 MHz WUR packet band and a PAPR value measured in each mapping pattern.

TABLE 66

Option 1 : guard tones (4,3)
    Case 1 : [<u>4</u> 3 *16* 2 *16* 2 *16* 2 <u>3</u>] , Rotation: [1 j 1] or [1 −j 1], PAPR[dB] = 4.222
    Case 2 : [<u>4</u> 2 *16* 3 *16* 2 *16* 2 <u>3</u>] , Rotation: [1 1 −1] or [1 −1 1], PAPR[dB] = 6.0798
    Case 3 : [<u>4</u> 2 *16* 2 *16* 3 *16* 2 <u>3</u>] , Rotation: [1 1 −1] or [1 −1 1], PAPR[dB] = 6.0798
    Case 4 : [<u>4</u> 2 *16* 2 *16* 2 *16* 3 <u>3</u>] , Rotation: [1 j 1] or [1 −j 1], PAPR[dB] = 4.222
    Case 5 : [<u>4</u> *16* 4 *16* 5 *16* <u>3</u>] , Rotation: [1 1 1], PAPR[dB] = 6.2309
    Case 6: [<u>4</u> *16* 5 *16* 4 *16* <u>3</u>] , Rotation: [1 1 1], PAPR[dB] = 6.2309
Option 2 : guard tones (6,5)
    Case 1 : [<u>6</u> 2 *16* 1 *16* 1 *16* 1 <u>5</u>] , Rotation: [1 j 1] or [1 −j 1], PAPR[dB] = 4.0897
    Case 2 : [<u>6</u> 1 *16* 2 *16* 1 *16* 1 <u>5</u>] , Rotation: [1 1 −1] or [1 −1 1], PAPR[dB] = 6.1621
    Case 3 : [<u>6</u> 1 *16* 1 *16* 2 *16* 1 <u>5</u>] , Rotation: [1 1 −1] or [1 −1 1], PAPR[dB] = 6.1621
    Case 4 : [<u>6</u> 1 *16* 1 *16* 1 *16* 2 <u>5</u>] , Rotation: [1 j 1] or [1 −j 1], PAPR[dB] = 4.0897
    Case 5 : [<u>6</u> *16* 2 *16* 3 *16* <u>5</u>], Rotation: [1 1 −1]or[1 −1 1], PAPR[dB] = 6.0798
    Case 6 : [<u>6</u> *16* 3 *16* 2 *16* <u>5</u>], Rotation: [1 1 −1]or[1 −1 1], PAPR[dB] = 6.0798
Option 3 : No considered guard tone
    Case 1 : [4 *16* 4 *16* 4 *16* 4] , Rotation: [1 1 −1]or[1 −1 1], PAPR[dB] = 4.0750

Table 67 illustrates a mapping pattern that the AP can use to transmit a WUR packet according to Manchester coding using OOK modulation to two STAs using a 5 MHz WUR packet band and a PAPR value measured in each mapping pattern.

TABLE 67

Option 1 : guard tones (4,3)
    Case 1 : [<u>4</u> 9 *16* 8 *16* 8 <u>3</u>] , Rotation: [1 −1], PAPR[dB] = 4.7712
    Case 2 : [<u>4</u> 8 *16* 9 *16* 8 <u>3</u>] , Rotation: [1 j] or [1 −j], PAPR[dB] = 4.9783
    Case 3 : [<u>4</u> 8 *16* 8 *16* 9 <u>3</u>] , Rotation: [1 1], PAPR[dB] = 4.7712
    Case 4 : [<u>4</u> *16* 25 *16* <u>3</u>] , Rotation: [1 1], PAPR[dB] = 5.0210
Option 2 : guard tones (6,5)
    Case 1 : [<u>6</u> 7 *16* 7 *16* 7 <u>5</u>] , Rotation: [1 1], PAPR[dB] = 5.0948
    Case 2 : [<u>6</u> *16* 21 *16* <u>5</u>] , Rotation: [1 1], PAPR[dB] = 4.9731
Option 3 : No considered guard tone
    Case 1 : [11 *16* 11 *16* 10] , Rotation: [1 1], PAPR[dB] = 5.0362
    Case 2 : [11 *16* 10 *16* 10] , Rotation: [1 −1], PAPR[dB] = 4.9510
    Case 3 : [10 *16* 11 *16* 10] , Rotation: [1 1], PAPR[dB] = 5.0362

Hereinafter, a method in which an AP transmits a WUR packet according to Manchester coding using OOK modulation to a plurality of STAs using an 8 MHz band will be described.

Table 68 illustrates a mapping pattern that the AP can use to transmit a WUR packet according to Manchester coding using OOK modulation to four STAs using an 8 MHz WUR packet band and a PAPR value measured in each mapping pattern.

TABLE 68

Option 1 : guard tones (4,3)
    Case 1 : [4 1 *26* 3 *26* 1 3] , Rotation: [1 1], PAPR[dB] = 5.0729
    Case 2 : [4 2 *26* 1 *26* 2 3] , Rotation: [1 1], PAPR[dB] = 5.0504
    Case 3 : [4 2 *26* 2 *26* 1 3] , Rotation: [1 −1], PAPR[dB] = 4.7796
    Case 4 : [4 1 *26* 2 *26* 2 3] , Rotation: [1 −1], PAPR[dB] = 4.7796
    Case 5 : [4 *26* 5 *26* 3] , Rotation: [1 1], PAPR[dB] = 5.0301
Option 2 : guard tones (6,5)
    Case 1 : [6 *26* 1 *26* 5] , Rotation: [1 1], PAPR[dB] = 5.0564
Option 3 : No considered guard tone
    Case 1 : [4 *26* 4 *26* 4] , Rotation: [1 j], PAPR[dB] = 4.9592

Embodiment 5

Figure 24:
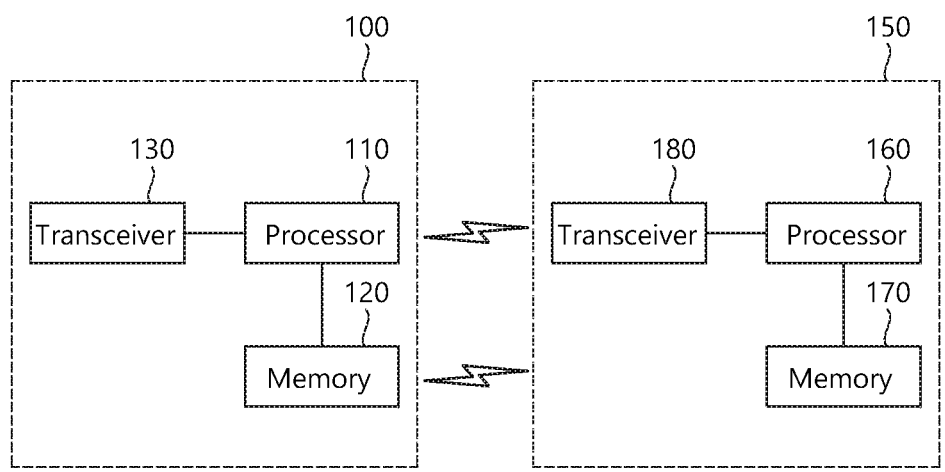
FIG. 24 illustrates a device according to one embodiment of the present invention.

FIG. 24 is a diagram describing a device for implementing the above-described method.

The wireless device 100 of FIG. 22 may correspond to the specific STA of the above description, and the wireless device 150 may correspond to the AP described above.

The STA (100) may include a processor (110), a memory (120), and a transmitting/receiving unit (130), and the AP (150) may include a processor (160), a memory (170), and a transmitting/receiving unit (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transceiver (130, 180). The processors 110 and 160 may perform the UL MU scheduling procedure described above.

The processor (110, 160) and/or the transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The transceiver 130 of the STA may include a transmitter (not shown) and a receiver (not shown). The receiver of the STA includes a main connected radio (e.g., Wireless LAN) receiver for receiving main connected radio (e.g., IEEE 802.11 a/b/g/n/ac/WUR receiver. The STA's transmitter may include a main connected radio transmitter for transmitting the main connected radio signal.

The transceiver 180 of the AP may include a transmitter (not shown) and a receiver (not shown). The transmitter of the AP may correspond to the OFDM transmitter. The AP may reuse the OFDM transmitter to send the WUR payload to OOK modulation. For example, the AP may OOK modulate the WUR payload via an OFDM transmitter, as described above.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

The present invention is applicable to various wireless communication systems, including IEEE 802.11

What is claimed is:

1. A method for transmitting a wake-up radio (WUR) packet by an access point (AP) in a wireless local area network (WLAN) system, the method comprising:
generating a WUR packet comprising a legacy preamble and a plurality of on-symbols; and
transmitting the WUR packet to a station (STA),
wherein a subcarrier sequence for generating the plurality of on-symbols is determined based on a very high throughput-short training field (VHT-STF), and
wherein the subcarrier sequence is ±[1, −1, 1, −1, −1, 1, 0, −1, −1, 1, 1, 1, 1].

2. The method of claim 1, wherein a length of the subcarrier sequence is determined based on a frequency band allocated for the plurality of on-symbols.

3. The method of claim 2, wherein the frequency band allocated for the plurality of on-symbols is set as a partial frequency band of a transmission band for the WLAN system, and
the subcarrier sequence is set to generate the plurality of on-symbols.

4. The method of claim 3, wherein the partial frequency band is set to 4 MHz.

5. The method of claim 1, wherein the plurality of on-symbols is allocated by on-off keying (OOK) modulation.

6. The method of claim 1, further comprising:
mapping the subcarrier sequence to some of a plurality of all subcarriers forming a transmission band for the WLAN system,
wherein the subcarrier sequence is mapped to a plurality of consecutive subcarriers among the plurality of all subcarriers.

7. The method of claim 6, wherein a center of the subcarrier sequence is mapped to a center of the plurality of all subcarriers.

8. The method of claim 1, wherein the WUR payload comprises a plurality of on-symbols for a plurality of STAs,
the plurality of on-symbols for the plurality of STAs is multiplexed on one symbol period, and
different phase rotations are applied to the respective multiplexed on-symbols.

9. A device for transmitting a wake-up radio (WUR) packet in a wireless local area network (WLAN) system, the device comprising:
a transceiver; and
a processor,
wherein the processor generates a WUR packet comprising a legacy preamble and a plurality of on-symbols and transmits the WUR packet to a station (STA), and
a subcarrier sequence for generating the plurality of on-symbols is determined based on a very high throughput-short training field (VHT-STF), and
wherein the subcarrier sequence is ±[1, −1, 1, −1, −1, 1, 0, −1, −1, 1, 1, 1, 1].

* * * * *